United States Patent
Searle et al.

(10) Patent No.: US 9,747,096 B2
(45) Date of Patent: *Aug. 29, 2017

(54) REMOTE EMBEDDED DEVICE UPDATE PLATFORM APPARATUSES, METHODS AND SYSTEMS

(71) Applicant: HARMAN CONNECTED SERVICES, INC., Stamford, CT (US)

(72) Inventors: Mark Douglas Searle, Wokingham (GB); Owen James Griffin, Berkshire (GB); Robert Franz Klaus Kempf, Eggolsheim (DE)

(73) Assignee: Harman Connected Services, Inc., Stamford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/793,679

(22) Filed: Jul. 7, 2015

(65) Prior Publication Data

US 2016/0117162 A1  Apr. 28, 2016

Related U.S. Application Data

(60) Provisional application No. 62/021,672, filed on Jul. 7, 2014.

(51) Int. Cl.
*G06F 9/44* (2006.01)
*G06F 9/445* (2006.01)
(Continued)

(52) U.S. Cl.
CPC .............. *G06F 8/65* (2013.01); *H04L 41/082* (2013.01); *H04L 63/10* (2013.01); *H04L 67/10* (2013.01);
(Continued)

(58) Field of Classification Search
CPC ........ G06F 8/65; G06F 8/665; G06F 11/1433; G06F 8/61; G06F 11/1004; G06F 8/66; H04L 67/025
See application file for complete search history.

(56) References Cited

U.S. PATENT DOCUMENTS 6,668,289 B2 * 12/2003 Cheng ...................... G06F 8/62
  709/200
8,572,599 B2 * 10/2013 Thaper ...................... G06F 8/64
  717/120
(Continued)

FOREIGN PATENT DOCUMENTS

KR  100648817 B1  11/2006
KR  20080037450 A  4/2008

OTHER PUBLICATIONS

Junrong Shen et al.; Towards a Unified Formal Model for Supporting Mechanisms of Dynamic Component Update; 2005 ACM; pp. 80-89; <http://dl.acm.org/citation.cfm?id=1081720&CFID=927919562&CFTOKEN=85015644>.*
(Continued)

*Primary Examiner* — Thuy Dao
*Assistant Examiner* — Cuong V Luu
(74) *Attorney, Agent, or Firm* — McCoy Russell LLP

(57) ABSTRACT

The Remote Embedded Device Update Platform Apparatuses, Methods and Systems ("REDUP") transforms telemetry inputs via REDUP components into remote embedded updates outputs. The REDUP may include a memory and processor with instructions to: obtain a remote embedded device connection request message from a remote embedded device and analyze the message to determine a version of embedded instructions on the remote embedded device. With that, the REDUP may determine if other remote embedded devices similar to the remote embedded device have provided request messages by searching a remote (Continued)

embedded device connection request message database. This allows the REDUP to determine if a potential issue requiring updates on the remote embedded device exists. With that, the REDUP may determine and provide an update for the remote embedded device.

23 Claims, 35 Drawing Sheets

(51) Int. Cl.
*H04L 29/08* (2006.01)
*H04L 12/24* (2006.01)
*H04L 29/06* (2006.01)
*H04L 12/26* (2006.01)

(52) U.S. Cl.
CPC ...... *H04L 41/0206* (2013.01); *H04L 41/0233* (2013.01); *H04L 41/069* (2013.01); *H04L 41/0873* (2013.01); *H04L 43/0817* (2013.01); *H04L 43/16* (2013.01)

(56) References Cited

U.S. PATENT DOCUMENTS

| | | | | |
|---|---|---|---|---|
| 2003/0110241 | A1* | 6/2003 | Cheng, Jr. | G06F 8/62 709/221 |
| 2004/0143828 | A1* | 7/2004 | Liu | G06F 8/665 717/168 |
| 2005/0071839 | A1* | 3/2005 | Kim | G06F 8/65 717/170 |
| 2005/0097543 | A1* | 5/2005 | Hirayama | G06F 8/65 717/168 |
| 2008/0148248 | A1 | 6/2008 | Volkmer et al. | |
| 2009/0222804 | A1 | 9/2009 | Kaufman et al. | |
| 2009/0260004 | A1 | 10/2009 | Datta et al. | |
| 2009/0319848 | A1* | 12/2009 | Thaper | G06F 8/64 714/748 |
| 2011/0145807 | A1* | 6/2011 | Molinie | G06F 8/65 717/170 |
| 2011/0289495 | A1 | 11/2011 | Mulligan et al. | |
| 2013/0157558 | A1 | 6/2013 | Wiatrowski | |
| 2013/0227540 | A1* | 8/2013 | Ruster | G06F 8/65 717/170 |
| 2014/0047427 | A1* | 2/2014 | Evans | G06F 9/45529 717/168 |
| 2015/0169312 | A1* | 6/2015 | Patel | G06F 8/20 717/170 |
| 2015/0227359 | A1* | 8/2015 | Todoroki | G06F 8/65 717/169 |

OTHER PUBLICATIONS

Marco Eugenio Madeira Di Beneditto et al.; A Declarative Approach for Software Compositional Reconfiguration; 2012 ACM; 6 pages; <http://dl.acm.org/citation.cfm?id=2405686&CFID=927919562&CFTOKEN=85015644>.*

Kami Vaniea et al.; Tales of Software Updates The process of updating software; 2016 ACM; pp. 3215-3226; <http://dl.acm.org/citation.cfm?id=2858303&CFID=927919562&CFTOKEN=85015644>.*

Phillip G. Armour; The Business of Software An Updated Software Almanac; 2015 ACM; pp. 32-34; <http://dl.acm.org/citation.cfm?id=2770896&CFID=927919562&CFTOKEN=85015644>.*

Karla Saur et al.; Fourth Workshop on Hot Topics in Software Upgrades (HotSWUp 2012); 2013 ACM; pp. 55-62; <http://dl.acm.org/citation.cfm?id=2433152&CFID=927919562&CFTOKEN=85015644>.*

Naga Praveen Katta et al.; Incremental Consistent Updates; 2013 ACM; pp. 49-54; <http://dl.acm.org/citation.cfm?id=2491191&CFID=927919562&CFTOKEN=85015644>.*

ISA Korean Intellectual Property Office, International Search Report and Written Opinion Issued in Application No. PCT/US2015/039457, Nov. 23, 2015, WIPO, 11 pages.

ISA Korean Intellectual Property Office, International Search Report and Written Opinion Issued in Application No. PCT/US2016/012393, Jun. 17, 2016, WIPO, 13 pages.

* cited by examiner

EXEMPLARY REDUP DEVICE SEGMENT DETERMINING (DSD) COMPONENT

EXEMPLARY REDUP UPDATE DOWNLOAD ADMINISTERING (UDA) COMPONENT

EXEMPLARY REDUP PACKAGE DOWNLOAD ADMINISTERING (PDA) COMPONENT

EXEMPLARY REDUP UPDATE INSTALLATION ADMINISTERING (UIA) COMPONENT

EXEMPLARY REDUP ARCHITECTURE

EXEMPLARY REDUP PRODUCT SEGMENT CONFIGURING (PSC) COMPONENT

EXEMPLARY REDUP ARCHITECTURE

EXEMPLARY REDUP UPDATE PACKAGE CONFIGURING (UPC) COMPONENT

EXEMPLARY REDUP MODEL

EXEMPLARY REDUP MODEL

EXEMPLARY REDUP SCREENSHOT

EXEMPLARY REDUP SCREENSHOT

EXEMPLARY REDUP SCREENSHOT

EXEMPLARY REDUP DATA FLOW

EXEMPLARY REDUP EVENT LOGGING ADMINISTERING (ELA) COMPONENT

EXEMPLARY REDUP ANALYTICS CONDUCTING (AC) COMPONENT

EXEMPLARY REDUP LOG EVENT NOTIFICATION (LEN) ONTOLOGY

EXEMPLARY REDUP EMBEDDED SYSTEMS (ESM) ONTOLOGY

FIGURE 32

```
# Base Model
ex:AudiA4B8Saloon a coo:BaseModel, vso:Automobile;
    gr:isVariantOf ex:A4 ;
    gr:isVariantOf ex:B8 ;
    rdfs:label "A4 B8 (2012)"@en ;
    rdfs:comment "A4 with Saloon body style"@en ;
    gr:hasManufacturer ex:audi ;
    vso:modelDate "2012-01-01"^^xsd:date ;
    vso:bodyStyle <http://en.wikipedia.org/wiki/Sedan_automobile> ;
    vso:axles [ a gr:QuantitativeValueInteger ;
        gr:hasValueInteger "2"^^xsd:int ;
        gr:hasUnitOfMeasurement "C62"^^xsd:string ] ;
    vso:fuelTankVolume [ a gr:QuantitativeValueFloat ;
        gr:hasValueFloat "50"^^xsd:float ;
        gr:hasUnitOfMeasurement "LTR"^^xsd:string ] ;
    vso:height [ a gr:QuantitativeValueFloat ;
        gr:hasValueFloat "142.7"^^xsd:float ;
        gr:hasUnitOfMeasurement "CMT"^^xsd:string ] ;
    vso:length [ a gr:QuantitativeValueFloat ;
        gr:hasValueFloat "470.3"^^xsd:float ;
        gr:hasUnitOfMeasurement "CMT"^^xsd:string ] ;
    vso:width [ a gr:QuantitativeValueFloat ;
        gr:hasValueFloat "182.6"^^xsd:float ;
        gr:hasUnitOfMeasurement "CMT"^^xsd:string ] ;
    vso:wheelbase [ a gr:QuantitativeValueFloat ;
        gr:hasValueFloat "280.8"^^xsd:float ;
        gr:hasUnitOfMeasurement "CMT"^^xsd:string ] ;
```

EXEMPLARY REDUP RESOURCE DESCRIPTION FRAMEWORK (RDF) FILE

FIGURE 33

```
PREFIX imdb: <http://data.linkedmdb.org/resource/movie/>
PREFIX dcterms: <http://purl.org/dc/terms/>
PREFIX dbpo: <http://dbpedia.org/ontology/>
PREFIX rdfs: <http://www.w3.org/2000/01/rdf-schema#>

SELECT ?birthDate ?spouseName ?movieTitle ?movieDate {
  { SERVICE <http://dbpedia.org/sparql>
    { SELECT ?birthDate ?spouseName WHERE {
        ?actor rdfs:label "Arnold Schwarzenegger"@en ;
          dbpo:birthDate ?birthDate ;
          dbpo:spouse ?spouseURI .
        ?spouseURI rdfs:label ?spouseName .
        FILTER ( lang(?spouseName) = "en" )
      }
    ~
  }
  { SERVICE <http://data.linkedmdb.org/sparql>
    { SELECT ?actor ?movieTitle ?movieDate WHERE {
        ?actor imdb:actor_name "Arnold Schwarzenegger" .
        ?movie imdb:actor ?actor ;
          dcterms:title ?movieTitle ;
          dcterms:date ?movieDate .
      }
    ~
  }
~
```

EXEMPLARY REDUP FEDERATED QUERY

EXEMPLARY REDUP FAILURE MODE ANALYTICS MODEL

REMOTE EMBEDDED DEVICE UPDATE PLATFORM APPARATUSES, METHODS AND SYSTEMS

This application for letters patent disclosure document describes inventive aspects that include various novel innovations (hereinafter "disclosure") and contains material that is subject to copyright, mask work, and/or other intellectual property protection. The respective owners of such intellectual property have no objection to the facsimile reproduction of the disclosure by anyone as it appears in published Patent Office file/records, but otherwise reserve all rights.

PRIORITY CLAIM

Applicant hereby claims benefit to priority under 35 USC §119 as a non-provisional conversion of: U.S. provisional patent application Ser. No. 62/021,672, filed Jul. 7, 2014, entitled "Remote Embedded Device Update Platform Apparatuses, Methods and Systems,".

The entire contents of the aforementioned applications are herein expressly incorporated by reference.

FIELD

The present innovations generally address embedded software, and more particularly, include Remote Embedded Device Update Platform Apparatuses, Methods and Systems.

However, in order to develop a reader's understanding of the innovations, disclosures have been compiled into a single description to illustrate and clarify how aspects of these innovations operate independently, interoperate as between individual innovations, and/or cooperate collectively. The application goes on to further describe the interrelations and synergies as between the various innovations; all of which is to further compliance with 35 U.S.C. §112.

BACKGROUND

Many devices have embedded software, such as cars and appliances. Sometimes, the embedded software may be upgraded by a technician who physically connects to the device and runs special updating software.

BRIEF DESCRIPTION OF THE DRAWINGS

Appendices and/or drawings illustrating various, non-limiting, example, innovative aspects of the Remote Embedded Device Update Platform Apparatuses, Methods and Systems (hereinafter "REDUP") disclosure, include:

FIG. 32 shows an exemplary resource description framework (RDF) file;
FIG. 33 shows an exemplary federated query for the REDUP.

Generally, the leading number of each citation number within the drawings indicates the figure in which that citation number is introduced and/or detailed. As such, a detailed discussion of citation number 101 would be found and/or introduced in FIG. 1. Citation number 201 is introduced in FIG. 2, etc. Any citation and/or reference numbers are not necessarily sequences but rather just example orders that may be rearranged and other orders are contemplated.

DETAILED DESCRIPTION

The Remote Embedded Device Update Platform Apparatuses, Methods and Systems (hereinafter "REDUP") transforms telemetry inputs, via REDUP components (e.g., DSD, UDA, PDA, UIA, PSC, UPC, ELA, AC, etc. components), into remote embedded updates outputs. The REDUP components, in various embodiments, implement advantageous features as set forth below.

Introduction

REDUP helps manage and update embedded devices that traditionally have been inaccessible and impracticable to update. Via its update and communication mechanisms, REDUP may also obtain data, both real-time and deferred, and perform analysis as feedback to determine existing problems, but also to diagnose potential and future problems. This feedback and analytics component may then be used to create updates that may be sent to the affected devices to fix the problem, in many instances, before any problem manifests itself. Also, REDUP allows for the determination of what other devices may similarly be affected and similarly provide updates to those, as yet, unaffected devices. In turn, all those other devices may also be examined, and each, may also contribute to the refinement of embedded devices in aggregate. Also, REDUP may obtain and use telemetry and device usage data streams, by first tagging the information with device features, model, serial number, subsystem and other metadata, and then storing that information for post processing analytics.

REDUP

Figure 1:
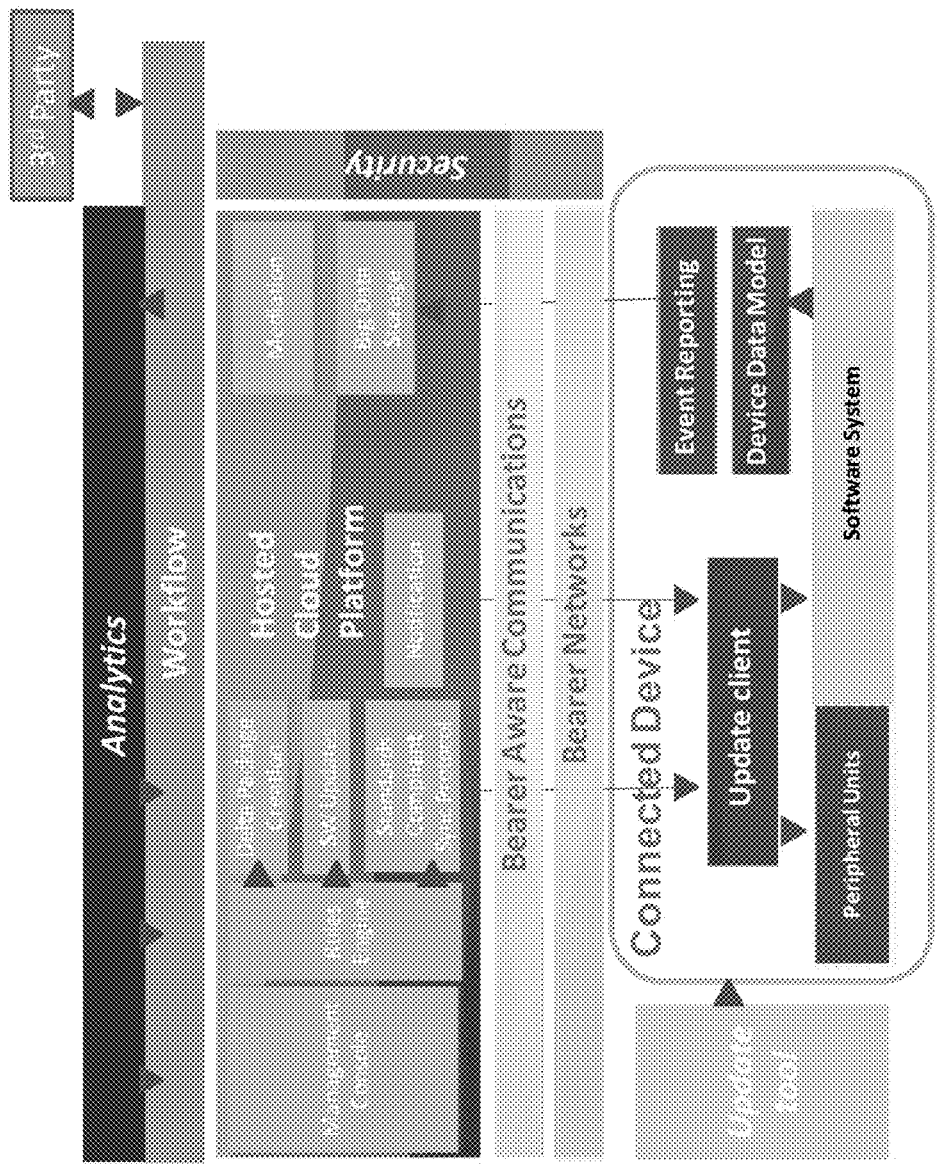
FIG. 1 shows an exemplary architecture for the REDUP.

FIG. 1 shows an exemplary architecture for the REDUP. In FIG. 1, a suite of client/server components supporting remote cloud software management server, client reporting and analytics is shown. A hosted cloud platform is utilized to facilitate remote management of connected devices via network. In one implementation, a J2EE application that operates in a clustered configuration for resilience, performance and scalability, utilizing a relational database that may also be clustered may be utilized. For example, the live system may sit in the cloud and may be hosted in a variety of environments (e.g., Amazon EC2).

A connected device (e.g., a vehicle, a smartphone, an appliance, a smart lock, and/or the like device that is capable of network connectivity) is configured to log specified events. For example, logged events may include software and configuration updates events, system fault and performance events, system service usage notifications, telematic data, and/or the like. These events may be logged by the device's software system or by individual device components (e.g., peripheral units or electronic control units (ECUs)) and may be securely delivered in a structured data format to the cloud platform for storage in a big data storage repository and/or databases of individual analytics applications. In one implementation, events data may be structured based on a graph format that facilitates flexible and configurable logging without having to tightly couple the data model to the back end system.

Various analytics applications may utilize subsets of logged events data to conduct analytics. Such analytics may also utilize third party data (e.g., information regarding vehicle components obtained from manufacturers, environmental data, information regarding users and/or user preferences) in combination with the logged events data. For example, predictive analytics may be utilized to provide answers to a range of questions, from small-scale questions around individual devices to large-scale questions at a product level. In some implementations, analytics results may be utilized to create updates for the connected device.

The device may be notified (e.g., on start up, periodically, upon update availability) when updates are available. For example, updates may include software updates, firmware updates, application updates, and/or the like. In one implementation, a notification may be sent to the device when updates are available for one or more segments associated with the device. The device may download updates (e.g., in the form of update packages) via network (e.g., via LTE, via WiFi) from the cloud platform server and install them using an update client. A rules engine may be utilized to configure updates for specific segments and to ensure that dependencies and restrictions associated with update package components (e.g., modules) are satisfied.

Figure 2:
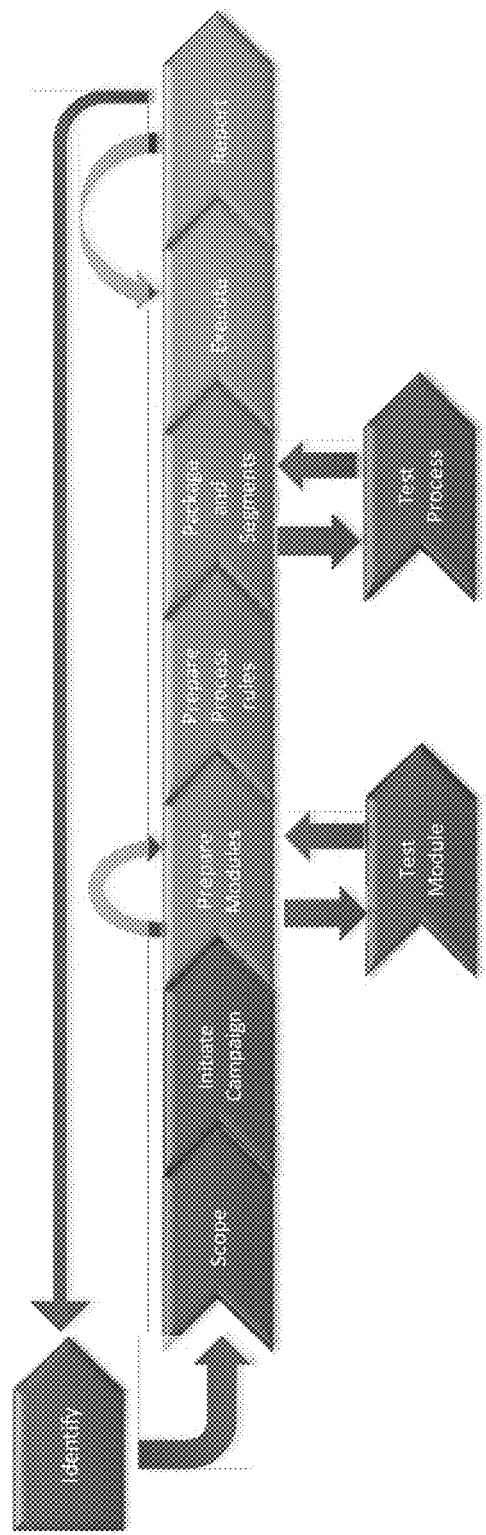
FIG. 2 shows an exemplary workflow for the REDUP.

FIG. 2 shows an exemplary workflow for the REDUP. In FIG. 2, an issue may be identified with a device (e.g., it is detected that a higher than average number of drivers are turning off adaptive steering for a certain vehicle model). The architecture described above in FIG. 1 may be utilized to facilitate delivery of an update to the device to address the issue. A campaign may be initiated to determine why customers are choosing to turn off adaptive steering for the vehicle model. For example, it may be determined that adaptive steering is too sensitive making it difficult to operate the vehicle model. Accordingly, an update to the adaptive steering component (e.g., ECU) may be prepared. The update may be tested on a segment that includes manufacturer owned test vehicles used to test changes to the vehicle model. Once the update has been tested and finalized (e.g., adaptive steering operates better, installation package is configured properly) devices (e.g., vehicles) in a segment that includes vehicles of the vehicle model that include the adaptive steering option (e.g., including the device) may be notified to install the update. Log data from vehicles that have the updated adaptive steering component may be collected and analyzed to determine whether drivers are now using adaptive steering. Any additional issues may also be similarly determined and addressed.

Figure 3:
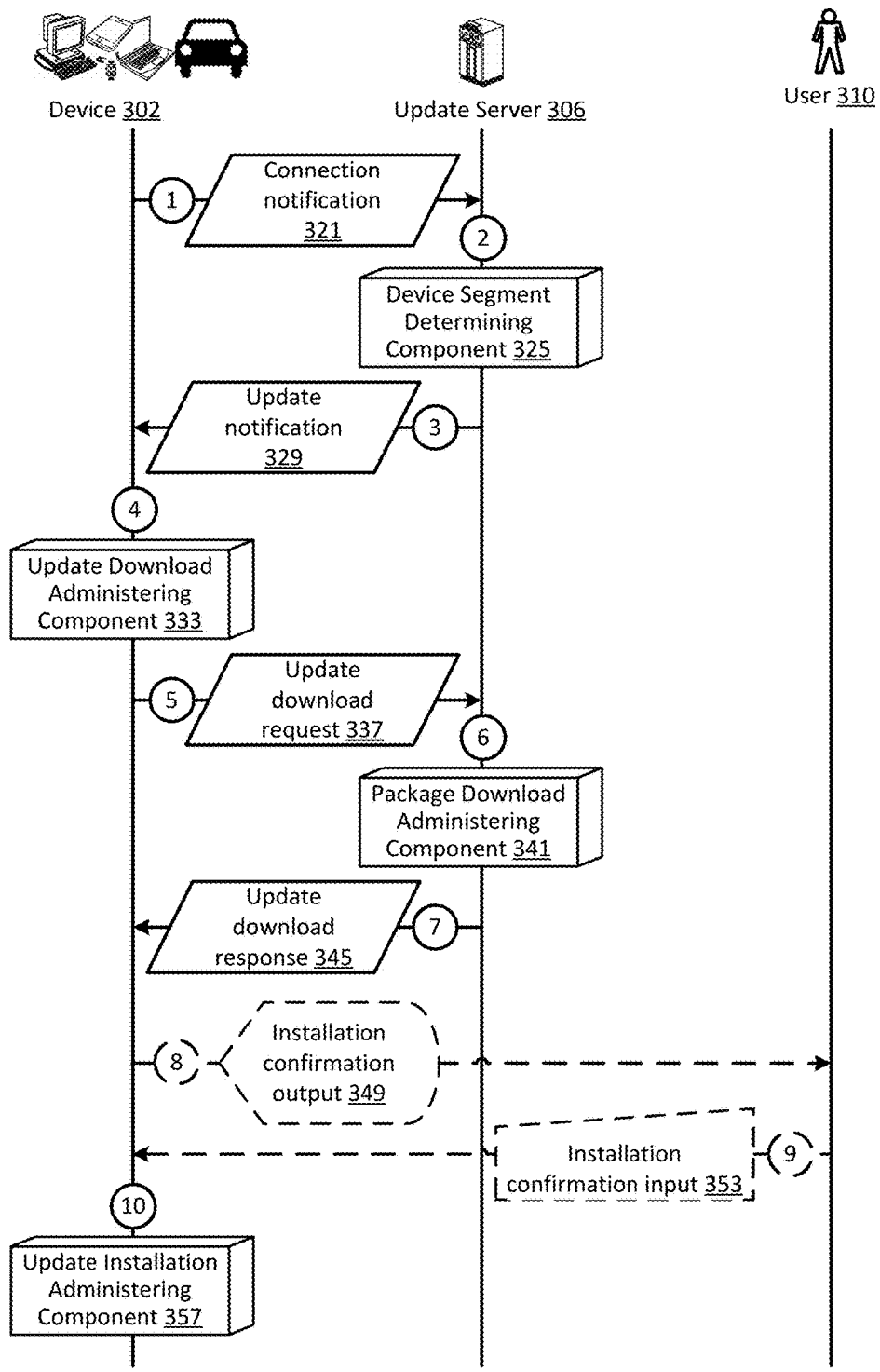
FIG. 3 shows a datagraph diagram illustrating embodiments of a data flow for the REDUP.

FIG. 3 shows a datagraph diagram illustrating embodiments of a data flow for the REDUP. In FIG. 3, dashed arrows indicate data flow elements that may be more likely to be optional. In FIG. 3, a connected device 302 may send a connection notification 321 to an update server 306. For example, a vehicle may connect to the update server (e.g., using the update server's URL or IP address) when it is turned on and/or when the vehicle enters an area with network connectivity. In one implementation, the connection notification may include authentication information, client details, a timestamp, and/or the like. For example, the device may provide the following example connection notification, substantially in the form of a (Secure) Hypertext Transfer Protocol ("HTTP(S)") POST message including eXtensible Markup Language ("XML") formatted data, as provided below:

```
POST /authrequest.php HTTP/1.1
Host: www.server.com
Content-Type: Application/XML
Content-Length: 667
<?XML version = "1.0" encoding = "UTF-8"?>
```

-continued

```
<auth_request>
    <timestamp>2020-12-31 23:59:59</timestamp>
    <user_accounts_details>
        <user_account_credentials>
            <user_name>JohnDaDoeDoeDoooe@gmail.com</account_name>
            <password>abc123</password>
            //OPTIONAL <cookie>cookieID</cookie>
            //OPTIONAL <digital_cert_link>www.mydigitalcertificate.com/
JohnDoeDaDoeDoe@gmail.com/mycertifcate.dc</digital_cert_link>
            //OPTIONAL <digital_certificate>_DATA_</digital_certificate>
        </user_account_credentials>
    </user_accounts_details>
    <client_details> //iOS Client with App and Webkit
                //it should be noted that although several client details
                //sections are provided to show example variants of client
                //sources, further messages will include only one to save
                //space
        <client_IP>10.0.0.123</client_IP>
        <user_agent_string>Mozilla/5.0 (iPhone; CPU iPhone OS 7_1_1 like Mac
OS X) AppleWebKit/537.51.2 (KHTML, like Gecko) Version/7.0 Mobile/11D201
Safari/9537.53</user_agent_string>
        <client_product_type>iPhone6,1</client_product_type>
        <client_serial_number>DNXXX1X1XXXX</client_serial_number>
        <client_UDID>3XXXXXXXXXXXXXXXXXXXXXXXXXD</client_UDID>
        <client_OS>iOS</client_OS>
        <client_OS_version>7.1.1</client_OS_version>
        <client_app_type>app with webkit</client_app_type>
        <app_installed_flag>true</app_installed_flag>
        <app_name>REDUP.app</app_name>
        <app_version>1.0 </app_version>
        <app_webkit_name>Mobile Safari</client_webkit_name>
        <client_version>537.51.2</client_version>
    </client_details>
    <client_details> //iOS Client with Webbrowser
        <client_IP>10.0.0.123</client_IP>
        <user_agent_string>Mozilla/5.0 (iPhone; CPU iPhone OS 7_1_1 like Mac
OS X) AppleWebKit/537.51.2 (KHTML, like Gecko) Version/7.0 Mobile/11D201
Safari/9537.53</user_agent_string>
        <client_product_type>iPhone6,1</client_product_type>
        <client_serial_number>DNXXX1X1XXXX</client_serial_number>
        <client_UDID>3XXXXXXXXXXXXXXXXXXXXXXXXXD</client_UDID>
        <client_OS>iOS</client_OS>
        <client_OS_version>7.1.1</client_OS_version>
        <client_app_type>web browser</client_app_type>
        <client_name>Mobile Safari</client_name>
        <client_version>9537.53</client_version>
    </client_details>
    <client_details> //Android Client with Webbrowser
        <client_IP>10.0.0.123</client_IP>
        <user_agent_string>Mozilla/5.0 (Linux; U; Android 4.0.4; en-us; Nexus
S Build/IMM76D) AppleWebKit/534.30 (KHTML, like Gecko) Version/4.0 Mobile
Safari/534.30</user_agent_string>
        <client_product_type>Nexus S</client_product_type>
        <client_serial_number>YXXXXXXXXZ</client_serial_number>
        <client_UDID>FXXXXXXXXX-XXXX-XXXX-XXXX-XXXXXXXXXXXX</client_UDID>
        <client_OS>Android</client_OS>
        <client_OS_version>4.0.4</client_OS_version>
        <client_app_type>web browser</client_app_type>
        <client_name>Mobile Safari</client_name>
        <client_version>534.30</client_version>
    </client_details>
    <client_details> //Mac Desktop with Webbrowser
        <client_IP>10.0.0.123</client_IP>
        <user_agent_string>Mozilla/5.0 (Macintosh; Intel Mac OS X 10_9_3)
AppleWebKit/537.75.14 (KHTML, like Gecko) Version/7.0.3
Safari/537.75.14</user_agent_string>
        <client_product_type>MacPro5,1</client_product_type>
        <client_serial_number>YXXXXXXXXZ</client_serial_number>
        <client_UDID>FXXXXXXXXX-XXXX-XXXX-XXXX-XXXXXXXXXXXX</client_UDID>
        <client_OS>Mac OS X</client_OS>
        <client_OS_version>10.9.3</client_OS_version>
        <client_app_type>web browser</client_app_type>
        <client_name>Mobile Safari</client_name>
        <client_version>537.75.14</client_version>
    </client_details>
</auth_request>
```

The update server may determine segments associated with the device and whether any updates are available for device components using a device segment determining (DSD) component 325. See FIG. 4 for additional details regarding the DSD component.

The update server may send an update notification 329 to the device. For example, the update server may send the update notification to notify the device regarding any applicable updates. In one implementation, the update notification may include the device's identifier (e.g., a device token used to identify the device anonymously), a list of updates available for the device, description of each update, an update package identifier associated with each update, priority associated with each update, and/or the like. For example, the update server may provide the following example update notification, substantially in the form of a HTTP(S) POST message including XML-formatted data, as provided below:

```
POST /update_notification.php HTTP/1.1
Host: www.server.com
Content-Type: Application/XML
Content-Length: 667
<?XML version = "1.0" encoding = "UTF-8"?>
<update_notification>
    <device_identifier>ID_Device1</device_identifier>
    <updates>
        <update>
            <update_identifier>ID_Update1</update_identifier>
            <description>description of update</description>
            <update_package_identifier>ID_Package1
            </update_package_identifier>
            <priority>critical</priority>
        </update>
        <update>
            <update_identifier>ID_Update2</update_identifier>
            <description>description of update</description>
            <update_package_identifier>ID_Package2
            </update_package_identifier>
            <priority>normal</priority>
        </update>
        ...
    </updates>
</update_notification>
```

The device may determine available updates and administer downloading of updates using an update download administering (UDA) component 333. See FIG. 5 for additional details regarding the UDA component.

The device may send an update download request 337 to the update server. For example, the device may send the update download request to request update download from the update server. In one implementation, the update download request may include the device's identifier, an update identifier, an update package identifier, and/or the like. For example, the device may provide the following example update download request, substantially in the form of a HTTP(S) POST message including XML-formatted data, as provided below:

```
POST /update_download_request.php HTTP/1.1
Host: www.server.com
Content-Type: Application/XML
Content-Length: 667
<?XML version = "1.0" encoding = "UTF-8"?>
<update_download_request>
    <device_identifier>ID_Device1</device_identifier>
    <update>
        <update_identifier>ID_Update1</update_identifier>
        <update_package_identifier>ID_Package1
        </update_package_identifier>
    </update>
</update_download_request>
```

The update server may facilitate sending the requested update package to the device using a package download administering (PDA) component 341. See FIG. 6 for additional details regarding the PDA component.

The update server may send an update download response 345 to the device. For example, the update server may send the requested update package to the device. In one implementation, the package file may be sent to the device. For example, the package file may include package parameters (e.g., package name, package version, package priority, package segment identifier, package rules, package checksum), software update modules (SUMs) and associated rules, and/or the like.

Installation confirmation output 349 may be provided to a user 310. For example, installation confirmation output may be provided in cases where a user approval should be obtained before installing an update (e.g., an update to an app downloaded by the user to the device from an app store). In another example, installation confirmation may be skipped if an update is mandatory and/or critical. In one implementation, a confirmation dialog may be displayed to the user (e.g., on the screen of the vehicle's infotainment system). In another implementation an audio notification may be played back to the user (e.g., a voice recording or a beep to alert the user that updates are awaiting installation confirmation). The user may provide installation confirmation input 353 to the device. For example, the user may confirm that the update should be installed (e.g., using a touchscreen or a button of the vehicle's infotainment system, using a voice command) or indicate that the update should be installed at a later time.

The device may administer update installation using an update installation administering (UIA) component 357. See FIG. 7 for additional details regarding the UIA component.

Figure 4:
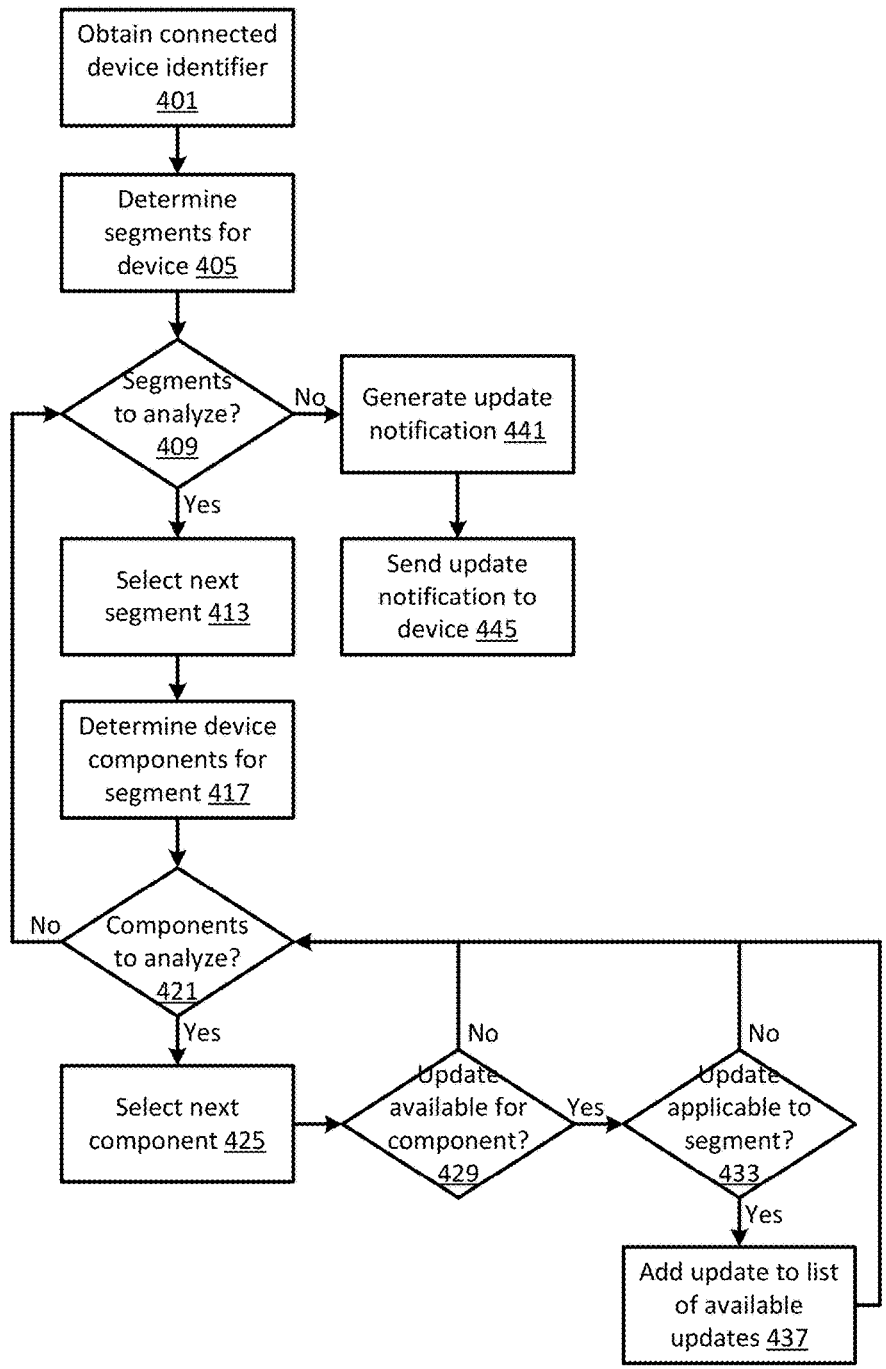
FIG. 4 shows a logic flow diagram illustrating embodiments of a device segment determining (DSD) component for the REDUP.

FIG. 4 shows a logic flow diagram illustrating embodiments of a device segment determining (DSD) component for the REDUP. In FIG. 4, an identifier of a connected device may be obtained at 401. For example, the identifier of the device may be obtained based on data received in the connection notification sent by the device.

Segments for the device may be determined at 405. A segment may be configured to link a group of devices that are a set (e.g., a set of vehicles with specified VINs), and/or that have specified components (e.g., vehicles that utilize a specified ECU) and/or component attributes (e.g., the ECU utilizes a specified firmware version). A device may be associated with one or more segments. In one embodiment, information regarding the device (e.g., the devices bill of materials, versions of components) may be analyzed (e.g., when the device is added to the REDUP) to determine segments associated with the device. Updates installed on the device may be tracked and segments associated with the device may be updated accordingly (e.g., if the ECU is updated with a new firmware version, the device may be placed in the segment associated with the new firmware version and removed from the segment associated with the old firmware version). In one implementation, segments associated with the device may be determined via a MySQL database command similar to the following:

```
SELECT segmentIDs
FROM Devices
WHERE deviceID="identifier of the device";
```

A determination may be made at 409 whether there remain segments to analyze. In one embodiment, each of the segments associated with the device may be analyzed. If there remain segments to analyze, the next segment may be selected at 413. Device components for the segment may be determined at 417. In one implementation, components associated with the segment may be determined via a MySQL database command similar to the following:

```
SELECT componentList
FROM Segments
WHERE segmentID="identifier of the currently analyzed segment";
```

A determination may be made at 421 whether there remain components to analyze. In one embodiment, each of the components associated with the segment may be analyzed. If there remain components to analyze, the next component may be selected at 425. A determination may be made at 429 whether an update is available for the component. For example, if a manufacturer of the component released a software update, a data field associated with the component may be set to indicate that an update is available, and this data field may be checked to make this determination. If an update for the component is available, a determination may be made at 433 whether the update is applicable to the segment. For example, a component may utilize different firmware versions and it may be determined whether the update is applicable to the firmware version associated with the segment (e.g., by checking a data field associated with the component update that indicates firmware versions to which the update is applicable). If the update is applicable to the segment, the update may be added to a list of available updates at 437.

If there are no more segments to analyze, an update notification may be generated at 441 that includes the list of available updates. The update notification may be sent to the device at 445. For example, the update notification may be sent via a network (e.g., LTE, WiFi).

Figure 5:
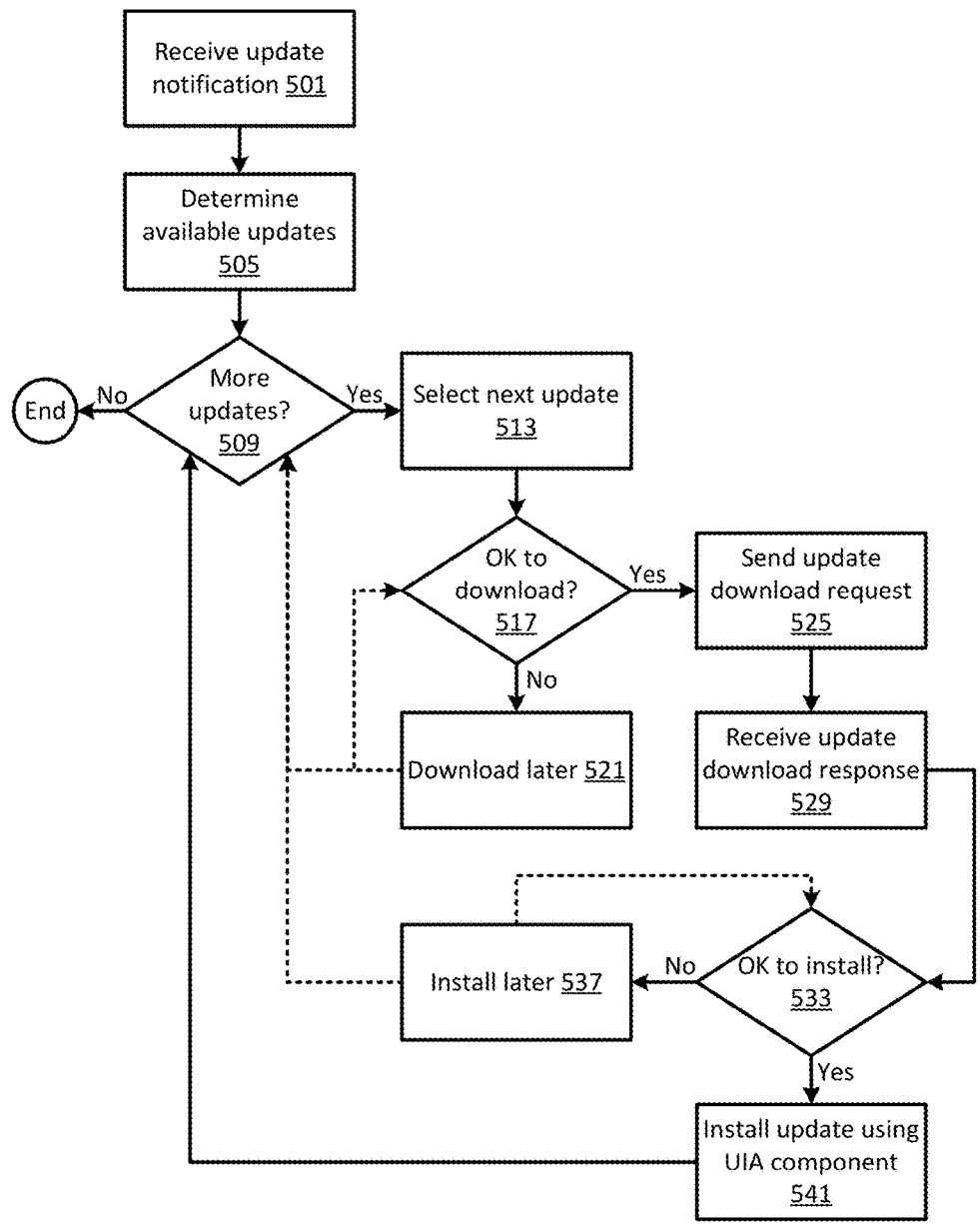
FIG. 5 shows a logic flow diagram illustrating embodiments of an update download administering (UDA) component for the REDUP.

FIG. 5 shows a logic flow diagram illustrating embodiments of an update download administering (UDA) component for the REDUP. In FIG. 5, an update notification may be received at 501. For example, the update notification may be received by a device from an update server. Available updates may be determined at 505. In one embodiment, the received update notification may be parsed (e.g., using PHP commands) to determine available updates.

A determination may be made at 509 whether there remain more updates to process. In one embodiment, each of the available updates may be processed. If there remain updates to process, the next update may be selected at 513. For example, the next highest priority update may be selected. In another example, the next update in a list of available updates may be selected. A determination may be made whether it is OK to download the update (e.g., based on network connection status). For example, if connection is available and free, it may be OK to download the update. In another example, if connection is unavailable or if connection is busy (e.g., the driver is streaming a movie for occupants of a vehicle), it may not be OK to download the update. If it is not OK to download the update now, the update may be downloaded later 521. In one implementation, a specified period of time may be allowed to elapse and then a check may be made whether it is OK to download the update. In another implementation, the update may be skipped for now and another update may be processed, and a check may be made at a later time whether it is OK to download the update.

If it is OK to download the update, an update download request may be generated and sent at 525. An update download response may be received at 529. In one embodiment, the update download response may include a package with contents of the update. For example, the package may be a file.

A determination may be made at 533 whether it is OK to install the update (e.g., based on package rules). For example, an update to an engine component may be configured to be installable upon vehicle startup while the vehicle is stationary. Accordingly, if the vehicle is currently in motion, it may not be OK to install the update, and the update may be installed the next time the vehicle is turned on. If it is not OK to install the update now, the update may be installed later 537. In one implementation, a specified period of time may be allowed to elapse and then a check may be made whether it is OK to install the update. In another implementation, the update may be skipped for now and another update may be processed, and a check may be made at a later time whether it is OK to install the update.

If it is OK to install the update, the update may be installed at 541 using the UIA component. See FIG. 7 for additional details regarding the UIA component.

Figure 6:
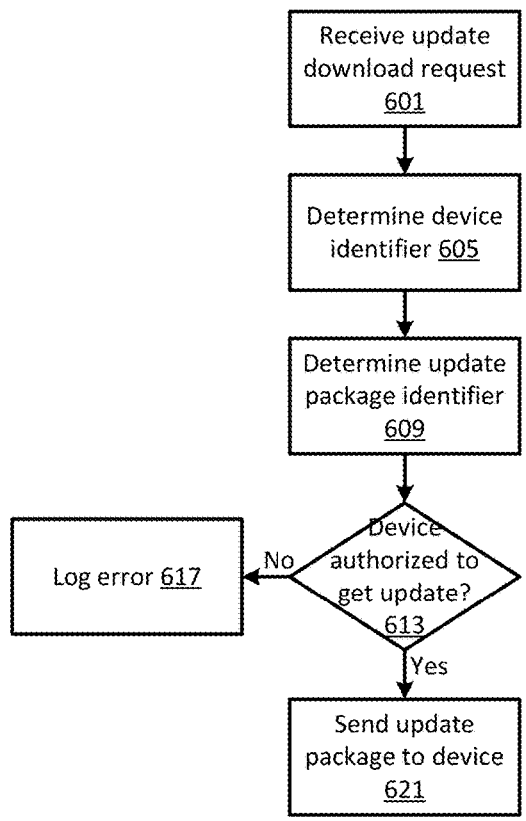
FIG. 6 shows a logic flow diagram illustrating embodiments of a package download administering (PDA) component for the REDUP.

FIG. 6 shows a logic flow diagram illustrating embodiments of a package download administering (PDA) component for the REDUP. In FIG. 6, an update download request may be received at 601. For example, the update download request may be received by an update server from a device.

A device identifier associated with the update download request may be determined at 605. In one embodiment, the update download request may be parsed (e.g., using PHP commands) to determine the device identifier. An update identifier and/or an update package identifier associated with the update download request may be determined at 609. In one embodiment, the update download request may be parsed (e.g., using PHP commands) to determine the update identifier and/or the update package identifier.

A determination may be made at 613 whether the device associated with the device identifier is authorized to get the update associated with the update identifier and/or the update package identifier. In one embodiment, a segment associated with the update may be determined (e.g., based on the update identifier, based on the update package identifier), and a determination may be made whether the device is associated with the segment. A device associated with the segment may be authorized to get the update, while a device not associated with the segment may not be authorized to get the update.

If the device is not authorized to get the update, an error event may be logged at 617. If the device is authorized to get the update, the update package associated with the update may be sent to the device at 621.

Figure 7:
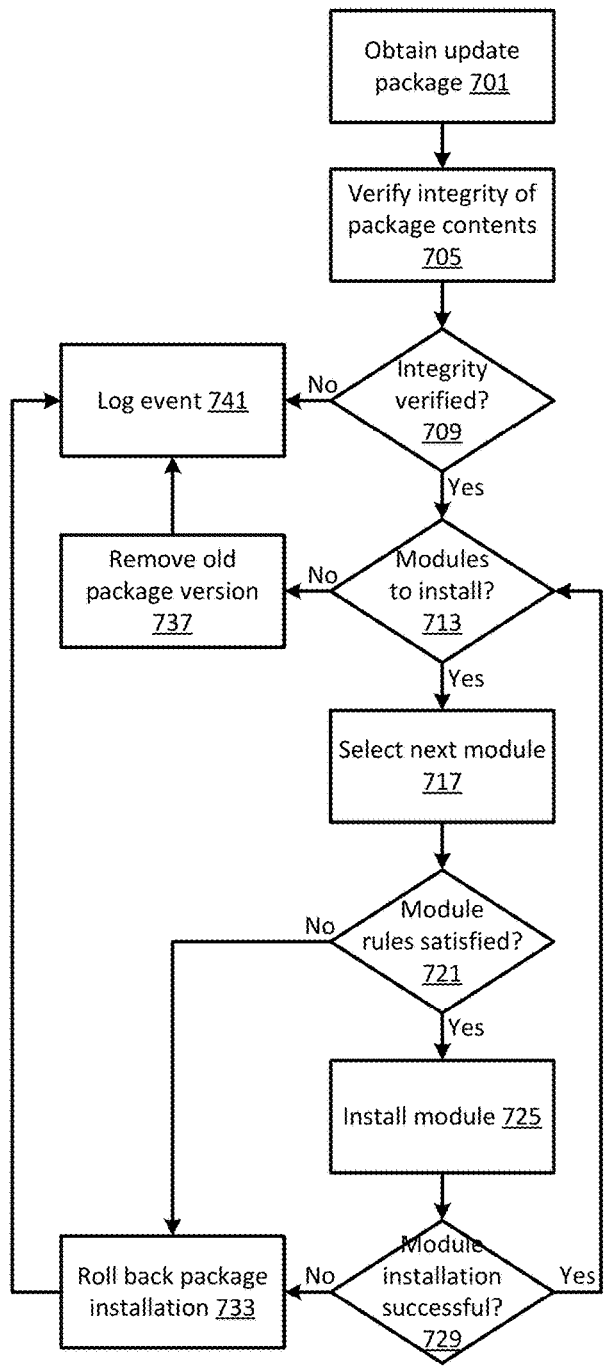
FIG. 7 shows a logic flow diagram illustrating embodiments of an update installation administering (UIA) component for the REDUP.

FIG. 7 shows a logic flow diagram illustrating embodiments of an update installation administering (UIA) component for the REDUP. In FIG. 7, an update package may be obtained at 701. For example, the update package requested by a device may be obtained from an update server.

The integrity of package contents may be verified at 705. In one embodiment, a checksum associated with the package may be calculated and checked against the package checksum included with the package. If the checksums match, the integrity of the package may be verified. In another embodiment, integrity of individual SUMs may be similarly verified. Accordingly, a determination may be made at 709 whether the integrity is verified. If the integrity is not verified, a corresponding event may be logged at 741.

If the integrity is verified, a determination may be made at 713 whether there remain SUMs to install. In various embodiments, a SUM may comprise a firmware image, a binary application, middleware, drivers, end user applications (e.g., HTML5, Android, QT), configuration files, libraries, scripts, user profiles, and/or the like. For example, a SUM may be a ZIP file that includes SUM contents. In another example, a SUM may be an RPM file. In yet another example, a SUM may be a script file (e.g., that specifies the order in which other SUMs should be installed). In one embodiment, each of the applicable modules may be installed. If there remain modules to install, the next module may be selected at 717. For example, if there are rules that specify how modules in the package depend on each other, a module may be installed after modules on which it depends are installed. In another example, if there are no dependencies, modules may be installed in any order.

A determination may be made at 721 whether rules associated with the module are satisfied. For example, a rule may be to verify whether dependent SUMs have been installed. In another example, a rule may be to check for presence or absence of a specified device component (e.g., ECU) and/or for a specified state of the device component (e.g., the component is turned off, the component uses a specified firmware version). In yet another example, a rule may be to check the state of the device (e.g., the vehicle is stationary). If it is determined that module rules are not satisfied, package installation may be rolled back (e.g., to the old package version using backup files) at 733 and a corresponding event may be logged at 741.

If it is determined that module rules are satisfied, the module may be installed at 725. For example, installation files for the SUM may be executed. A determination may be made at 729 whether the module was installed successfully. If it is determined that the module was not installed successfully, package installation may be rolled back (e.g., to the old package version using backup files) at 733 and a corresponding event may be logged at 741.

If it is determined that the module was installed successfully, the next module, if any, may be installed. If it is determined that there are no SUMs remaining to be installed, the old package version (e.g., backup files) may be removed from the device at 737. A corresponding event indicating successful installation may be logged at 741.

Figure 8:
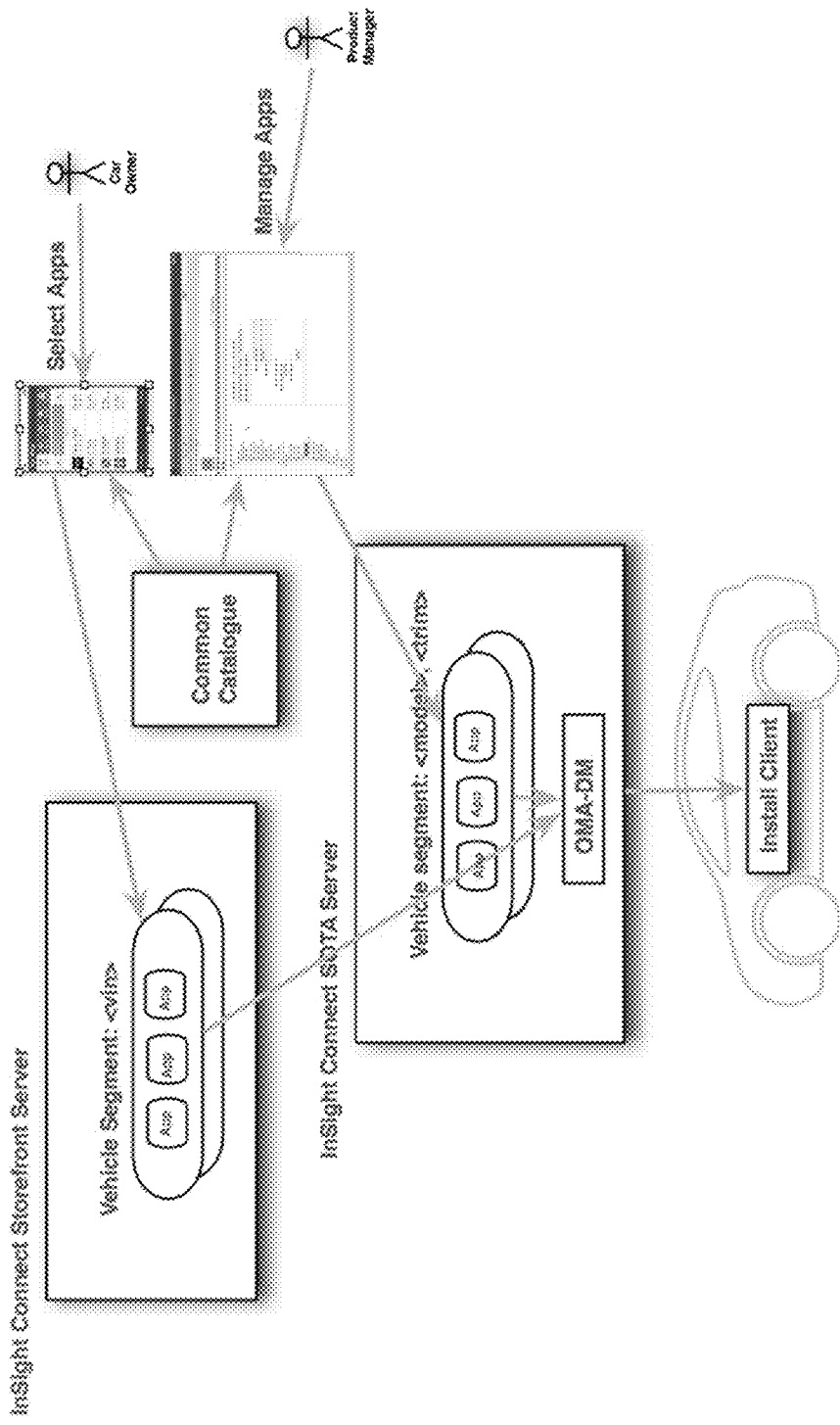
FIG. 8 shows an exemplary model for the REDUP.

FIG. 8 shows an exemplary model for the REDUP. In FIG. 8, a connected device, such as a vehicle, utilizes an install client to facilitate installation of updates from a software over the air (SOTA) server, which may be a part of the hosted cloud platform utilized to facilitate remote management of connected devices via network. In addition, the SOTA server may facilitate distribution and updates of apps that may be obtained by a user (e.g., a car owner) for the connected device. For example, OMA-DM protocol may be utilized to facilitate such remote management (e.g., utilized to synchronize information regarding the vehicle's state between the SOTA server and the vehicle).

The connected device may be associated with one or more segments (e.g., based on the vehicle's model and trim). A REDUP administrator (e.g., a product manager) may define which apps are available for which segments. Accordingly, the user may install apps, which are approved for segments associated with the connected device, on the connected device. In one embodiment, the user may utilize the connected device (e.g., the user interface of the vehicle's infotainment system) to select a desired app available from a storefront server (e.g., a separate cloud hosted storefront, a part of the hosted cloud platform).

An app selected by the user may be delivered from the storefront server via the SOTA server and installed on the device. Updates to the app may similarly be delivered via the SOTA server and installed on the device.

Figure 9:
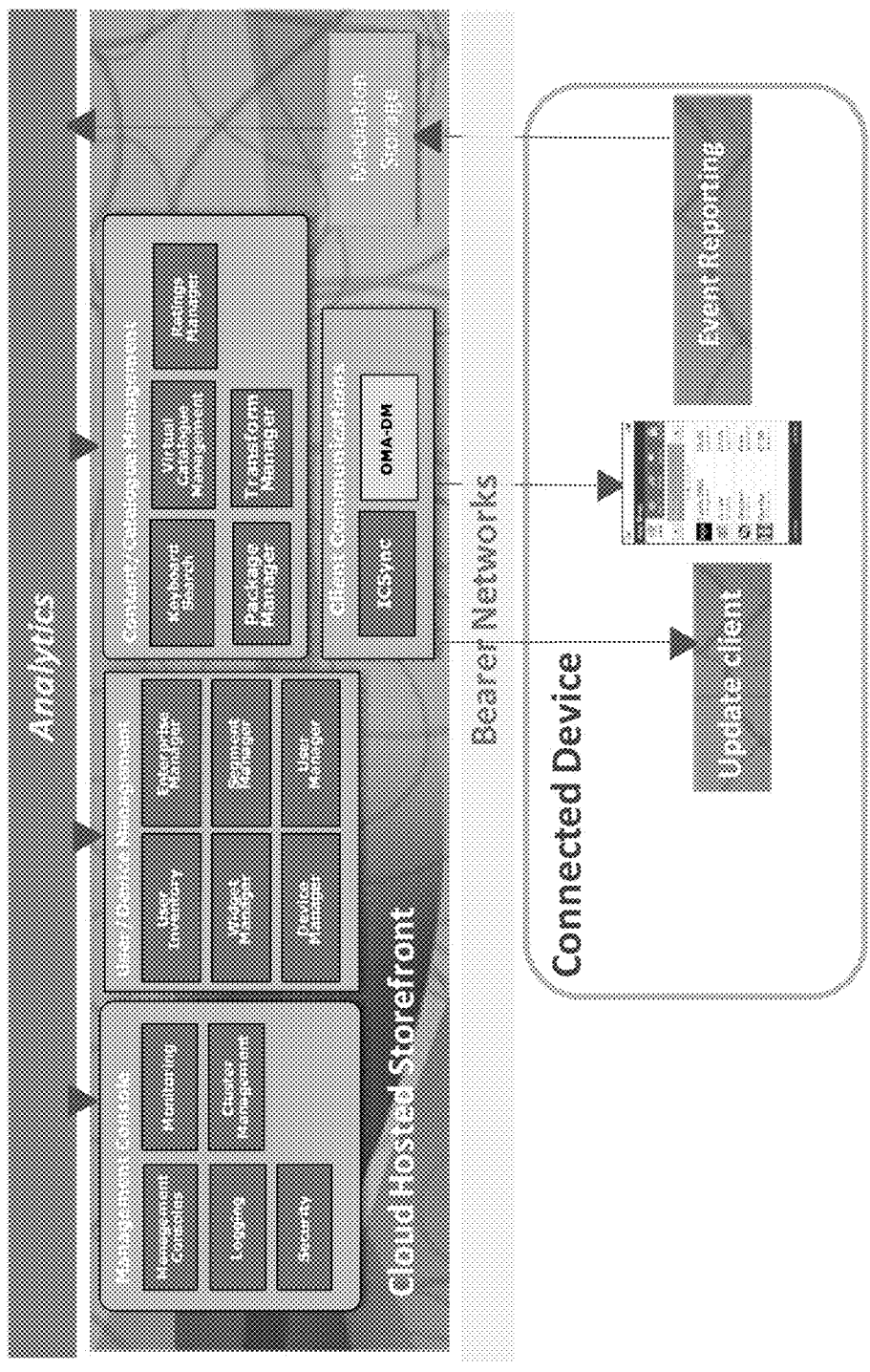
FIG. 9 shows an exemplary architecture for the REDUP.

FIG. 9 shows an exemplary architecture for the REDUP. In FIG. 9, a suite of client/server components supporting a remote app management server, client reporting and analytics is shown. A cloud hosted storefront is utilized to facilitate remote management of apps on connected devices via network. In one implementation, a J2EE application that operates in a clustered configuration for resilience, performance and scalability, utilizing a relational database that may also be clustered may be utilized. For example, the live system may sit in the cloud and may be hosted in a variety of environments (e.g., Amazon EC2).

A connected device may be notified (e.g., on start up, periodically, upon update availability) when updates (e.g., new apps approved for the device, updates to installed apps) are available. In one implementation, a notification may be sent to the device when updates are available for one or more segments associated with the device. The device may download updates (e.g., in the form of update packages) via network (e.g., via LTE, via WiFi) from the cloud hosted storefront and install them using an update client. A rules engine may be utilized to configure updates for specific segments and to ensure that dependencies and restrictions associated with update package components (e.g., modules) are satisfied.

The device may log specified events associated with apps. For example, logged events may include installation and configuration events, app usage data, app error events, telematic data, and/or the like. Logged events data may be securely delivered in structured data format via the cloud hosted storefront to various analytics applications.

Figure 10:
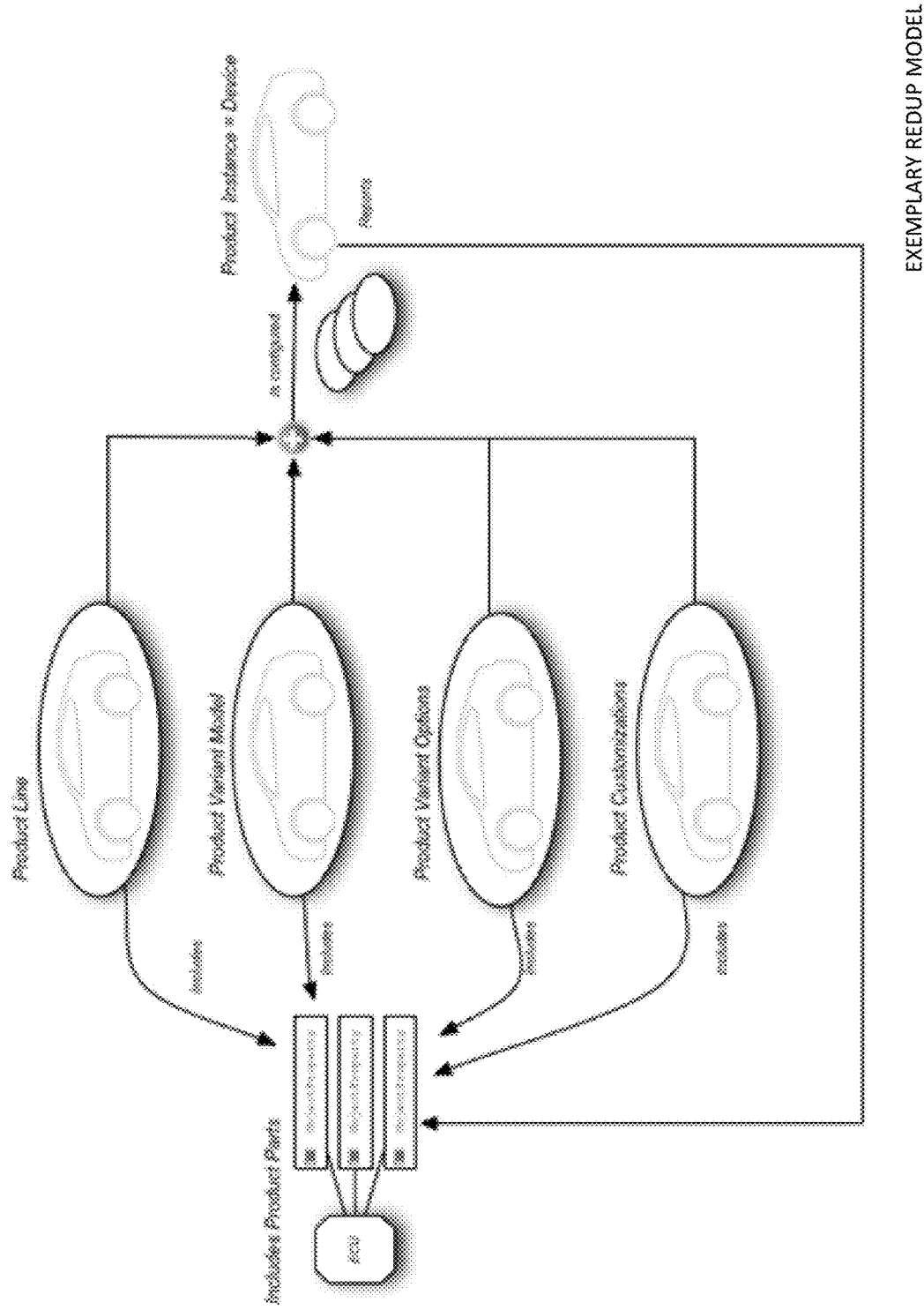
FIG. 10 shows an exemplary model for the REDUP.

FIG. 10 shows an exemplary model for the REDUP. In FIG. 10, segments associated with a connected device (e.g., a vehicle) are shown. In this example, there are four segments associated with the vehicle—a product line segment, a product variant model segment, a product variant options segment, and a product customization segment. These segments may be additive. Each segment may include one or more specified product parts (e.g., ECUs) and/or attribute values (e.g., firmware versions, configuration options) of product parts. In this way each vehicle may be defined by the collection of segments it belongs to. When an update package is published it may be associated with a segment and any vehicle associated with the segment may be notified regarding the update. Thus, every vehicle does not have to contact an update server (e.g., each day) to check for updates. Instead, this targeted notification allows the server to notify appropriate vehicles to check for updates, and to control the priority, ordering and load spreading for updates.

Figure 11:
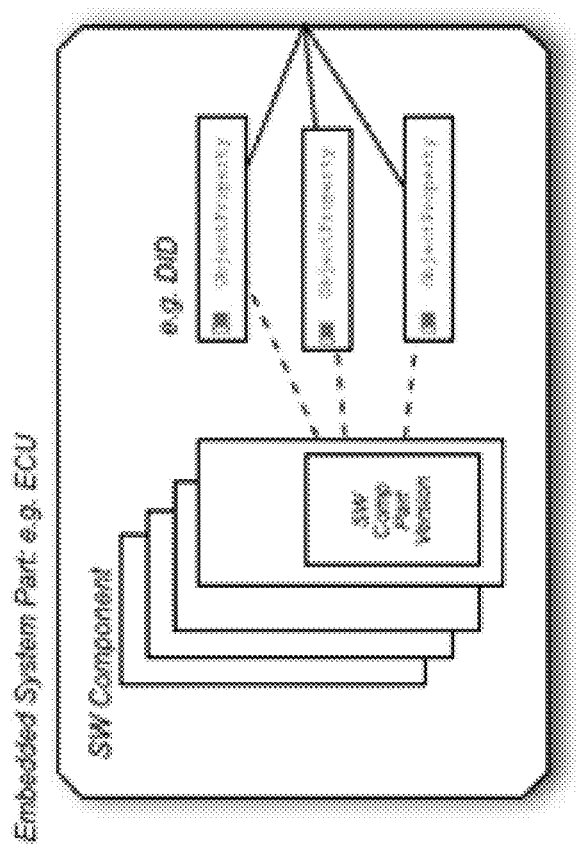
FIG. 11 shows an exemplary architecture for the REDUP.

FIG. 11 shows an exemplary architecture for the REDUP. In FIG. 11, an embedded system part (e.g., ECU) is shown. In one embodiment, ECUs may be vehicle parts comprising one or more hardware and/or software components. In various implementations, a software component may be an embedded system, a binary application, middleware, a user application, user content, and/or the like. A set of attributes may also be associated with an ECU. The ECU may report attribute values (e.g., via data identifiers (DIDs), via an RPM database, via an HTML5 execution environment). Attribute values may be communicated to an update server and utilized to define dependencies between SUMs and the state of the vehicle.

Figure 12:
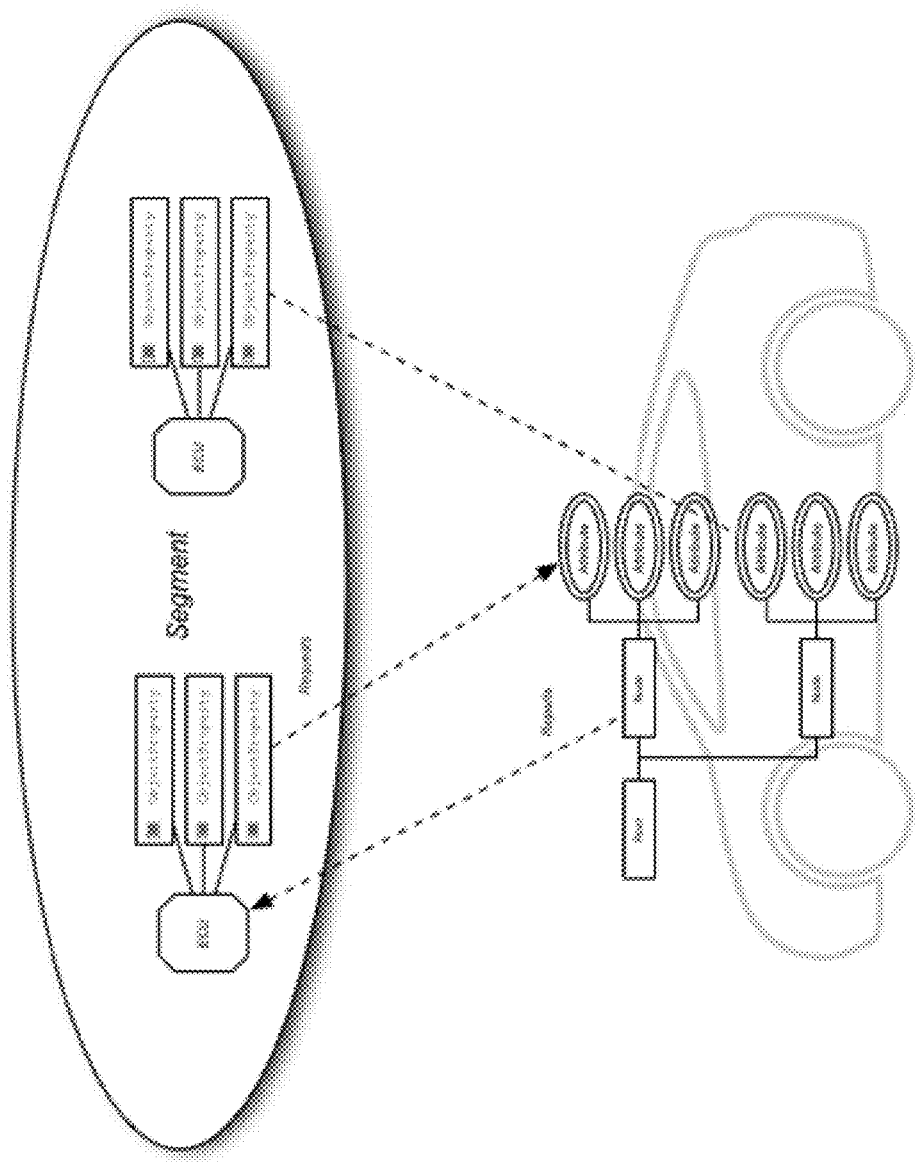
FIG. 12 shows an exemplary architecture for the REDUP.

FIG. 12 shows an exemplary architecture for the REDUP. In FIG. 12, an OMA-DM tree is used to model the current state of device components (e.g., ECUs and their attributes) for a device (e.g., a vehicle). OMA-DM may be used to synchronize information (e.g., data regarding a vehicles state) between a server and vehicles. Segments may manage specific ECUs. Accordingly, a SUM may utilize reported attributes to resolve dependencies on the target ECU and any dependent ECUs.

Figure 13:
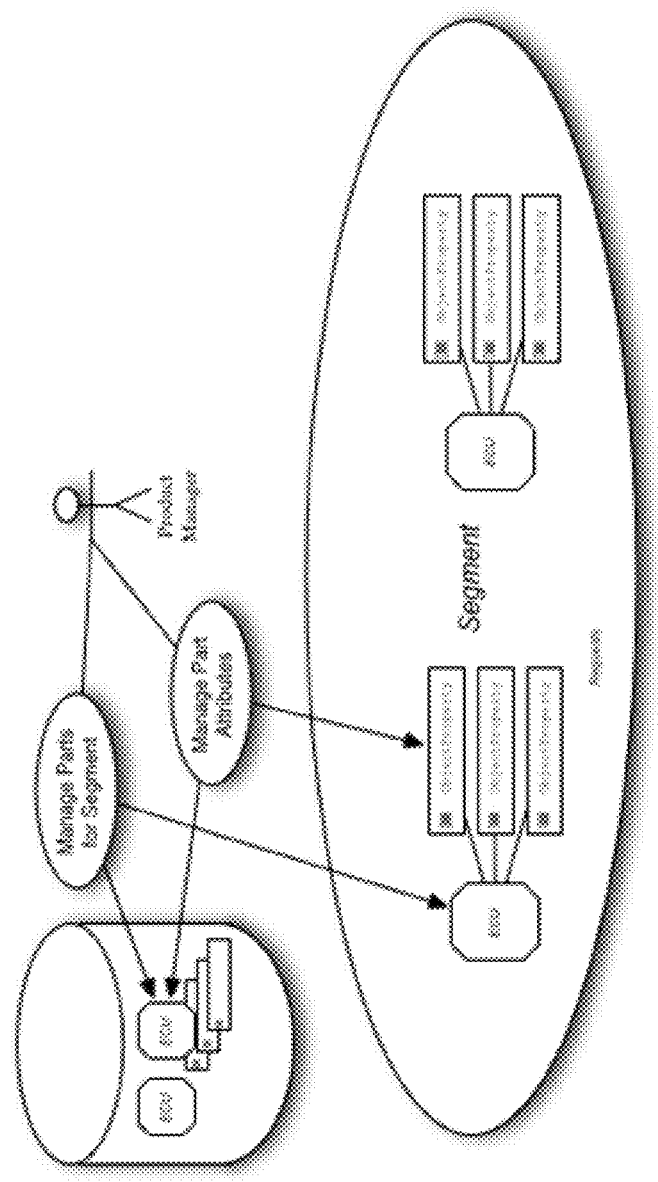
FIG. 13 shows an exemplary architecture for the REDUP.

FIG. 13 shows an exemplary architecture for the REDUP. In FIG. 13, a REDUP administrator (e.g., a product manager) may define (e.g., via a REDUP user interface) parts (e.g., ECUs) that should be associated with a segment. The REDUP administrator may also define attributes for each part that are associated with the segment. This data may be stored in a database and utilized to determine whether a device belongs to a segment.

Figure 14:
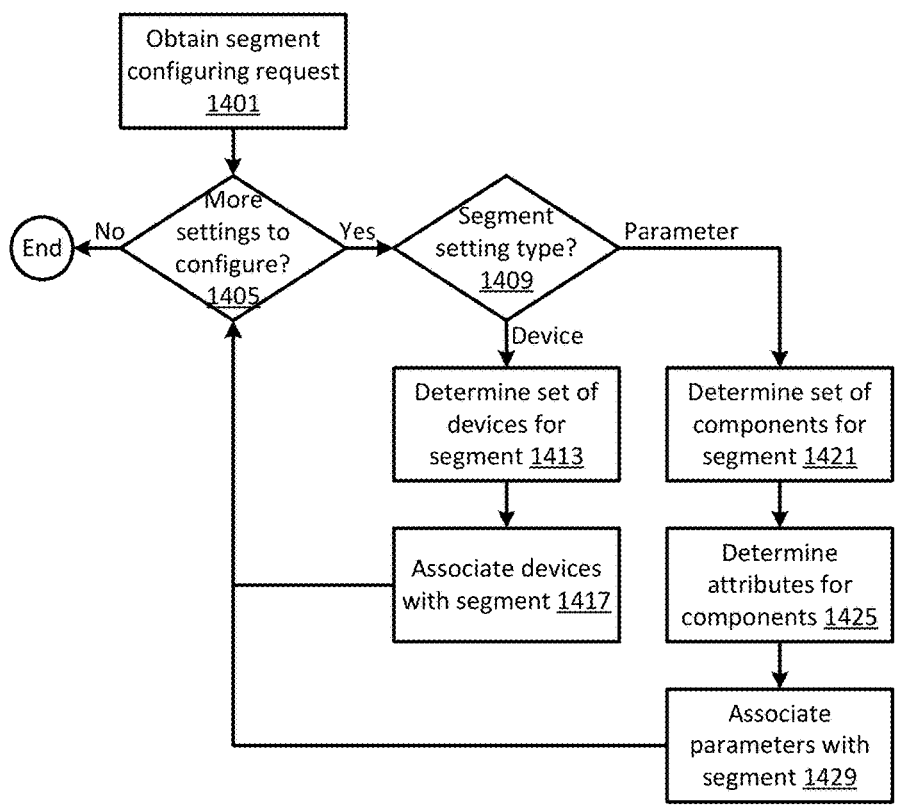
FIG. 14 shows a logic flow diagram illustrating embodiments of a product segment configuring (PSC) component for the REDUP.

FIG. 14 shows a logic flow diagram illustrating embodiments of a product segment configuring (PSC) component for the REDUP. In FIG. 14, a segment configuring request may be obtained at 1401. For example, the segment configuring request may be obtained when a REDUP administrator initiates configuration of a segment.

A determination may be made at 1405 whether there remain more settings to configure. For example, there may be more settings to configure until the REDUP administrator indicates otherwise. If there remain more settings to configure, a determination may be made at 1409 regarding a segment setting type.

In one embodiment, a segment setting may be specified based on a set of devices. For example, the set of devices may be a set of vehicles that are used by a manufacturer for testing purposes. In another example, the set of devices may be a set of vehicles that may have been manufactured using an older part number and may have to utilize a custom software fix. In yet another example, the set of devices may be a set of vehicles that are associated (e.g., located in, sold in) with a geographic location (e.g., a country, a state). A set of devices for the segment may be determined at 1413. For example, the set of devices may be specified as a list of vehicle VIN numbers (e.g., provided by the REDUP administrator). Specified devices may be associated with the segment at 1417. For example, a database record associated with the segment may be updated to include the list of specified vehicles. In one implementation, specified devices may be associated with the segment via a MySQL database command similar to the following:

```
UPDATE Segments
SET segmentDevicesList = "list of specified devices"
WHERE segmentID="identifier of the segment";
```

In another embodiment, a segment setting may be specified based on a set of parameters. For example, the set of parameters may be a collection of components and attributes associated with the components. A set of components for the segment may be determined at 1421. For example, the set of components may be specified as a set of ECUs (e.g., provided by the REDUP administrator). Attributes for components may be determined at 1425. For example, one segment may be defined for vehicles utilizing ECU with version one of the firmware and another segment may defined for vehicles utilizing ECU with version two of the firmware. In another example, one segment may be defined for vehicles utilizing ECU configured to use normal settings and another segment may be defined for vehicles utilizing ECU configured to use sports settings. Specified parameters may be associated with the segment at 1429. For example, a database record associated with the segment may be updated to include the parameters. In one implementation, specified parameters may be associated with the segment via a MySQL database command similar to the following:

```
UPDATE Segments
SET segmentParameters = "specified parameters"
WHERE segmentID="identifier of the segment";
```

Figure 15:
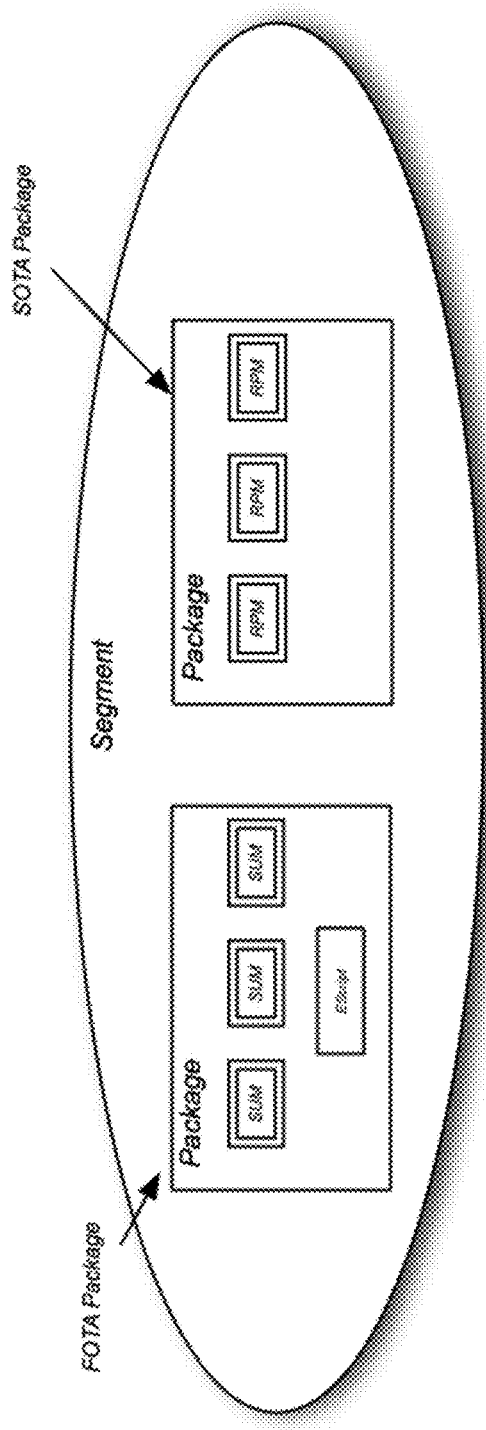
FIG. 15 shows an exemplary architecture for the REDUP.

FIG. 15 shows an exemplary architecture for the REDUP. In FIG. 15, two updates are available for a segment. An update to firmware of device components may be delivered using a firmware over the air (FOTA) update package. An update to software running on the device may be delivered using a software over the air (SOTA) package. In one embodiment, update packages may be independent from each other for installation purposes. Each update package includes a plurality of SUMs. For example, the FOTA package may include three ZIP files and a script file. In another example, the SOTA package may include three RPM files.

Figure 16:
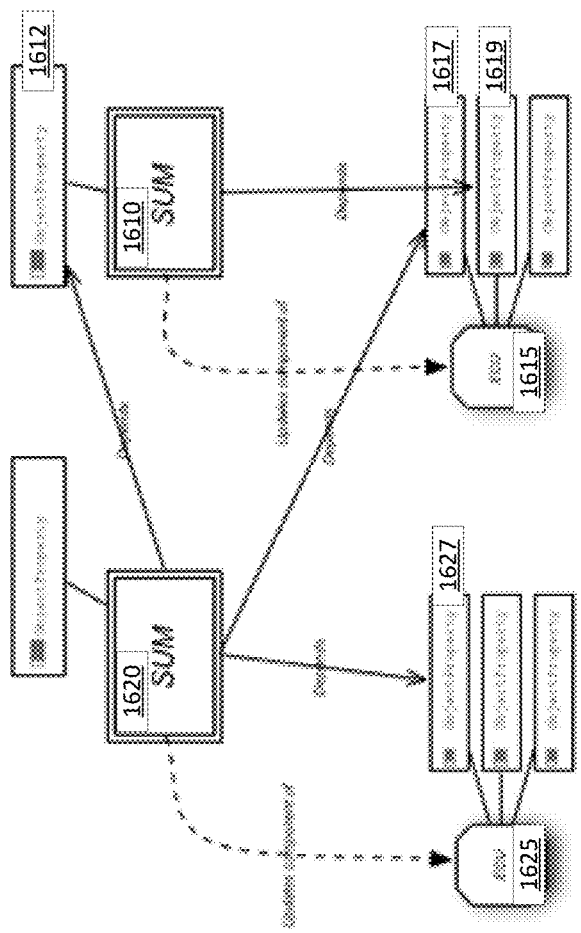
FIG. 16 shows an exemplary architecture for the REDUP.

FIG. 16 shows an exemplary architecture for the REDUP. In FIG. 16, two SUMs that are a part of an update package are shown. A SUM takes a component (e.g., an ECU) from one version to another. SUM rules (e.g., whether a SUM may be installed on a component, how a SUM should be installed on a component) may depend on component attributes and/or on other SUMs. For example, SUM 1610 is utilized to upgrade ECU 1615. The way in which SUM 1610 is installed depends on the value of attribute 1619 of ECU 1615. In another example, SUM 1620 is utilized to upgrade ECU 1625. SUM rules specify that SUM 1620 may be installed after SUM 1610 is installed. Whether SUM 1610 has been installed may be determined based on the value of attribute 1612 of SUM 1610. The way in which SUM 1620 is installed depends on the value of attribute 1617 of ECU 1615 and on the value of attribute 1627 of ECU 1625.

Figure 17:
FIG. 17 shows a screenshot diagram illustrating embodiments of the REDUP.

FIG. 17 shows a screenshot diagram illustrating embodiments of the REDUP. In FIG. 17, a summary page showing parameters associated with a SUM to upgrade a weather application (e.g., utilized by a vehicle's infotainment system) to version 3.0 is shown. For example, parameters associated with a SUM may include a name (e.g., weather application), a filename (e.g., WeatherApp-v3.0.zip), an identifier (e.g., a universally unique identifier (UUID)), a version label (e.g., 3.0), a type (e.g., application), a checksum (e.g., a hash), a timestamp, download size, an icon, applicable components (e.g., infotainment system), and/or the like. In another example, parameters associated with a SUM may include rules such as dependencies (e.g., a SUM may depend on other SUMs, on device attributes, on component (e.g., ECU) presence and/or attributes), restrictions (e.g., update is available if version 2.0 is already installed, update is available for premium tier users), and/or the like.

Figure 18:
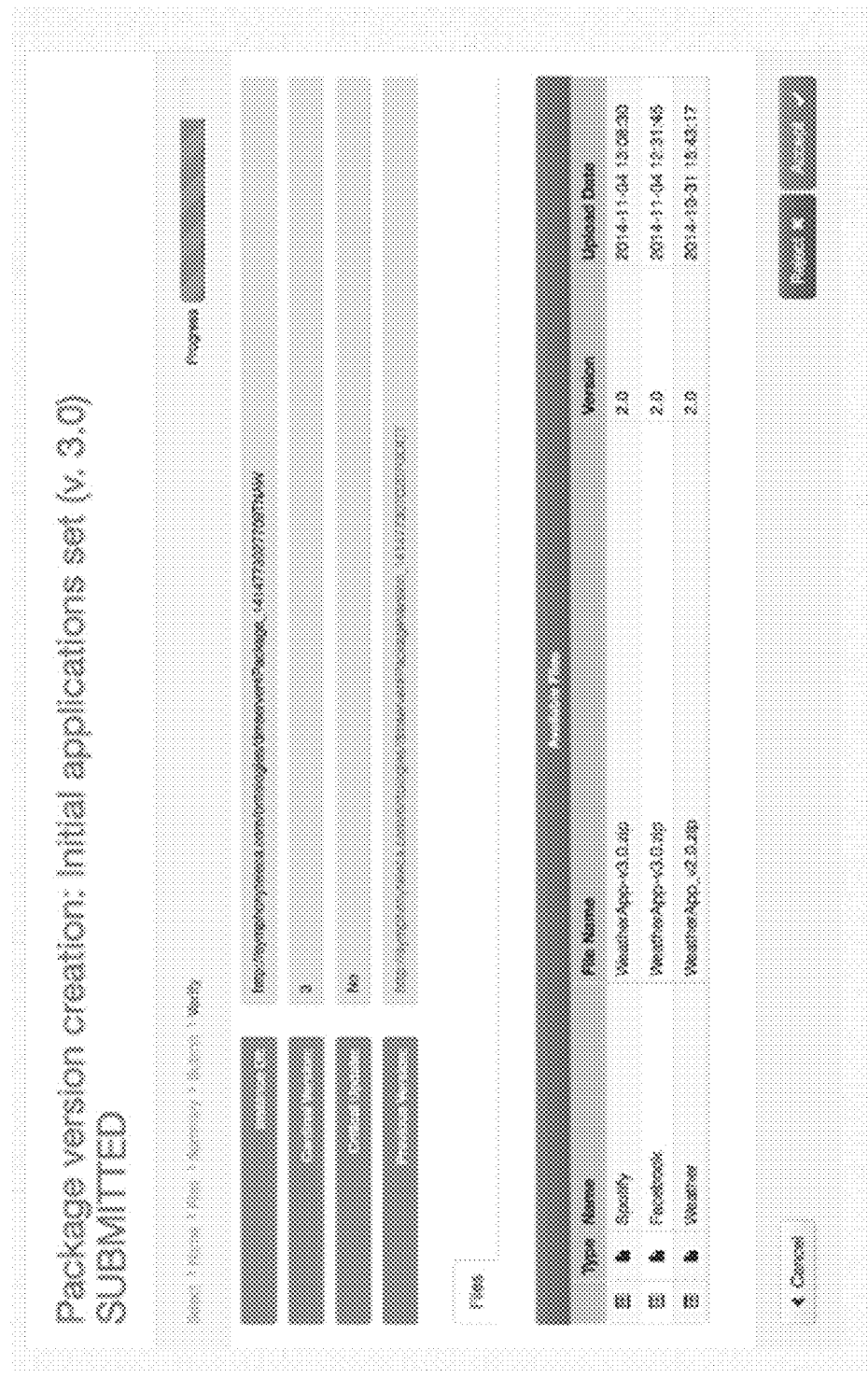
FIG. 18 shows a screenshot diagram illustrating embodiments of the REDUP.

FIG. 18 shows a screenshot diagram illustrating embodiments of the REDUP. In FIG. 18, a summary page showing parameters associated with a package to upgrade a set of initial applications (e.g., utilized by a vehicle's infotainment system) to version 3.0 is shown. For example, parameters associated with a package may include a name (e.g., initial applications), a version label (e.g., 3), a priority (e.g., not critical), a segment (e.g., identifiers of segments for which the package is applicable), a checksum (e.g., a hash), a timestamp, download size, and/or the like. In another example, parameters associated with a package may include SUMs associated with the package (e.g., a SUM for the weather application, other SUMs that are part of the set of initial applications such as for Spotify and Facebook).

Figure 19:
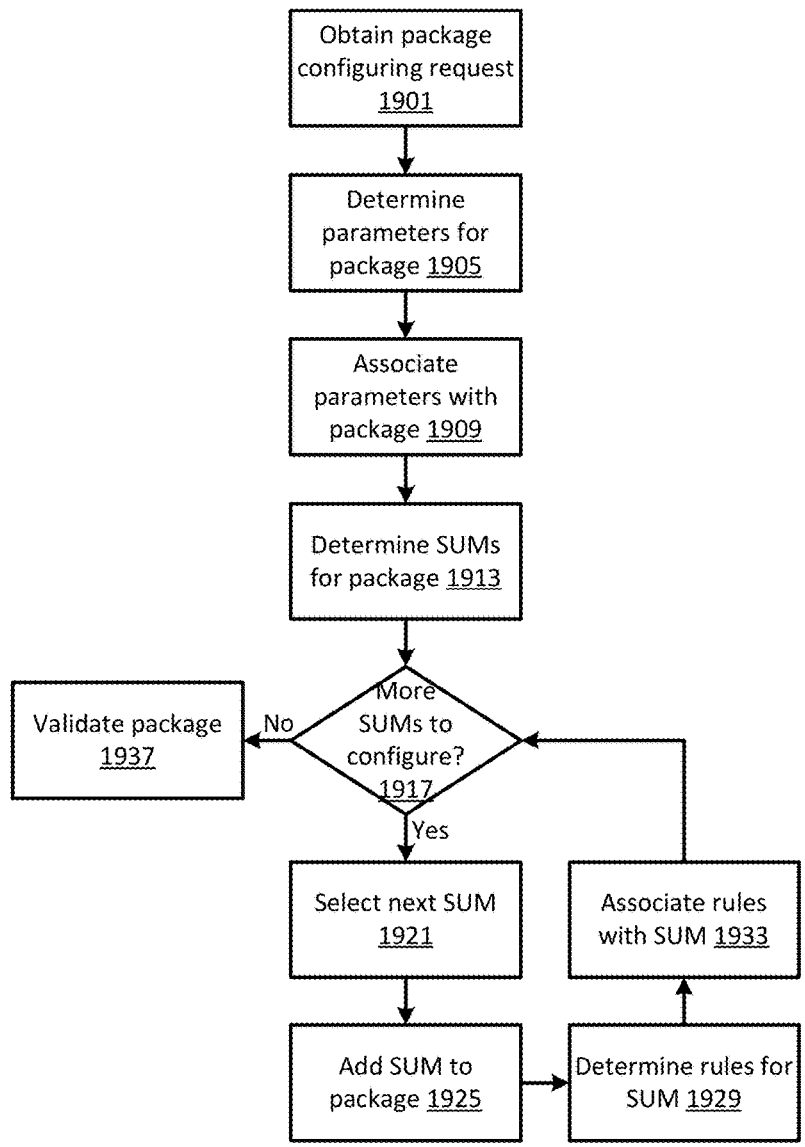
FIG. 19 shows a logic flow diagram illustrating embodiments of an update package configuring (UPC) component for the REDUP.

FIG. 19 shows a logic flow diagram illustrating embodiments of an update package configuring (UPC) component for the REDUP. In FIG. 19, a package configuring request may be obtained at 1901. For example, the package configuring request may be obtained when a REDUP administrator initiates configuration of an update package.

Parameters for the package may be determined at 1905. In one embodiment, parameters for the package may be specified by a REDUP administrator. For example, the REDUP administrator may specify a priority associated with the package. In another embodiment, parameters for the package may be calculated. For example, a checksum may be calculated for the package. The determined parameters may be associated with the package at 1909. For example, the parameters may be saved as part of the package file.

SUMs associated with the package may be determined at 1913. In one embodiment, SUMs for the package may be specified by a REDUP administrator. For example, the REDUP administrator may specify a list of SUMs associated with the package. In another embodiment, SUMs for the package may be determined based on dependencies. For example, if a first SUM is included in the package and depends on a second SUM, the second SUM may be included in the package. In some implementations, packages may be configured based on attributes of a device requesting an update. Accordingly, if the second SUM was previously installed on the device, the second SUM may not be included in the package, but if the second SUM was not previously installed on the device, the second SUM may be included in the package.

A determination may be made at 1917 whether there remain more SUMs to configure. For example, there may be more SUMs to configure until the REDUP administrator indicates otherwise. If there remain more SUMs to configure, the next SUM may be selected at 1921. The SUM (e.g., a ZIP file) may be added to the package at 1925. Rules for the SUM may be determined at 1929. For example, the REDUP administrator may specify rules (e.g., dependencies, restrictions) associated with the SUM. The determined rules may be associated with the SUM at 1933. For example, the rules may be saved in a rules file and included in the ZIP file associated with the SUM.

If it is determined that there are no SUMs remaining to be configured, the package may be validated at 1937. In one embodiment, dependencies and/or restrictions may be checked. For example, a check may be performed to ensure that SUMs upon which other SUMs depend are included in the package. In another example, a check may be performed to ensure that a component (e.g., ECU) upon which a SUM in the package depends is a part of each segment to which the package is applicable. In another embodiment, a confirmation may be obtained from a REDUP administrator (e.g., via a REDUP user interface) that parameters have been specified correctly.

Figure 20:
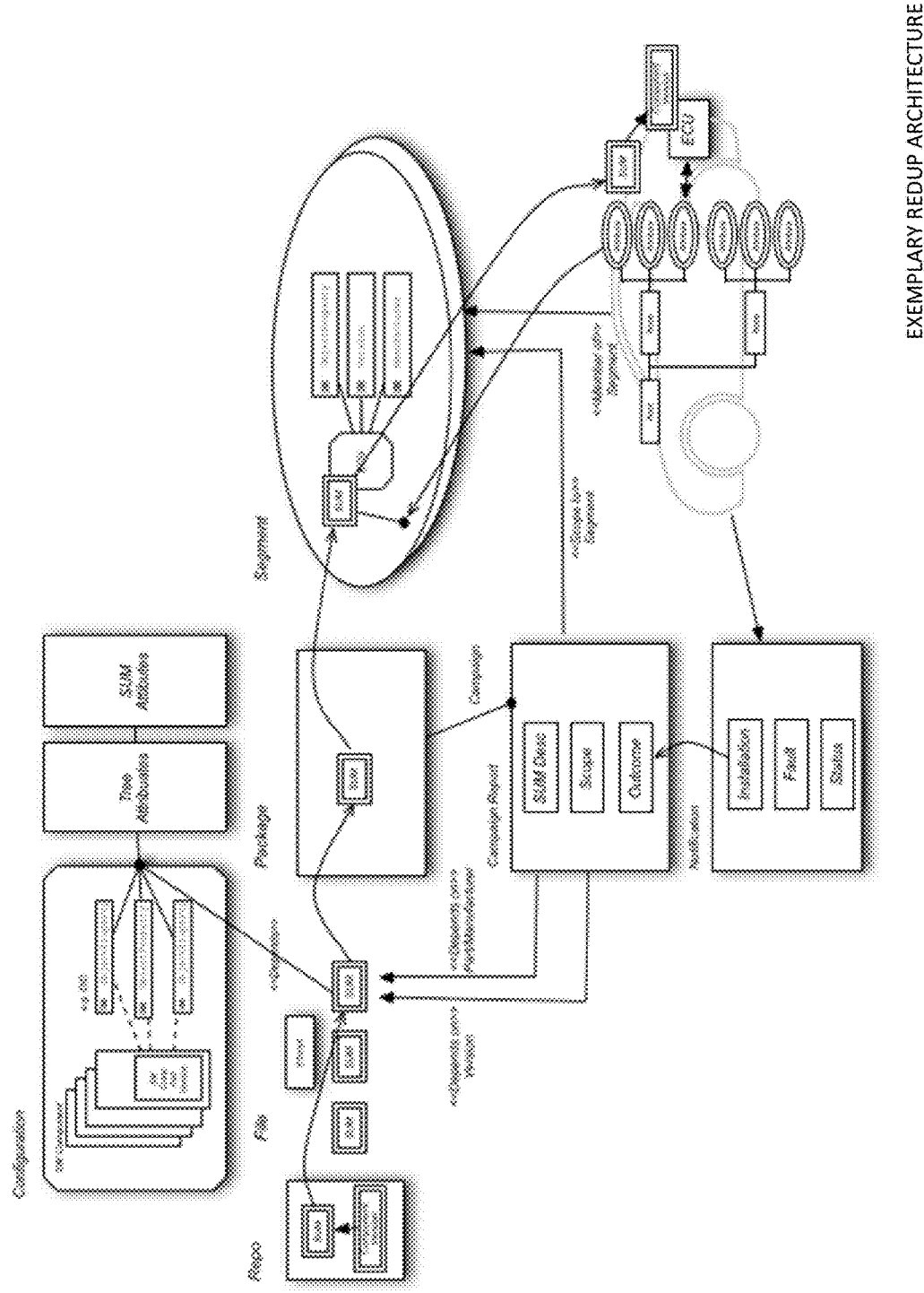
FIG. 20 shows an exemplary architecture for the REDUP.

FIG. 20 shows an exemplary architecture for the REDUP. In FIG. 20, an overview illustrating relationships between products, update packages and SUMs, and product segments is shown. Component software versions are managed via software lifecycle management processes on the backend (e.g., by third party vendors).

SUMs are created to facilitate changing the version of a product component from one to another. In one embodiment, SUMs may be created via a REDUP workflow (e.g., as described with regard to FIG. 2). In another embodiment, SUMs may be created by third party vendors (e.g., third party vendors may sign their SUMs for security purposes). A SUM may have dependencies that link the SUM to product components (e.g., ECUs) and/or to other SUMs and/or to parameters of the OMA-DM tree (e.g., vehicle VIN number).

SUMs may be organized into packages. Packages may provide a convenient bag for SUMs managed and published at the same time. Packages may be published onto segments. The segment may manage components (e.g., ECUs) for the SUMs in a package. Packages may be linked to update campaigns. A campaign for a software update may facilitate publishing packages from the cloud to a product (e.g., a vehicle) and results of the campaign may be subsequently reported back to the cloud. Publishing a package may involve sending out notifications to products (e.g., vehicles) that are members of the segment. When notified, the products may request installers to update the attributes in the tree and then request the server to download any SUMs. SUMs are routed to the correct installers (e.g., different components may utilize different installers) and executed. An installation report may be delivered back to the cloud indicating success of failure of the update session. This also facilitates measuring the effectiveness of the campaign.

Figure 21:
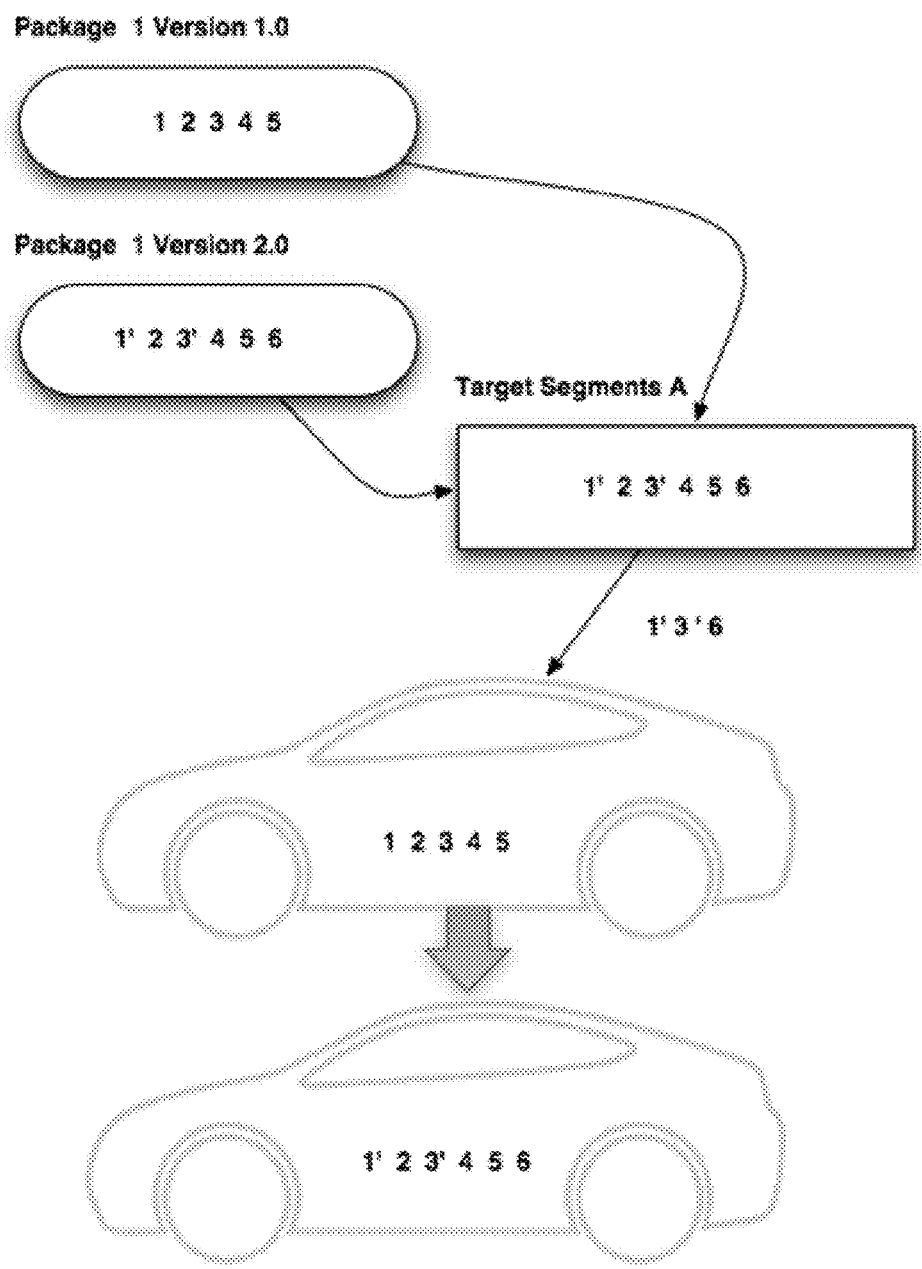
FIG. 21 shows an exemplary model for the REDUP.

FIG. 21 shows an exemplary model for the REDUP. In FIG. 21, an example illustrating how a device (e.g., a vehicle) may be updated using the REDUP is shown. In this example, the vehicle is associated with segment A and starts in a specified state. As shown, the vehicle starts with an initial versions of components (e.g., a set software applications) 1, 2, 3, 4, and 5. For example, these components may have been delivered to the vehicle in package 1 version 1.0. An update for segment A may be provided using package 1 version 2.0 with components 1', 2, 3', 4, 5, and 6. The ' character denotes an updated version of the previous version of software (e.g., 2' is an update version of component 2, while 6 is an initial version of a new component). Based on the initial state reported by the vehicle to an update server, the server may determine that the vehicle should download components 1', 3', and 6. Components 2, 4, and 5 are not downloaded because they are already installed. After the update the vehicles includes components 1', 2, 3', 4, 5, and 6.

Figure 22:
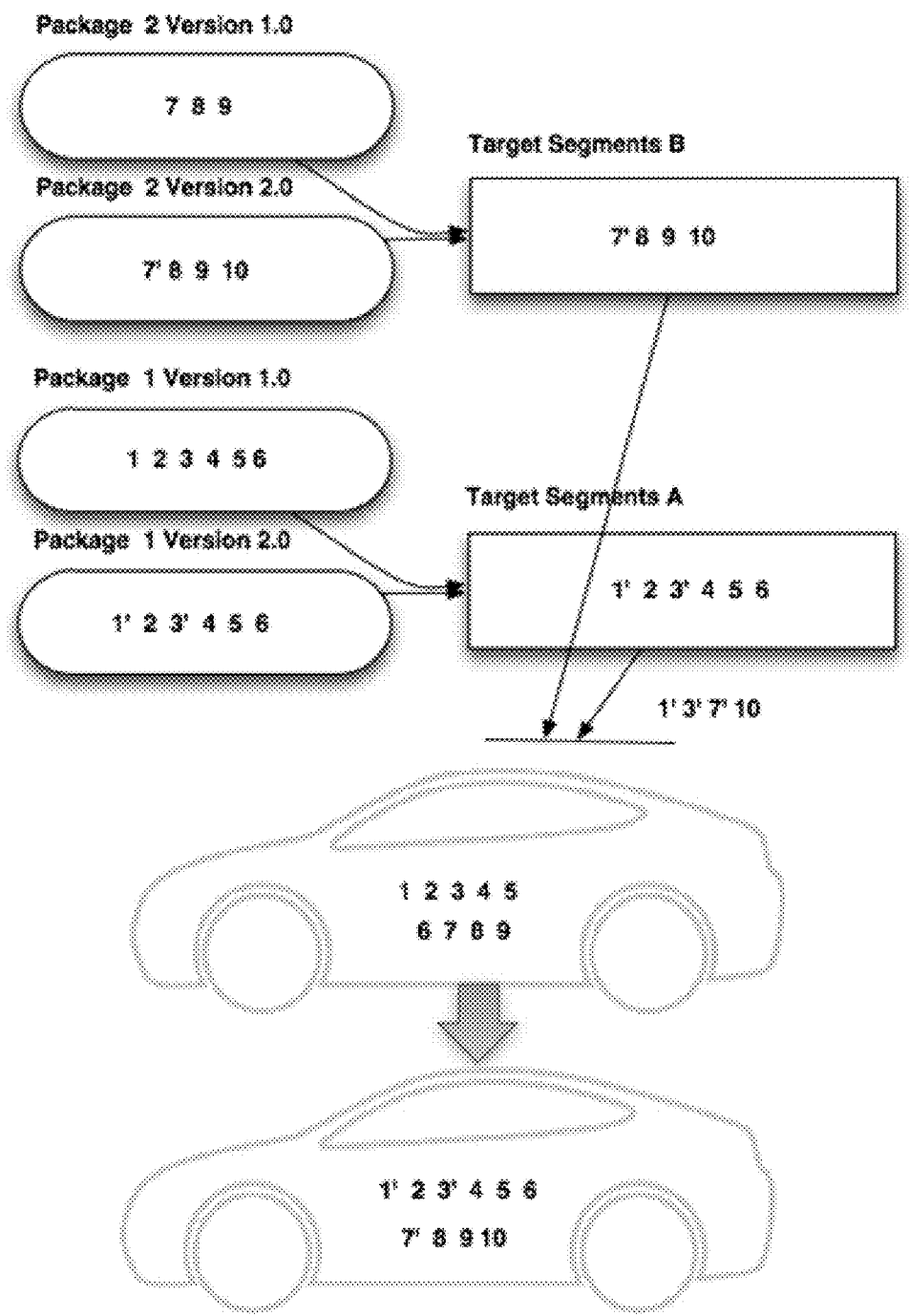
FIG. 22 shows an exemplary model for the REDUP.

FIG. 22 shows an exemplary model for the REDUP. In FIG. 22, an example illustrating how a device (e.g., a vehicle) may be updated using the REDUP is shown. In this example, the vehicle is associated with segments A and B and starts in a specified state. As shown, the vehicle starts with an initial versions of components (e.g., a set software applications) 1, 2, 3, 4, 5, 6, 7, 8, and 9. For example, these components may have been delivered to the vehicle in package 1 version 1.0 and in package 2 version 1.0. An update for segment A may be provided using package 1 version 2.0 with components 1', 2, 3', 4, 5, and 6. An update for segment B may be provided using package 2 version 2.0 with components 7', 8, 9, and 10. Based on the initial state reported by the vehicle to an update server, the server may determine that the vehicle should download components 1', 3', 7', and 10. Components 2, 4, 5, 6, 8, and 9 are not downloaded because they are already installed. After the updates the vehicles includes components 1', 2, 3', 4, 5, 6, 7', 8, 9, and 10. The components could be delivered and installed in the vehicle via multiple installers.

Figure 23:
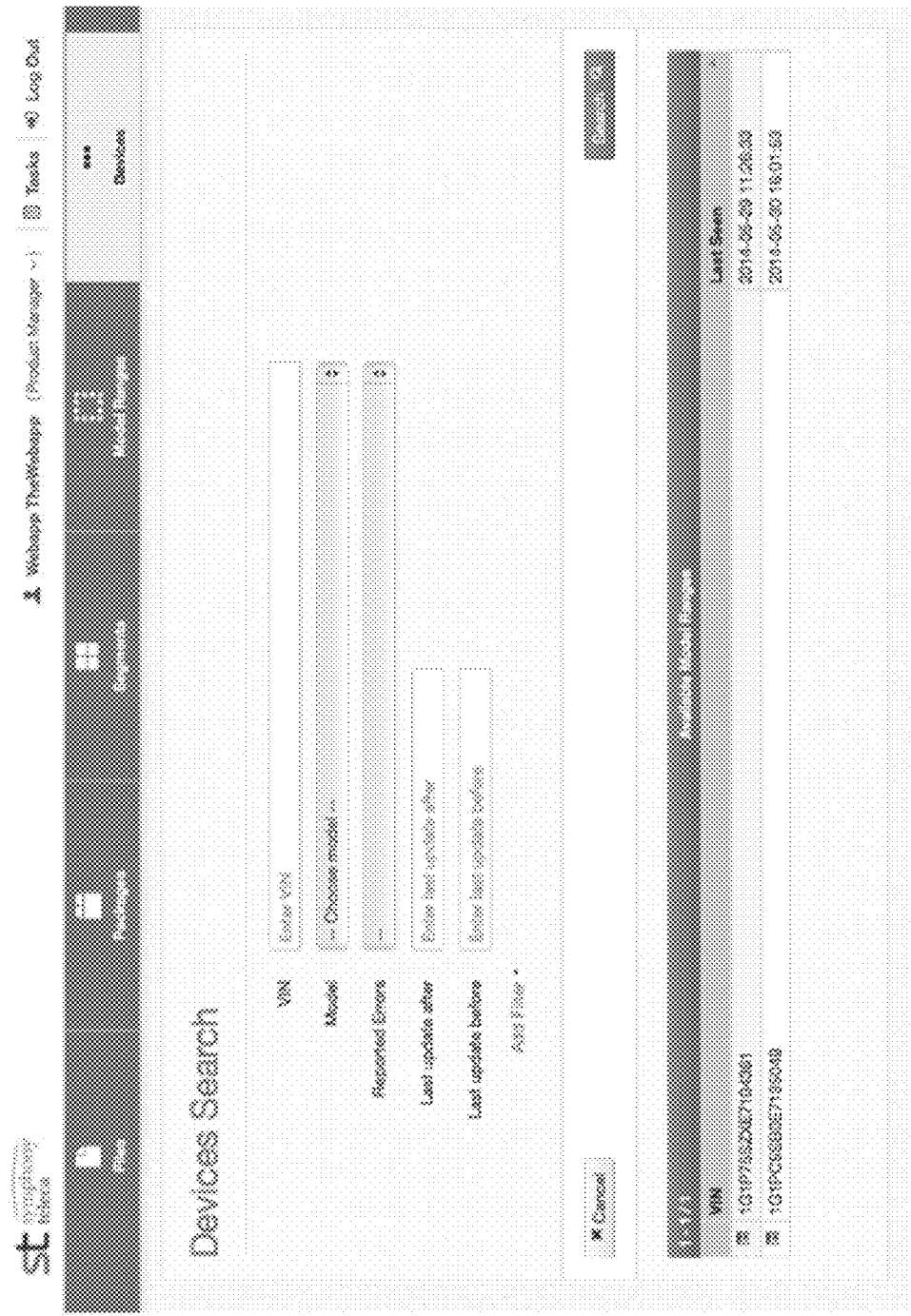
FIG. 23 shows a screenshot diagram illustrating embodiments of the REDUP.

FIG. 23 shows a screenshot diagram illustrating embodiments of the REDUP. In FIG. 23, an exemplary REDUP user interface is shown that allows a REDUP administrator to search for devices (e.g., vehicles) satisfying specified criteria. In various implementations, criteria may include a vehicle VIN number, a vehicle model, reported errors associated with the vehicle, date and/or time when the device was last updated, segments associated with the vehicle, components and/or component versions associated with the vehicle, and/or the like. For example, a vehicle with a VIN ending in digits 361 may be selected for analysis.

Figure 24:
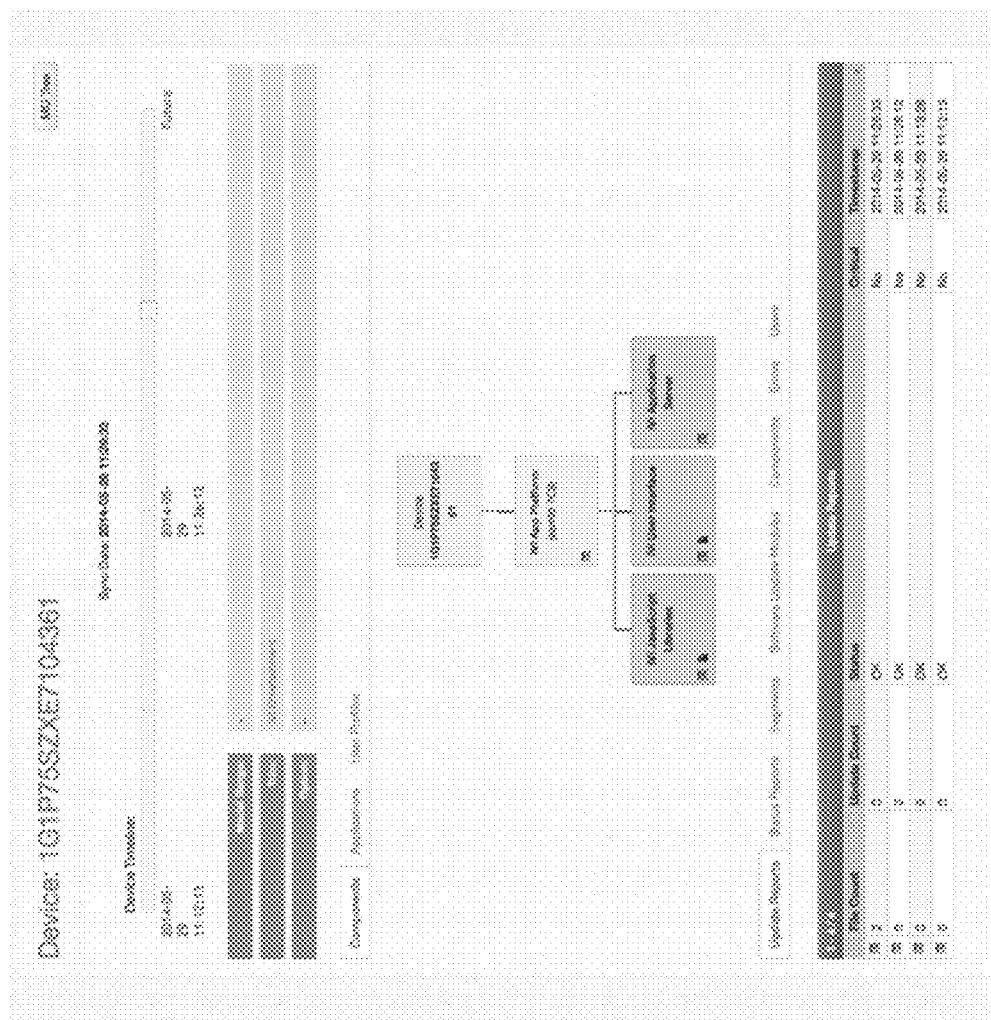
FIG. 24 shows a screenshot diagram illustrating embodiments of the REDUP.

FIG. 24 shows a screenshot diagram illustrating embodiments of the REDUP. In FIG. 24, a tool that showcases vehicle status as of different updates is illustrated. For example, the tool may be utilized to show that status of the vehicle with a VIN ending in digits 361 as of different update times. In one embodiment, this may be accomplished by clicking on different point on the device timeline (e.g., a slider widget) to see a diagram of device components as of selected point in time. In one implementation, the tool may show a future status as of the next anticipated update. For example, this may facilitate testing of an update package by verifying that the future status of device components that results due to the update is correct.

Figure 25:
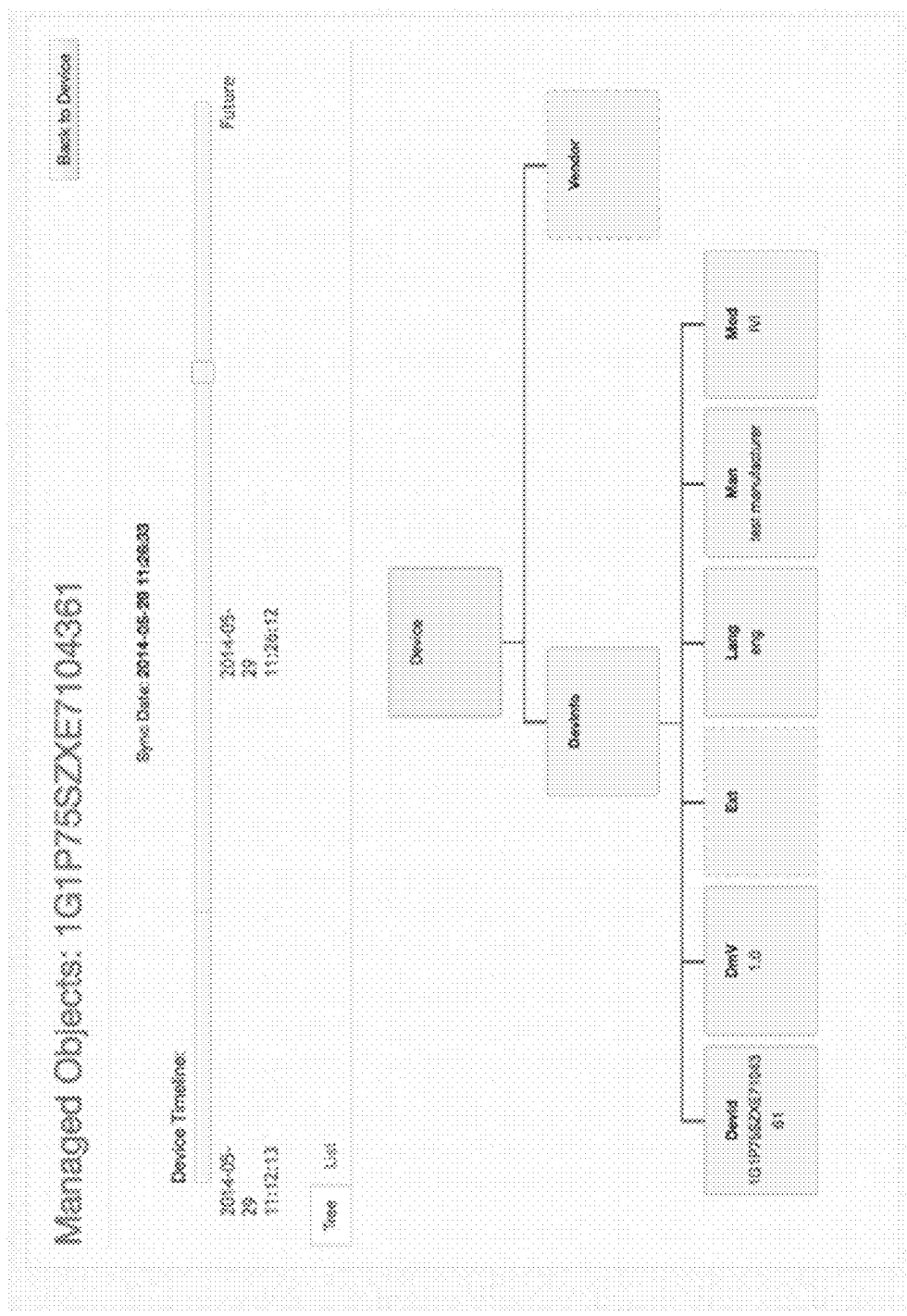
FIG. 25 shows a screenshot diagram illustrating embodiments of the REDUP.

FIG. 25 shows a screenshot diagram illustrating embodiments of the REDUP. In FIG. 25, a tool that showcases vehicle status as of different updates is illustrated. For example, the tool may be utilized to show that status of the vehicle with a VIN ending in digits 361 as of different update times. In one embodiment, this may be accomplished by clicking on different point on the device timeline (e.g., a slider widget) to see a diagram of managed objects as of selected point in time. In one implementation, the tool may show a future status as of the next anticipated update. For example, this may facilitate testing of an update package by verifying that the future status of managed objects that results due to the update is correct.

Figure 26:
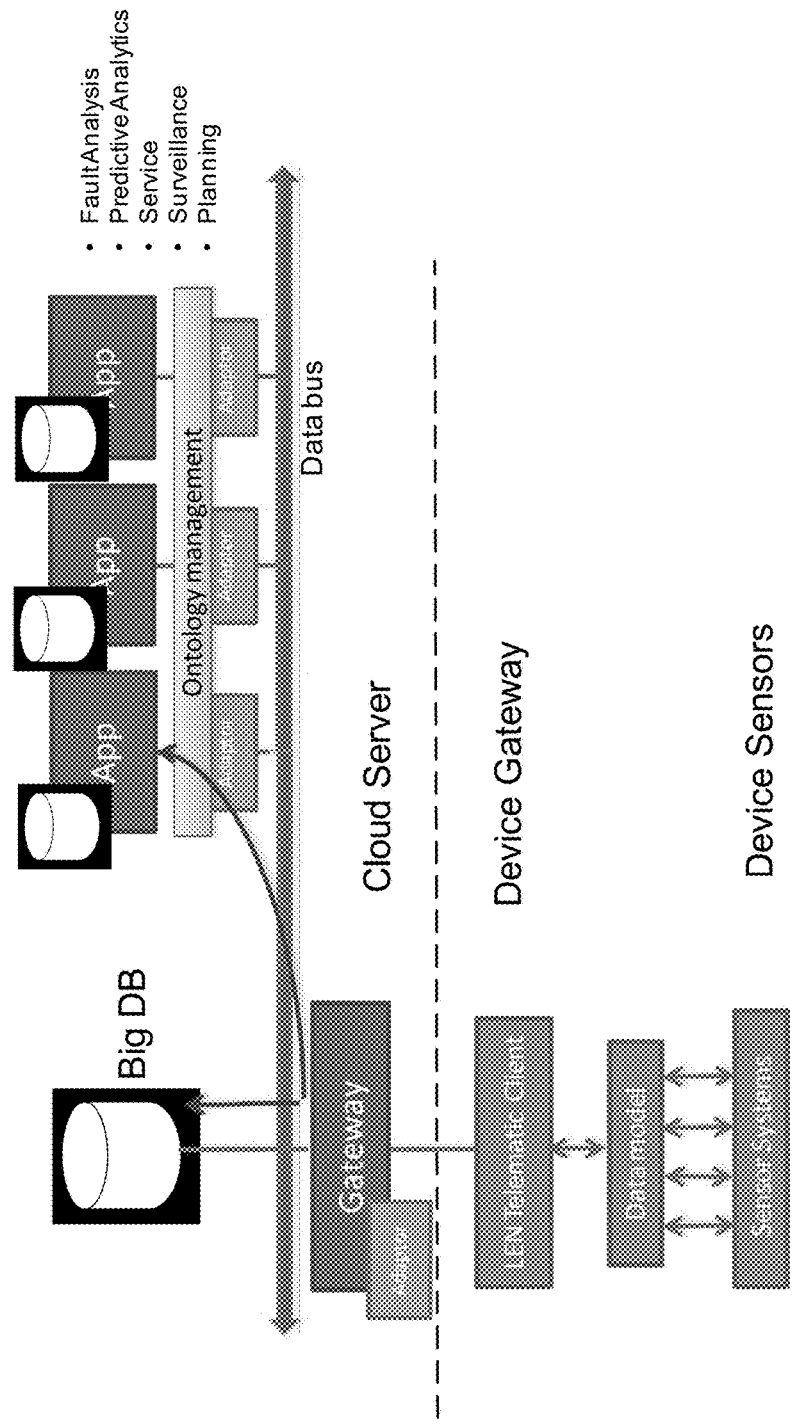
FIG. 26 shows an exemplary architecture for the REDUP.

FIG. 26 shows an exemplary architecture for the REDUP. In FIG. 26, sensors of a connected device may provide a variety of event data. Events maybe logged in accordance with a data model. In one embodiment, the data model may be specified by ontologies. See FIGS. 30 and 31 for examples of ontologies. Logged events may be delivered by a log event notification (LEN) client to a cloud server for storage in a big data storage repository and/or databases of individual analytics applications. Adapters may be utilized to filter and/or format logged events data in accordance with each database's specifications. Logged events data may be utilized in a variety of analytics applications including fault analysis, predictive analytics, service (e.g., warranty repair predictions), surveillance, planning (e.g., future products), inference-based analytics, and/or the like.

Figure 27:
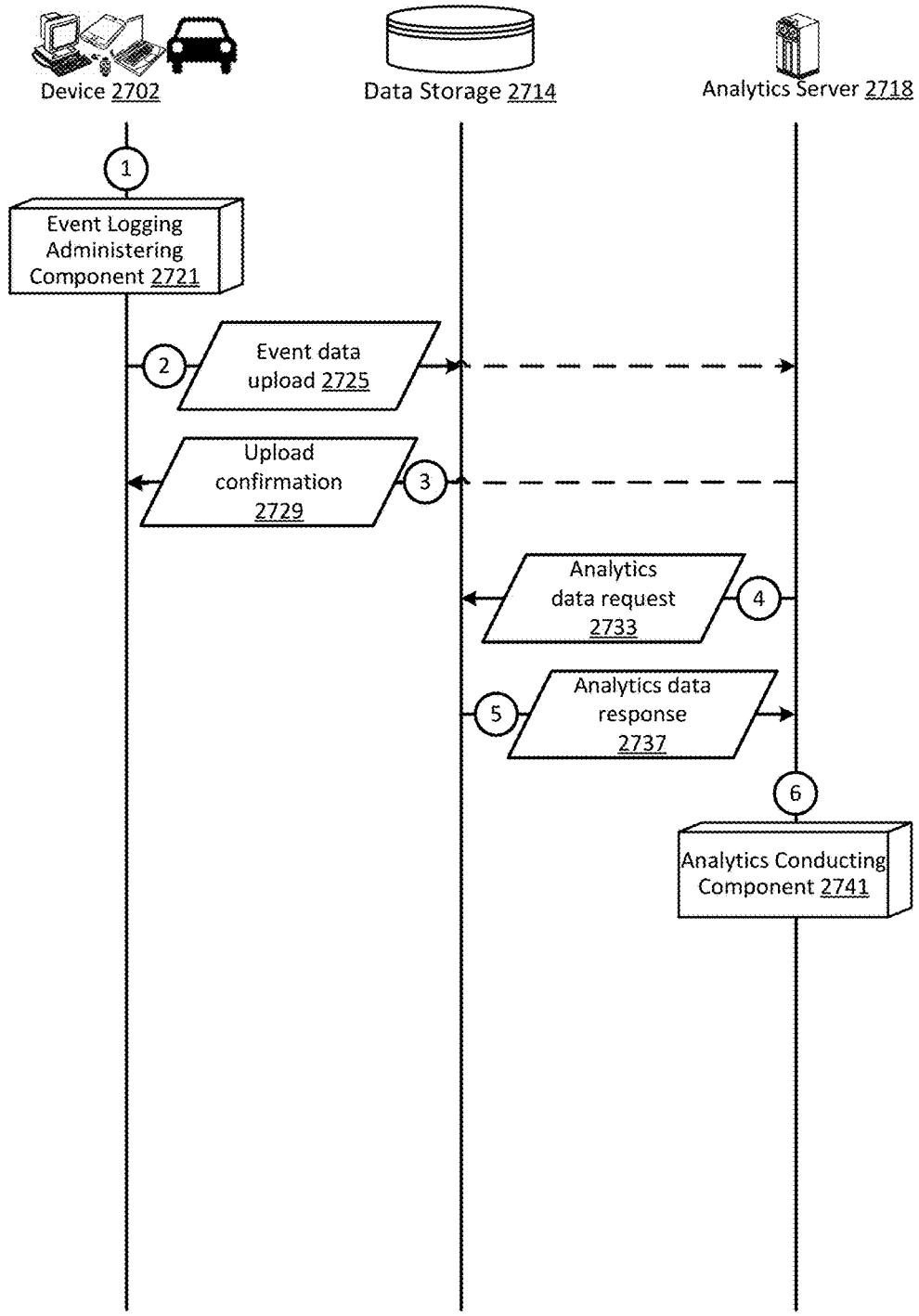
FIG. 27 shows a datagraph diagram illustrating embodiments of a data flow for the REDUP.

FIG. 27 shows a datagraph diagram illustrating embodiments of a data flow for the REDUP. In FIG. 27, dashed arrows indicate data flow elements that may be more likely to be optional. In FIG. 27, a connected device 2702 may log events and upload logged events data using an even logging administering (ELA) component 2721. See FIG. 28 for additional details regarding the ELA component.

The device may upload logged events data 2725 to a data storage 2714 and/or to an analytics server 2718. For example, logged events data may be uploaded to the data storage comprising a cloud data storage repository. In another example, logged events data may be uploaded to a database of the analytics server, which is associated with an analytics application. In one implementation, logged events data may be uploaded using a resource description framework (RDF) file format. See FIG. 32 for an example of a RDF file. In some embodiments, the data storage and/or the analytics server may send an upload confirmation 2729 to confirm receipt of uploaded logged events data.

The analytics server may send an analytics data request 2733 to the data storage or to a third party database. For example, the analytics data request may be utilized to obtain additional data utilized in conducting analytics. In some implementations, data from a variety of databases (e.g., logged events data, third party data) may be obtained and combined (e.g., by combining graphs) by the analytics server to conduct analytics. For example, the analytics server may provide the following example analytics data request, substantially in the form of a HTTP(S) POST message including XML-formatted data, as provided below:

```
POST /analytics_data_request.php HTTP/1.1
Host: www.server.com
Content-Type: Application/XML
Content-Length: 667
<?XML version = "1.0" encoding = "UTF-8"?>
<analytics_data_request>
    <analytics_server_identifier>ID_AnalyticsServer1
</analytics_server_identifier>
    <requested_data>"specification of requested data"</requested_data>
</analytics_data_request>
```

The data storage or the third party database may send an analytics data response 2737 with the requested data (e.g., in RDF file format) to the analytics server.

The analytics server may conduct analytics using an analytics conducting (AC) component 2741. See FIG. 29 for additional details regarding the AC component.

Figure 28:
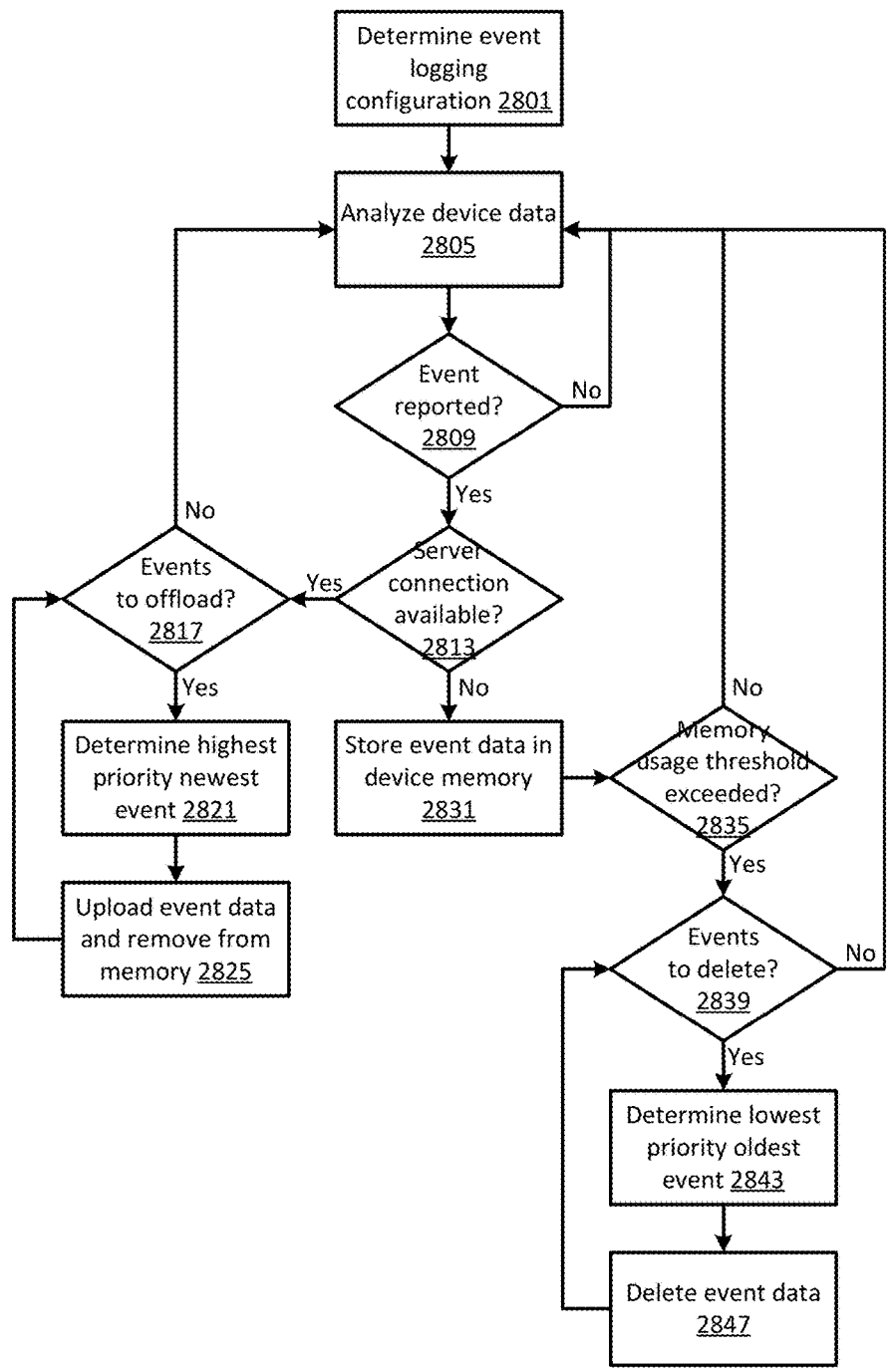
FIG. 28 shows a logic flow diagram illustrating embodiments of an event logging administering (ELA) component for the REDUP.

FIG. 28 shows a logic flow diagram illustrating embodiments of an event logging administering (ELA) component for the REDUP. In FIG. 28, event logging configuration may be determined at 2801. For example, settings associated with a connected device may be examined to determine what kinds of events to log, the format in which to log events data, memory usage thresholds, and/or the like.

Device data may be analyzed at 2809. For example, device data may be analyzed to determine software and configuration updates events, system fault and performance events, system service usage notifications, installation and configuration events, app usage data, app error events, telematic data, and/or the like events that should be logged.

A determination may be made at 2809 whether an event that should be logged was reported. If so, a determination may be made at 2813 whether a connection to a server is available. For example, it may be determined whether a connection with the server has been established, and, if not, an attempt to establish a connection with the server may be made. In another example, it may be determined that there is no network connectivity, and, therefore, a connection with the server is not available.

If it is determined that a connection with the server is available, a determination may be made at 2817 whether there are events to offload to the server. In one implementation, the currently reported event may be offloaded to the server. In another implementation, previously reported events that have not yet been offloaded to the server (e.g., because there was no network connectivity until now) may be offloaded to the server. If there remain events to offload to the server, the highest priority newest event may be determined (e.g., based on the value of a priority data field associated with the event) at 2821. In various implementations, a variety of ways may be utilized to determine the highest priority newest event. For example, first, events with a timestamp within the last hour may be offloaded with the highest priority events offloaded first; second, events with a timestamp within the last day may be offloaded with the highest priority events offloaded first; third, events with a timestamp within the last week may be offloaded with the highest priority events offloaded first; and so on. Thus, if network connectivity is lost during offloading, the more important events have a higher chance of being offloaded to the server. Data for the determined event may be uploaded to the server and removed from device memory at 2825. In one implementation, event data may be uploaded using RDF file format. In various implementations, event data may be stored on the device in volatile memory or in non-volatile memory (e.g., when the volatile memory is too full).

If it is determined that a connection with the server is not available, event data may be stored in device memory at 2835 so that it may be offloaded to the server at a later time. In one implementation, event data may be stored in faster volatile memory. In another implementation, if the volatile memory is too full, some of the data (e.g., data for lowest priority oldest events) may be transferred to slower non-volatile memory. A determination may be made at 2835 whether a memory usage threshold for events data has been exceeded. For example, the memory usage threshold may be exceeded for volatile memory (e.g., if the device does not use non-volatile memory to store events). In another example, the memory usage threshold may be exceeded for non-volatile memory (e.g., if the device uses non-volatile memory to store events). If it is determined that the memory usage threshold has been exceeded, a determination may be made at 2839 whether there remain events to delete. In one implementation, events may be deleted until memory usage falls below the memory usage threshold. If there remain events to delete, the lowest priority oldest event may be determined at 2843. In various implementations, a variety of ways may be utilized to determine the lowest priority oldest event. For example, first, events with a timestamp older than within the last week may be deleted with the lowest priority events deleted first; second, events with a timestamp older than within the last day may be deleted with the lowest priority events deleted first; third, events with a timestamp older than within the last hour may be deleted with the lowest priority events deleted first; and so on. Thus, if there is not enough memory to store events data, the less important events may be deleted first. Data for the determined event may be deleted from device memory (e.g., volatile memory, non-volatile memory) at 2847.

Figure 29:
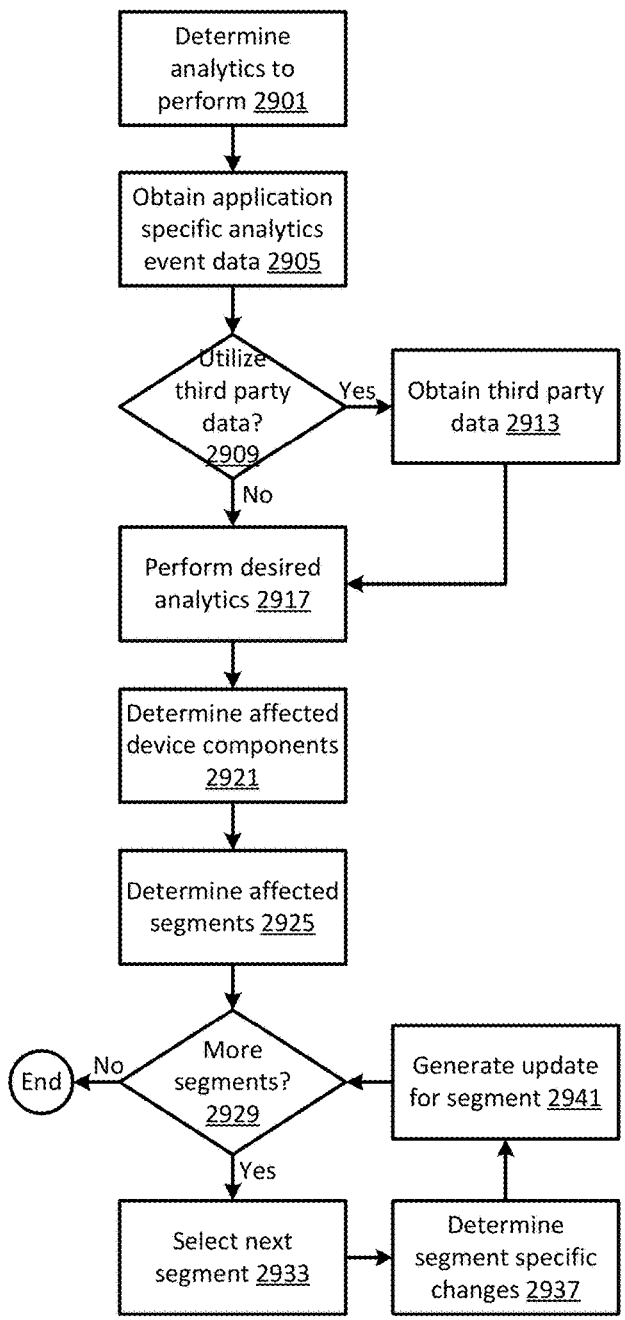
FIG. 29 shows a logic flow diagram illustrating embodiments of an analytics conducting (AC) component for the REDUP.

FIG. 29 shows a logic flow diagram illustrating embodiments of an analytics conducting (AC) component for the REDUP. In FIG. 29, analytics to perform may be determined at 2901. In various implementation, analytics to perform may include fault analysis, predictive analytics, service (e.g., warranty repair predictions), surveillance, planning (e.g., future products), inference-based analytics, and/or the like.

Application specific analytics event data may be obtained at 2905. In one implementation, application specific analytics event data may be obtained from a database associated with the application. In another implementation, application specific analytics event data may be obtained from a big data storage repository. In some implementations, federated querying (e.g., using SPARQL standard) may be used to obtain and combine data from a plurality of sources. See FIG. 33 for an example of federated querying.

A determination may be made at 2909 whether to utilize third party data. For example, this determination may be made based on parameters of the analytics application. If it is determined that third party data should be utilized, third party data may be obtained at 2913. In one implementation, third party data may be obtained from one or more third party databases. In some implementations, federated querying (e.g., using SPARQL standard) may be used to obtain and combine data from a plurality of sources (e.g., from a plurality of application specific and third party sources). See FIG. 33 for an example of federated querying.

Desired analytics may be performed at 2917. In one embodiment, analytics may be performed to determine issues with devices and/or with device components. See FIG. 34 for an example of analytics. Affected device components may be determined based on performed analytics at 2921. For example, an ECU with a bug in the firmware may be detected. Segments affected by the issue may be determined at 2925. In one implementation, segments affected by the issue may be determined via a MySQL database command similar to the following:

```
SELECT segmentID
FROM Segments
WHERE componentList LIKE "identifier of the ECU with a bug";
```

A determination may be made at 2929 whether there remain more affected segments to process. In one embodiment, each of the affected segments may be processed (e.g., in a priority order based on the severity of the issue with regard to the segment, in a priority order based on the importance (e.g., size, value) of the segment). If it is determined that there remain more affected segments to process, the next segment may be selected at 2933. Segment specific changes to fix the issue may be determined at 2937 and an update for the segment may be generated at 2941. The update may be distributed to devices using the REDUP.

Figure 30:
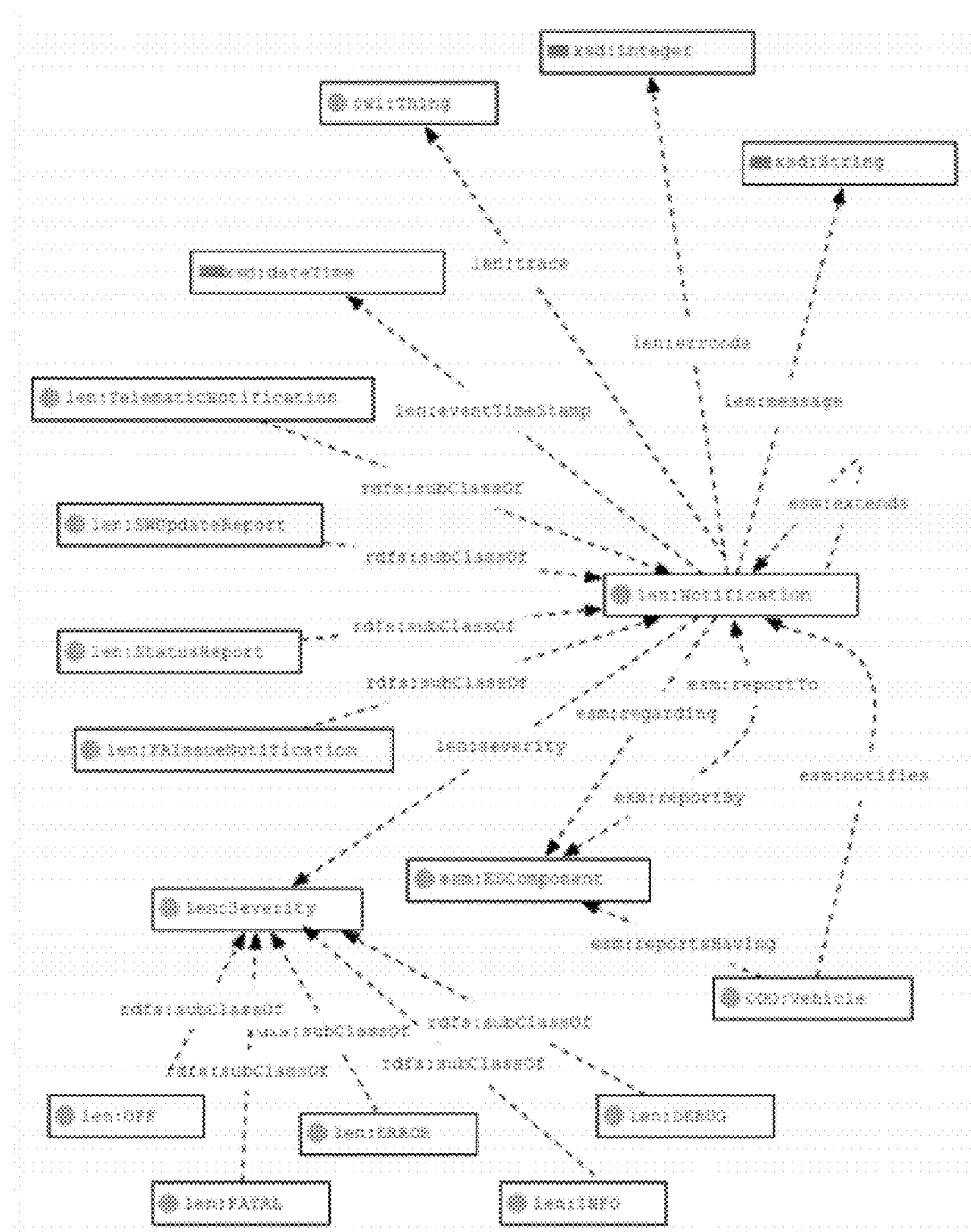
FIG. 30 shows an exemplary log event notification (LEN) ontology.

FIG. 30 shows an exemplary log event notification (LEN) ontology. In FIG. 30, the LEN ontology describes log reports. For example, log reports may be used to convey the status of embedded systems software. In one embodiment, notifications may be raised by one component on another component. In various implementations, reports may include a SWUpdateReport type that provides information on status of a software update, a StatusReport type that provides a general status update on a component of a device (e.g., a vehicle), a TelematicNotification type that provides logs of data such as location, a FAIssueNotification type that provides an indication of a function affecting fault in a device, and/or the like. A report may have multiple components. For example, a SWUpdateReport for an update may have a LogReport that gives more information on the status after the update.

Figure 31:
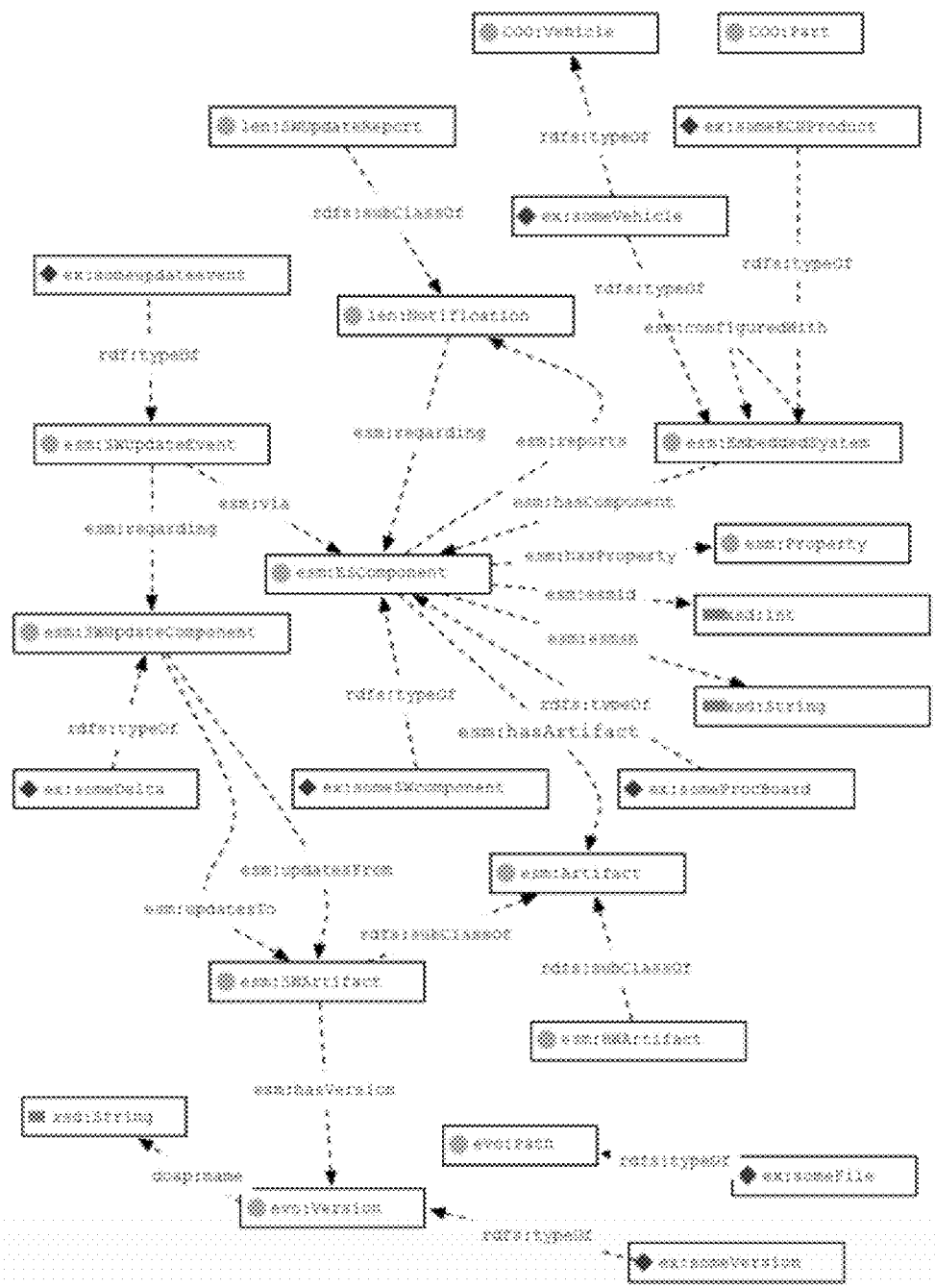
FIG. 31 shows an exemplary embedded systems (ESM) ontology.

FIG. 31 shows an exemplary embedded systems (ESM) ontology. In FIG. 31, the ESM ontology describes the structure of components and their update status. In one embodiment, the ESM ontology allows specification of versioned components. The range of notification may be something of type ESComponent (e.g., components of CI and HTML5 applications). Components may be versioned so that a cloud server may link individual classes and components to versions stored in a repository. In various implementations, an application (e.g., an HTML5 application) may log event data using RDF file format, strings, and/or the like. The cloud server may search for logs relating to the application or to a version of the application, and apply an application specific ontology to the event data to give it meaning.

FIG. 32 shows an exemplary resource description framework (RDF) file. In FIG. 32, a RDF file describes the base model of an Audi A4 B8 sedan. RDF files may be used to transfer data between a connected device and a server.

FIG. 33 shows an exemplary federated query for the REDUP. In FIG. 33, a federated query may be utilized to obtain data from two different services provided by dbpedia.org and linkedmdb.org. Various ontologies (e.g., specified in the PREFIX lines) may be applied to transform the data into a desired format.

Figure 34:
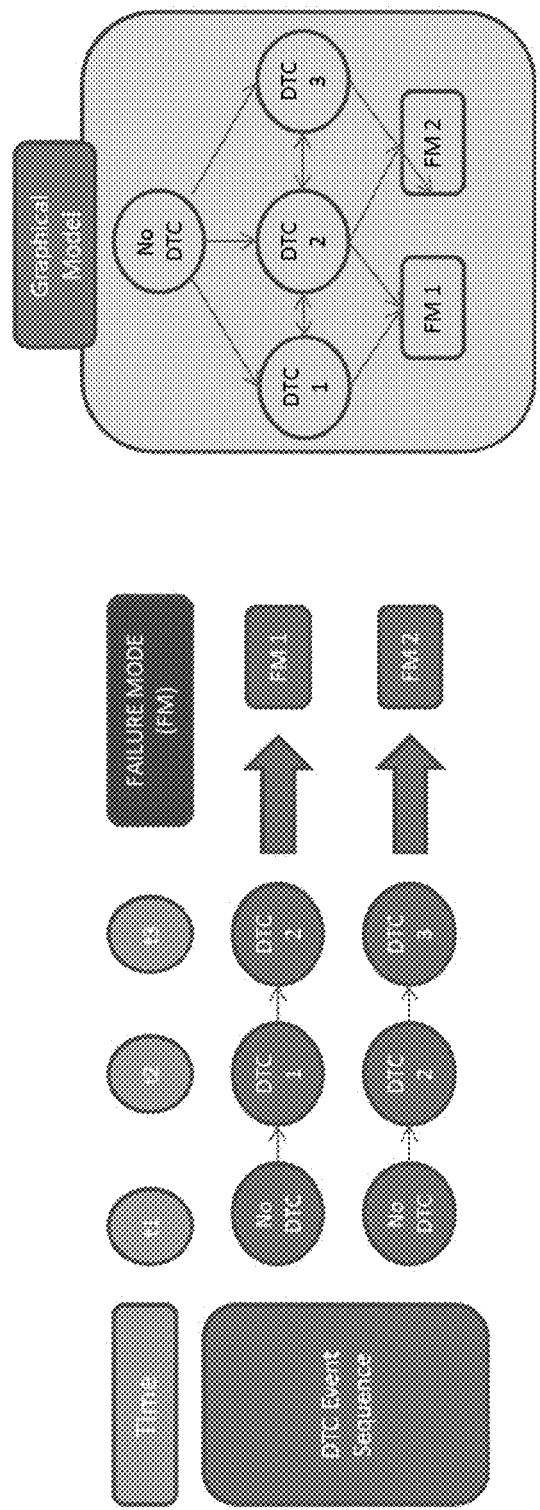
FIG. 34 shows an exemplary failure mode analytics model for the REDUP.

FIG. 34 shows an exemplary failure mode analytics model for the REDUP. In FIG. 34, the value of analyzing event data collected by the REDUP is illustrated. Various failure modes associated with a vehicle may be determined based on analysis of diagnostic trouble codes (DTCs) event data logged by the vehicle. For example, if the vehicle logged DTC 1 and subsequently DTC 2, failure mode 1 may be detected. In another example, if the vehicle logged DTC 2 and subsequently DTC 3, failure mode 2 may be detected. Thus, depending on the detected failure mode, an issue with the vehicle may be identified and an update to fix the issue may be generated.

REDUP Controller

Figure 35:
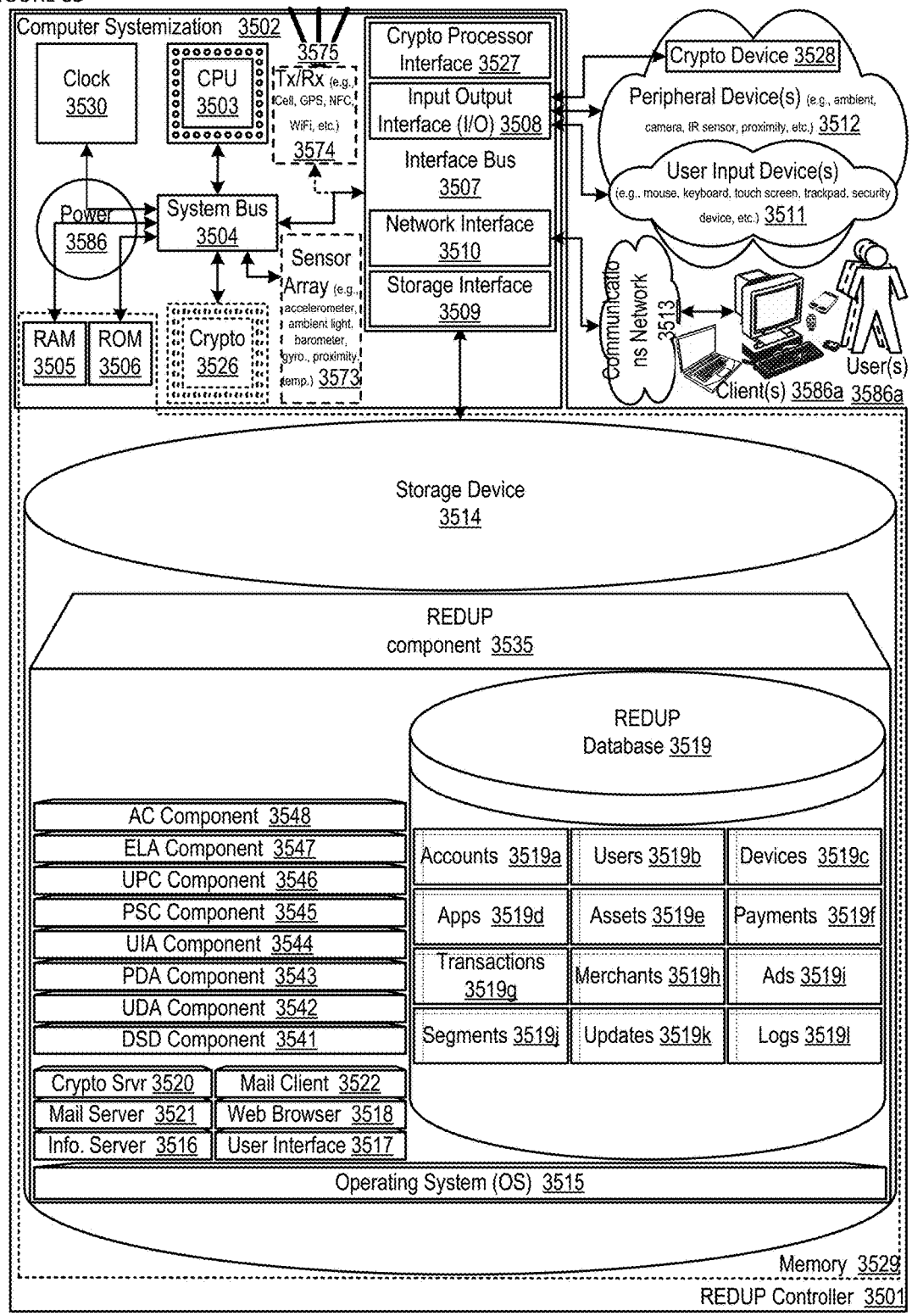
FIG. 35 shows a block diagram illustrating embodiments of a REDUP controller; and
APPENDICES 1-8 illustrate additional alternative embodiments of the REDUP.

FIG. 35 shows a block diagram illustrating embodiments of a REDUP controller. In this embodiment, the REDUP controller 3501 may serve to aggregate, process, store, search, serve, identify, instruct, generate, match, and/or facilitate interactions with a computer through embedded software technologies, and/or other related data.

Typically, users, which may be people and/or other systems, may engage information technology systems (e.g., computers) to facilitate information processing. In turn, computers employ processors to process information; such processors 3503 may be referred to as central processing units (CPU). One form of processor is referred to as a microprocessor. CPUs use communicative circuits to pass binary encoded signals acting as instructions to enable various operations. These instructions may be operational and/or data instructions containing and/or referencing other instructions and data in various processor accessible and operable areas of memory 3529 (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations. One type of program is a computer operating system, which, may be executed by CPU on a computer; the operating system enables and facilitates users to access and operate computer information technology and resources. Some resources that may be employed in information technology systems include: input and output mechanisms through which data may pass into and out of a computer; memory storage into which data may be saved; and processors by which information may be processed. These information technology systems may be used to collect data for later retrieval, analysis, and manipulation, which may be facilitated through a database program. These information technology systems provide interfaces that allow users to access and operate various system components.

In one embodiment, the REDUP controller 3501 may be connected to and/or communicate with entities such as, but not limited to: one or more users from peripheral devices 3512 (e.g., user input devices 3511); an optional cryptographic processor device 3528; and/or a communications network 3513.

Networks are commonly thought to comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The REDUP controller 3501 may be based on computer systems that may comprise, but are not limited to, components such as: a computer systemization 3502 connected to memory 3529.

Computer Systemization

A computer systemization 3502 may comprise a clock 3530, central processing unit ("CPU(s)" and/or "processor(s)" (these terms are used interchangeable throughout the disclosure unless noted to the contrary)) 3503, a memory 3529 (e.g., a read only memory (ROM) 3506, a random access memory (RAM) 3505, etc.), and/or an interface bus 3507, and most frequently, although not necessarily, are all interconnected and/or communicating through a system bus 3504 on one or more (mother)board(s) 3502 having conductive and/or otherwise transportive circuit pathways through which instructions (e.g., binary encoded signals) may travel to effectuate communications, operations, storage, etc. The computer systemization may be connected to a power source 3586; e.g., optionally the power source may be internal. Optionally, a cryptographic processor 3526 may be connected to the system bus. In another embodiment, the cryptographic processor, transceivers (e.g., ICs) 3574, and/or sensor array (e.g., accelerometer, altimeter, ambient light, barometer, global positioning system (GPS) (thereby allowing REDUP controller to determine its location), gyroscope, magnetometer, pedometer, proximity, ultra-violet sensor, etc.) 3573 may be connected as either internal and/or external peripheral devices 3512 via the interface bus I/O 3508 (not pictured) and/or directly via the interface bus 3507. In turn, the transceivers may be connected to antenna(s) 3575, thereby effectuating wireless transmission and reception of various communication and/or sensor protocols; for example the antenna(s) may connect to various transceiver chipsets (depending on deployment needs), including: Broadcom BCM4329FKUBG transceiver chip (e.g., providing 802.11n, Bluetooth 2.1+EDR, FM, etc.); a Broadcom BCM4752 GPS receiver with accelerometer, altimeter, GPS, gyroscope, magnetometer; a Broadcom BCM4335 transceiver chip (e.g., providing 2G, 3G, and 4G long-term evolution (LTE) cellular communications; 802.11ac, Bluetooth 4.0 low energy (LE) (e.g., beacon features)); a Broadcom BCM43341 transceiver chip (e.g., providing 2G, 3G and 4G LTE cellular communications; 802.11g/, Bluetooth 4.0, near field communication (NFC), FM radio); an Infineon Technologies X-Gold 618-PMB9800 transceiver chip (e.g., providing 2G/3G HSDPA/HSUPA communications); a MediaTek MT6620 transceiver chip (e.g., providing 802.11a/ac/b/g/n, Bluetooth 4.0 LE, FM, GPS; a Lapis Semiconductor ML8511 UV sensor; a maxim integrated MAX44000 ambient light and infrared proximity sensor; a Texas Instruments WiLink WL1283 transceiver chip (e.g., providing 802.11n, Bluetooth 3.0, FM, GPS); and/or the like. The system clock typically has a crystal oscillator and generates a base signal through the computer systemization's circuit pathways. The clock is typically coupled to the system bus and various clock multipliers that will increase or decrease the base operating frequency for other components interconnected in the computer systemization. The clock and various components in a computer systemization drive signals embodying information throughout the system. Such transmission and reception of instructions embodying information throughout a computer systemization may be commonly referred to as communications. These communicative instructions may further be transmitted, received, and the cause of return and/or reply communications beyond the instant computer systemization to: communications networks, input devices, other computer systemizations, peripheral devices, and/or the like. It should be understood that in alternative embodiments, any of the above components may be connected directly to one another, connected to the CPU, and/or organized in numerous variations employed as exemplified by various computer systems.

The CPU comprises at least one high-speed data processor adequate to execute program components for executing user and/or system-generated requests. The CPU is often packaged in a number of formats varying from large supercomputer(s) and mainframe(s) computers, down to mini computers, servers, desktop computers, laptops, thin clients (e.g., Chromebooks), netbooks, tablets (e.g., Android, iPads, and Windows tablets, etc.), mobile smartphones (e.g., Android, iPhones, Nokia, Palm and Windows phones, etc.), wearable device(s) (e.g., watches, glasses, goggles (e.g., Google Glass), etc.), and/or the like. Often, the processors themselves will incorporate various specialized processing units, such as, but not limited to: integrated system (bus) controllers, memory management control units, floating point units, and even specialized processing sub-units like graphics processing units, digital signal processing units, and/or the like. Additionally, processors may include internal fast access addressable memory, and be capable of mapping and addressing memory 3529 beyond the processor itself; internal memory may include, but is not limited to: fast registers, various levels of cache memory (e.g., level 1, 2, 3, etc.), RAM, etc. The processor may access this memory through the use of a memory address space that is accessible via instruction address, which the processor can construct and decode allowing it to access a circuit path to a specific memory address space having a memory state. The CPU may be a microprocessor such as: AMD's Athlon, Duron and/or Opteron; Apple's A series of processors (e.g., A5, A6, A7, A8, etc.); ARM's application, embedded and secure processors; IBM and/or Motorola's DragonBall and PowerPC; IBM's and Sony's Cell processor; Intel's 80X86 series (e.g., 80386, 80486), Pentium, Celeron, Core (2) Duo, i series (e.g., i3, i5, i7, etc.), Itanium, Xeon, and/or XScale; Motorola's 680X0 series (e.g., 68020, 68030, 68040, etc.); and/or the like processor(s). The CPU interacts with memory through instruction passing through conductive and/or transportive conduits (e.g., (printed) electronic and/or optic circuits) to execute stored instructions (i.e., program code) according to conventional data processing techniques. Such instruction passing facilitates communication within the REDUP controller and beyond through various interfaces. Should processing requirements dictate a greater amount speed and/or capacity, distributed processors (e.g., see Distributed REDUP below), mainframe, multi-core, parallel, and/or super-computer architectures may similarly be employed. Alternatively, should deployment requirements dictate greater portability, smaller mobile devices (e.g., Personal Digital Assistants (PDAs)) may be employed.

Depending on the particular implementation, features of the REDUP may be achieved by implementing a microcontroller such as CAST's R8051XC2 microcontroller; Intel's MCS 51 (i.e., 8051 microcontroller); and/or the like. Also, to implement certain features of the REDUP, some feature implementations may rely on embedded components, such as: Application-Specific Integrated Circuit ("ASIC"), Digital Signal Processing ("DSP"), Field Programmable Gate Array ("FPGA"), and/or the like embedded technology. For example, any of the REDUP component collection (distributed or otherwise) and/or features may be implemented via the microprocessor and/or via embedded components; e.g., via ASIC, coprocessor, DSP, FPGA, and/or the like. Alternately, some implementations of the REDUP may be implemented with embedded components that are configured and used to achieve a variety of features or signal processing.

Depending on the particular implementation, the embedded components may include software solutions, hardware solutions, and/or some combination of both hardware/software solutions. For example, REDUP features discussed herein may be achieved through implementing FPGAs, which are a semiconductor devices containing programmable logic components called "logic blocks", and programmable interconnects, such as the high performance FPGA Virtex series and/or the low cost Spartan series manufactured by Xilinx. Logic blocks and interconnects can be programmed by the customer or designer, after the FPGA is manufactured, to implement any of the REDUP features. A hierarchy of programmable interconnects allow logic blocks to be interconnected as needed by the REDUP system designer/administrator, somewhat like a one-chip programmable breadboard. An FPGA's logic blocks can be programmed to perform the operation of basic logic gates such as AND, and XOR, or more complex combinational operators such as decoders or mathematical operations. In most FPGAs, the logic blocks also include memory elements, which may be circuit flip-flops or more complete blocks of memory. In some circumstances, the REDUP may be developed on regular FPGAs and then migrated into a fixed version that more resembles ASIC implementations. Alternate or coordinating implementations may migrate REDUP controller features to a final ASIC instead of or in addition to FPGAs. Depending on the implementation all of the aforementioned embedded components and microprocessors may be considered the "CPU" and/or "processor" for the REDUP.

Power Source

The power source 3586 may be of any standard form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 3586 is connected to at least one of the interconnected subsequent components of the REDUP thereby providing an electric current to all subsequent components. In one example, the power source 3586 is connected to the system bus component 3504. In an alternative embodiment, an outside power source 3586 is provided through a connection across the I/O 3508 interface. For example, a USB and/or IEEE 1394 connection carries both data and power across the connection and is therefore a suitable source of power.

Interface Adapters

Interface bus(ses) 3507 may accept, connect, and/or communicate to a number of interface adapters, conventionally although not necessarily in the form of adapter cards, such as but not limited to: input output interfaces (I/O) 3508, storage interfaces 3509, network interfaces 3510, and/or the like. Optionally, cryptographic processor interfaces 3527 similarly may be connected to the interface bus. The interface bus provides for the communications of interface adapters with one another as well as with other components of the computer systemization. Interface adapters are adapted for a compatible interface bus. Interface adapters conventionally connect to the interface bus via a slot architecture. Conventional slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 3509 may accept, communicate, and/or connect to a number of storage devices such as, but not limited to: storage devices 3514, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 3510 may accept, communicate, and/or connect to a communications network 3513. Through a communications network 3513, the REDUP controller is accessible through remote clients 3533b (e.g., computers with web browsers) by users 3533a. Network interfaces may employ connection protocols such as, but not limited to: direct connect, Ethernet (thick, thin, twisted pair 10/100/1000/10000 Base T, and/or the like), Token Ring, wireless connection such as IEEE 802.11a-x, and/or the like. Should processing requirements dictate a greater amount speed and/or capacity, distributed network controllers (e.g., see Distributed REDUP below), architectures may similarly be employed to pool, load balance, and/or otherwise decrease/increase the communicative bandwidth required by the REDUP controller. A communications network may be any one and/or the combination of the following: a direct interconnection; the Internet; Interplanetary Internet (e.g., Coherent File Distribution Protocol (CFDP), Space Communications Protocol Specifications (SCPS), etc.); a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a cellular, WiFi, Wireless Application Protocol (WAP), I-mode, and/or the like); and/or the like. A network interface may be regarded as a specialized form of an input output interface. Further, multiple network interfaces 3510 may be used to engage with various communications network types 3513. For example, multiple network interfaces may be employed to allow for the communication over broadcast, multicast, and/or unicast networks.

Input Output interfaces (I/O) 3508 may accept, communicate, and/or connect to user, peripheral devices 3512 (e.g., input devices 3511), cryptographic processor devices 3528, and/or the like. I/O may employ connection protocols such as, but not limited to: audio: analog, digital, monaural, RCA, stereo, and/or the like; data: Apple Desktop Bus (ADB), IEEE 1394a-b, serial, universal serial bus (USB); infrared; joystick; keyboard; midi; optical; PC AT; PS/2; parallel; radio; touch interfaces: capacitive, optical, resistive, etc. displays; video interface: Apple Desktop Connector (ADC), BNC, coaxial, component, composite, digital, Digital Visual Interface (DVI), (mini) displayport, high-definition multimedia interface (HDMI), RCA, RF antennae, S-Video, VGA, and/or the like; wireless transceivers: 802.11a/ac/b/g/n/x; Bluetooth; cellular (e.g., code division multiple access (CDMA), high speed packet access (HSPA(+)), high-speed downlink packet access (HSDPA), global system for mobile communications (GSM), long term evolution (LTE), WiMax, etc.); and/or the like. One typical output device may include a video display, which typically comprises a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Another output device is a television set, which accepts signals from a video interface. Typically, the video interface provides the composited video information through a video connection interface that accepts a video display interface (e.g., an RCA composite video connector accepting an RCA composite video cable; a DVI connector accepting a DVI display cable, etc.).

Peripheral devices 3512 may be connected and/or communicate to I/O and/or other facilities of the like such as network interfaces, storage interfaces, directly to the interface bus, system bus, the CPU, and/or the like. Peripheral devices may be external, internal and/or part of the REDUP controller. Peripheral devices may include: antenna, audio devices (e.g., line-in, line-out, microphone input, speakers, etc.), cameras (e.g., gesture (e.g., Microsoft Kinect) detection, motion detection, still, video, webcam, etc.), dongles (e.g., for copy protection, ensuring secure transactions with a digital signature, and/or the like), external processors (for added capabilities; e.g., crypto devices 528), force-feedback devices (e.g., vibrating motors), infrared (IR) transceiver, network interfaces, printers, scanners, sensors/sensor arrays and peripheral extensions (e.g., ambient light, GPS, gyroscopes, proximity, temperature, etc.), storage devices, transceivers (e.g., cellular, GPS, etc.), video devices (e.g., goggles, monitors, etc.), video sources, visors, and/or the like. Peripheral devices often include types of input devices (e.g., cameras).

User input devices 3511 often are a type of peripheral device 512 (see above) and may include: card readers, dongles, finger print readers, gloves, graphics tablets, joysticks, keyboards, microphones, mouse (mice), remote controls, security/biometric devices (e.g., fingerprint reader, iris reader, retina reader, etc.), touch screens (e.g., capacitive, resistive, etc.), trackballs, trackpads, styluses, and/or the like.

It should be noted that although user input devices and peripheral devices may be employed, the REDUP controller may be embodied as an embedded, dedicated, and/or monitor-less (i.e., headless) device, wherein access would be provided over a network interface connection.

Cryptographic units such as, but not limited to, microcontrollers, processors 3526, interfaces 3527, and/or devices 3528 may be attached, and/or communicate with the REDUP controller. A MC68HC16 microcontroller, manufactured by Motorola Inc., may be used for and/or within cryptographic units. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of the CPU. Equivalent microcontrollers and/or processors may also be used. Other commercially available specialized cryptographic processors include: Broadcom's CryptoNetX and other Security Processors; nCipher's nShield; SafeNet's Luna PCI (e.g., 7100) series; Semaphore Communications' 40 MHz Roadrunner 184; Sun's Cryptographic Accelerators (e.g., Accelerator 6000 PCIe Board, Accelerator 500 Daughtercard); Via Nano Processor (e.g., L2100, L2200, U2400) line, which is capable of performing 500+MB/s of cryptographic instructions; VLSI Technology's 33 MHz 6868; and/or the like.

Memory

Generally, any mechanization and/or embodiment allowing a processor to affect the storage and/or retrieval of information is regarded as memory 3529. However, memory is a fungible technology and resource, thus, any number of memory embodiments may be employed in lieu of or in concert with one another. It is to be understood that the REDUP controller and/or a computer systemization may employ various forms of memory 3529. For example, a computer systemization may be configured wherein the operation of on-chip CPU memory (e.g., registers), RAM, ROM, and any other storage devices are provided by a paper punch tape or paper punch card mechanism; however, such an embodiment would result in an extremely slow rate of operation. In a typical configuration, memory 3529 will include ROM 3506, RAM 3505, and a storage device 3514. A storage device 3514 may be any conventional computer system storage. Storage devices may include: an array of devices (e.g., Redundant Array of Independent Disks (RAID)); a drum; a (fixed and/or removable) magnetic disk drive; a magneto-optical drive; an optical drive (i.e., Blueray, CD ROM/RAM/Recordable (R)/ReWritable (RW), DVD R/RW, HD DVD R/RW etc.); RAM drives; solid state memory devices (USB memory, solid state drives (SSD), etc.); other processor-readable storage mediums; and/or other devices of the like. Thus, a computer systemization generally requires and makes use of memory.

Component Collection

The memory 3529 may contain a collection of program and/or database components and/or data such as, but not limited to: operating system component(s) 3515 (operating system); information server component(s) 3516 (information server); user interface component(s) 3517 (user interface); Web browser component(s) 3518 (Web browser); database(s) 3519; mail server component(s) 3521; mail client component(s) 3522; cryptographic server component(s) 3520 (cryptographic server); the REDUP component(s) 3535; and/or the like (i.e., collectively a component collection). These components may be stored and accessed from the storage devices and/or from storage devices accessible through an interface bus. Although non-conventional program components such as those in the component collection, typically, are stored in a local storage device 3514, they may also be loaded and/or stored in memory such as: peripheral devices, RAM, remote storage facilities through a communications network, ROM, various forms of memory, and/or the like.

Operating System

The operating system component 3515 is an executable program component facilitating the operation of the REDUP controller. Typically, the operating system facilitates access of I/O, network interfaces, peripheral devices, storage devices, and/or the like. The operating system may be a highly fault tolerant, scalable, and secure system such as: Apple's Macintosh OS X (Server); AT&T Plan 9; Be OS; Google's Chrome; Microsoft's Windows 7/8; Unix and Unix-like system distributions (such as AT&T's UNIX; Berkley Software Distribution (BSD) variations such as FreeBSD, NetBSD, OpenBSD, and/or the like; Linux distributions such as Red Hat, Ubuntu, and/or the like); and/or the like operating systems. However, more limited and/or less secure operating systems also may be employed such as Apple Macintosh OS, IBM OS/2, Microsoft DOS, Microsoft Windows 2000/2003/3.1/95/98/CE/Millenium/Mobile/NT/Vista/XP (Server), Palm OS, and/or the like. Additionally, for robust mobile deployment applications, mobile operating systems may be used, such as: Apple's iOS; China Operating System COS; Google's Android; Microsoft Windows RT/Phone; Palm's WebOS; Samsung/Intel's Tizen; and/or the like. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the REDUP controller to communicate with other entities through a communications network 3513. Various communication protocols may be used by the REDUP controller as a subcarrier transport mechanism for interaction, such as, but not limited to: multicast, TCP/IP, UDP, unicast, and/or the like.

Information Server

An information server component 3516 is a stored program component that is executed by a CPU. The information server may be a conventional Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective–) C (++), C# and/or .NET, Common Gateway Interface (CGI) scripts, dynamic (D) hypertext markup language (HTML), FLASH, Java, JavaScript, Practical Extraction Report Language (PERL), Hypertext Pre-Processor (PHP), pipes, Python, wireless application protocol (WAP), WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols (e.g., America Online (AOL) Instant Messenger (AIM), Application Exchange (APEX), ICQ, Internet Relay Chat (IRC), Microsoft Network (MSN) Messenger Service, Presence and Instant Messaging Protocol (PRIM), Internet Engineering Task Force's (IETF's) Session Initiation Protocol (SIP), SIP for Instant Messaging and Presence Leveraging Extensions (SIMPLE), open XML-based Extensible Messaging and Presence Protocol (XMPP) (i.e., Jabber or Open Mobile Alliance's (OMA's) Instant Messaging and Presence Service (IMPS)), Yahoo! Instant Messenger Service, and/or the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the REDUP controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the REDUP database 3519, operating systems, other program components, user interfaces, Web browsers, and/or the like.

Access to the REDUP database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the REDUP. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the REDUP as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

Computer interfaces in some respects are similar to automobile operation interfaces. Automobile operation interface elements such as steering wheels, gearshifts, and speedometers facilitate the access, operation, and display of automobile resources, and status. Computer interaction interface elements such as check boxes, cursors, menus, scrollers, and windows (collectively and commonly referred to as widgets) similarly facilitate the access, capabilities, operation, and display of data and computer hardware and operating system resources, and status. Operation interfaces are commonly called user interfaces. Graphical user interfaces (GUIs) such as the Apple's iOS, Macintosh Operating System's Aqua; IBM's OS/2; Google's Chrome (e.g., and other webbrowser/cloud based client OSs); Microsoft's Windows varied UIs 2000/2003/3.1/95/98/CE/Millenium/Mobile/NT/Vista/XP (Server) (i.e., Aero, Surface, etc.); Unix's X-Windows (e.g., which may include additional Unix graphic interface libraries and layers such as K Desktop Environment (KDE), mythTV and GNU Network Object Model Environment (GNOME)), web interface libraries (e.g., ActiveX, AJAX, (D)HTML, FLASH, Java, JavaScript, etc. interface libraries such as, but not limited to, Dojo, jQuery(UI), MooTools, Prototype, script.aculo.us, SWFObject, Yahoo! User Interface, any of which may be used and) provide a baseline and means of accessing and displaying information graphically to users.

A user interface component 3517 is a stored program component that is executed by a CPU. The user interface may be a conventional graphic user interface as provided by, with, and/or atop operating systems and/or operating environments such as already discussed. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component 3518 is a stored program component that is executed by a CPU. The Web browser may be a conventional hypertext viewing application such as Apple's (mobile) Safari, Google's Chrome, Microsoft Internet Explorer, Mozilla's Firefox, Netscape Navigator, and/or the like. Secure Web browsing may be supplied with 128 bit (or greater) encryption by way of HTTPS, SSL, and/or the like. Web browsers allowing for the execution of program components through facilities such as ActiveX, AJAX, (D)HTML, FLASH, Java, JavaScript, web browser plug-in APIs (e.g., FireFox, Safari Plug-in, and/or the like APIs), and/or the like. Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Also, in place of a Web browser and information server, a combined application may be developed to perform similar operations of both. The combined application would similarly affect the obtaining and the provision of information to users, user agents, and/or the like from the REDUP enabled nodes. The combined application may be nugatory on systems employing standard Web browsers.

Mail Server

A mail server component 3521 is a stored program component that is executed by a CPU 3503. The mail server may be a conventional Internet mail server such as, but not limited to: dovecot, Courier IMAP, Cyrus IMAP, Maildir, Microsoft Exchange, sendmail, and/or the like. The mail server may allow for the execution of program components through facilities such as ASP, ActiveX, (ANSI) (Objective–) C (++), C# and/or .NET, CGI scripts, Java, JavaScript, PERL, PHP, pipes, Python, WebObjects, and/or the like. The mail server may support communications protocols such as, but not limited to: Internet message access protocol (IMAP), Messaging Application Programming Interface (MAPI)/Microsoft Exchange, post office protocol (POP3), simple mail transfer protocol (SMTP), and/or the like. The mail server can route, forward, and process incoming and outgoing mail messages that have been sent, relayed and/or otherwise traversing through and/or to the REDUP. Alternatively, the mail server component may be distributed out to mail service providing entities such as Google's cloud services (e.g., Gmail and notifications may alternatively be provided via messenger services such as AOL's Instant Messenger, Apple's iMessage, Google Messenger, SnapChat, etc.).

Access to the REDUP mail may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component 3522 is a stored program component that is executed by a CPU 3503. The mail client may be a conventional mail viewing application such as Apple Mail, Microsoft Entourage, Microsoft Outlook, Microsoft Outlook Express, Mozilla, Thunderbird, and/or the like. Mail clients may support a number of transfer protocols, such as: IMAP, Microsoft Exchange, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component 3520 is a stored program component that is executed by a CPU 3503, cryptographic processor 3526, cryptographic processor interface 3527, cryptographic processor device 3528, and/or the like. Cryptographic processor interfaces will allow for expedition of encryption and/or decryption requests by the cryptographic component; however, the cryptographic component, alternatively, may run on a conventional CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest (MD5, which is a one way hash operation), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), Transport Layer Security (TLS), and/or the like. Employing such encryption security protocols, the REDUP may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for an digital audio file. A cryptographic component may communicate to and/or with other components in a component collection, including itself, and/or facilities of the like. The cryptographic component supports encryption schemes allowing for the secure transmission of information across a communications network to enable the REDUP component to engage in secure transactions if so desired. The cryptographic component facilitates the secure accessing of resources on the REDUP and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

The REDUP Database

The REDUP database component 3519 may be embodied in a database and its stored data. The database is a stored program component, which is executed by the CPU; the stored program component portion configuring the CPU to process the stored data. The database may be a conventional, fault tolerant, relational, scalable, secure database such as MySQL, Oracle, Sybase, etc. may be used. Additionally, optimized fast memory and distributed databases such as IBM's Netezza, MongoDB's MongoDB, opensource Hadoop, opensource VoltDB, SAP's Hana, etc. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. Alternative key fields may be used from any of the fields having unique value sets, and in some alternatives, even non-unique values in combinations with other fields. More precisely, they uniquely identify rows of a table on the "one" side of a one-to-many relationship.

Alternatively, the REDUP database may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of capabilities encapsulated within a given object. If the REDUP database is implemented as a data-structure, the use of the REDUP database 3519 may be integrated into another component such as the REDUP component 3535. Also, the database may be implemented as a mix of data structures, objects, and relational structures. Databases may be consolidated and/or distributed in countless variations (e.g., see Distributed REDUP below). Portions of databases, e.g., tables, may be exported and/or imported and thus decentralized and/or integrated.

In one embodiment, the database component 3519 includes several tables 3519a-l:

An accounts table 3519a includes fields such as, but not limited to: an accountID, accountOwnerID, accountContactID, assetIDs, deviceIDs, paymentIDs, transactionIDs, userIDs, accountType (e.g., agent, entity (e.g., corporate, non-profit, partnership, etc.), individual, etc.), accountCreationDate, accountUpdateDate, accountName, accountNumber, routingNumber, linkWalletsID, accountPrioritAccaountRatio, accountAddress, accountState, accountZIPcode, accountCountry, accountEmail, accountPhone, accountAuthKey, accountIPaddress, accountURLAccessCode, accountPortNo, accountAuthorizationCode, accountAccessPrivileges, accountPreferences, accountRestrictions, and/or the like;

A users table 3519b includes fields such as, but not limited to: a userID, userSSN, taxID, userContactID, accountID, assetIDs, deviceIDs, paymentIDs, transactionIDs, userType (e.g., agent, entity (e.g., corporate, non-profit, partnership, etc.), individual, etc.), namePrefix, firstName, middleName, lastName, nameSuffix, DateOfBirth, userAge, userName, userEmail, userSocialAccountID, contactType, contactRelationship, userPhone, userAddress, userCity, userState, userZIPCode, userCountry, userAuthorizationCode, userAccessPrivilges, userPreferences, userRestrictions, and/or the like (the user table may support and/or track multiple entity accounts on a REDUP);

An devices table 3519c includes fields such as, but not limited to: deviceID, sensorIDs, accountID, assetIDs, paymentIDs, deviceType, deviceName, deviceManufacturer, deviceModel, deviceVersion, deviceSerialNo, deviceIPaddress, deviceMACaddress, device_ECID, deviceUUID, deviceLocation, deviceCertificate, deviceOS, appIDs, deviceResources, deviceSession, authKey, deviceSecureKey, walletAppInstalledFlag, deviceAccessPrivileges, devicePreferences, deviceRestrictions, hardware_config, software_config, storage_location, sensor_value, pin_reading, data_length, channel_requirement, sensor_name, sensor_model_no, sensor_manufacturer, sensor_type, sensor_serial_number, sensor_power_requirement, device_power_requirement, location, sensor_associated_tool, sensor_dimensions, device_dimensions, sensor_communications_type, device_communications_type, power_percentage, power_condition, temperature_setting, speed_adjust, hold_duration, part_actuation, segmentIDs, and/or the like. Device table may, in some embodiments, include fields corresponding to one or more Bluetooth profiles, such as those published at https://www.bluetooth.org/en-us/specification/adopted-specifications, and/or other device specifications, and/or the like;

An apps table 3519d includes fields such as, but not limited to: appID, appName, appType, appDependencies, accountID, deviceIDs, transactionID, userID, appStoreAuthKey, appStoreAccountID, appStoreIPaddress, appStoreURLaccessCode, appStorePortNo, appAccessPrivileges, appPreferences, appRestrictions, portNum, access_API_call, linked_wallets_list, and/or the like;

An assets table 3519e includes fields such as, but not limited to: assetID, accountID, userID, distributorAccountID, distributorPaymentID, distributorOnwerID, assetOwnerID, assetType, assetSourceDeviceID, assetSourceDeviceType, assetSourceDeviceName, assetSourceDistributionChannelID, assetSourceDistributionChannelType, assetSourceDistributionChannelName, assetTargetChannelID, assetTargetChannelType, assetTargetChannelName, assetName, assetSeriesName, assetSeriesSeason, assetSeriesEpisode, assetCode, assetQuantity, assetCost, assetPrice, assetValue, assetManufactuer, assetModelNo, assetSerialNo, assetLocation, assetAddress, assetState, assetZIPcode, assetState, assetCountry, assetEmail, assetIPaddress, assetURLaccessCode, assetOwnerAccountID, subscriptionIDs, assetAuthroizationCode, assetAccessPrivileges, assetPreferences, assetRestrictions, assetAPI, assetAPIconnectionAddress, and/or the like;

A payments table 3519f includes fields such as, but not limited to: paymentID, accountID, userID, paymentType, paymentAccountNo, paymentAccountName, paymentAccountAuthorizationCodes, paymentExpirationDate, paymentCCV, paymentRoutingNo, paymentRoutingType, paymentAddress, paymentState, paymentZIPcode, paymentCountry, paymentEmail, paymentAuthKey, paymentIPaddress, paymentURLaccessCode, paymentPortNo, paymentAccessPrivileges, paymentPreferences, payementRestrictions, and/or the like;

An transactions table 3519g includes fields such as, but not limited to: transactionID, accountID, assetIDs, deviceIDs, paymentIDs, transactionIDs, userID, merchantID, transactionType, transactionDate, transactionTime, transactionAmount, transactionQuantity, transactionDetails, productsList, productType, productTitle, productsSummary, productParamsList, transactionNo, transactionAccessPrivileges, transactionPreferences, transactionRestrictions, merchantAuthKey, merchantAuthCode, and/or the like;

An merchants table 3519h includes fields such as, but not limited to: merchantID, merchantTaxID, merchanteName, merchantContactUserID, accountID, issuerID, acquirerID, merchantEmail, merchantAddress, merchantState, merchantZIPcode, merchantCountry, merchantAuthKey, merchantIPaddress, portNum, merchantURLaccessCode, merchantPortNo, merchantAccessPrivileges, merchantPreferences, merchantRestrictions, and/or the like;

An ads table 3519i includes fields such as, but not limited to: adID, advertiserID, adMerchantID, adNetworkID, adName, adTags, advertiserName, adSponsor, adTime, adGeo, adAttributes, adFormat, adProduct, adText, adMedia, adMediaID, adChannelID, adTagTime, adAudioSignature, adHash, adTemplateID, adTemplateData, adSourceID, adSourceName, adSourceServerIP, adSourceURL, adSourceSecurityProtocol, adSourceFTP, adAuthKey, adAccessPrivileges, adPreferences, adRestrictions, adNetworkXchangeID, adNetworkXchangeName, adNetworkXchangeCost, adNetworkXchangeMetricType (e.g., CPA, CPC, CPM, CTR, etc.), adNetworkXchangeMetricValue, adNetworkXchangeServer, adNetworkXchangePortNumber, publisherID, publisherAddress, publisherURL, publisherTag, publisherIndustry, publisherName, publisherDescription, siteDomain, siteURL, siteContent, siteTag, siteContext, siteImpression, siteVisits, siteHeadline, sitePage, siteAdPrice, sitePlacement, sitePosition, bidID, bidExchange, bidOS, bidTarget, bidTimestamp, bidPrice, bidImpressionID, bidType, bidScore, adType (e.g., mobile, desktop, wearable, largescreen, interstitial, etc.), assetID, merchantID, deviceID, userID, accountID, impressionID, impressionOS, impressionTimeStamp, impressionGeo, impressionAction, impressionType, impressionPublisherID, impressionPublisherURL, and/or the like;

A segments table 3519j includes fields such as, but not limited to: segmentID, segmentName, segmentParameters, segmentDevicesList, componentList, and/or the like;

An updates table 3519k includes fields such as, but not limited to: updateID, updateDescription, updatePackageID, updatePackageVersion, updatePackagePriority, updatePackageSUMsData, and/or the like;

A logs table 3519l includes fields such as, but not limited to: logID, logData, logTimestamp, logOntology, and/or the like.

In one embodiment, the REDUP database may interact with other database systems. For example, employing a distributed database system, queries and data access by search REDUP component may treat the combination of the REDUP database, an integrated data security layer database as a single database entity (e.g., see Distributed REDUP below).

In one embodiment, user programs may contain various user interface primitives, which may serve to update the REDUP. Also, various accounts may require custom database tables depending upon the environments and the types of clients the REDUP may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database components 3519a-l. The REDUP may be configured to keep track of various settings, inputs, and parameters via database controllers.

The REDUP database may communicate to and/or with other components in a component collection, including itself, and/or facilities of the like. Most frequently, the REDUP database communicates with the REDUP component, other program components, and/or the like. The database may contain, retain, and provide information regarding other nodes and data.

The REDUPs

The REDUP component 3535 is a stored program component that is executed by a CPU. In one embodiment, the REDUP component incorporates any and/or all combinations of the aspects of the REDUP that was discussed in the previous figures. As such, the REDUP affects accessing, obtaining and the provision of information, services, transactions, and/or the like across various communications networks. The features and embodiments of the REDUP discussed herein increase network efficiency by reducing data transfer requirements the use of more efficient data structures and mechanisms for their transfer and storage. As a consequence, more data may be transferred in less time, and latencies with regard to transactions, are also reduced. In many cases, such reduction in storage, transfer time, bandwidth requirements, latencies, etc., will reduce the capacity and structural infrastructure requirements to support the REDUP's features and facilities, and in many cases reduce the costs, energy consumption/requirements, and extend the life of REDUP's underlying infrastructure; this has the added benefit of making the REDUP more reliable. Similarly, many of the features and mechanisms are designed to be easier for users to use and access, thereby broadening the audience that may enjoy/employ and exploit the feature sets of the REDUP; such ease of use also helps to increase the reliability of the REDUP. In addition, the feature sets include heightened security as noted via the Cryptographic components 3520, 3526, 3528 and throughout, making access to the features and data more reliable and secure.

The REDUP transforms telemetry inputs, via REDUP components (e.g., DSD, UDA, PDA, UIA, PSC, UPC, ELA, AC), into remote embedded updates outputs.

The REDUP component enabling access of information between nodes may be developed by employing standard development tools and languages such as, but not limited to: Apache components, Assembly, ActiveX, binary executables, (ANSI) (Objective-) C (++), C# and/or .NET, database adapters, CGI scripts, Java, JavaScript, mapping tools, procedural and object oriented development tools, PERL, PHP, Python, shell scripts, SQL commands, web application server extensions, web development environments and libraries (e.g., Microsoft's ActiveX; Adobe AIR, FLEX & FLASH; AJAX; (D)HTML; Dojo, Java; JavaScript; jQuery(UI); MooTools; Prototype; script.aculo.us; Simple Object Access Protocol (SOAP); SWFObject; Yahoo! User Interface; and/or the like), WebObjects, and/or the like. In one embodiment, the REDUP server employs a cryptographic server to encrypt and decrypt communications. The REDUP component may communicate to and/or with other components in a component collection, including itself, and/or facilities of the like. Most frequently, the REDUP component communicates with the REDUP database, operating systems, other program components, and/or the like. The REDUP may contain, communicate, generate, obtain, and/or provide program component, system, user, and/or data communications, requests, and/or responses.

Distributed REDUPs

The structure and/or operation of any of the REDUP node controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion. As such a combination of hardware may be distributed within a location, within a region and/or globally where logical access to a controller may be abstracted as a singular node, yet where a multitude of private, semiprivate and publically accessible node controllers (e.g., via dispersed data centers) are coordinated to serve requests (e.g., providing private cloud, semi-private cloud, and public cloud computing resources) and allowing for the serving of such requests in discrete regions (e.g., isolated, local, regional, national, global cloud access).

The component collection may be consolidated and/or distributed in countless variations through standard data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so through standard data processing communication techniques.

The configuration of the REDUP controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like. For example, cloud services such as Amazon Data Services, Microsoft Azure, Hewlett Packard Helion, IBM Cloud services allow for REDUP controller and/or REDUP component collections to be hosted in full or partially for varying degrees of scale.

If component collection components are discrete, separate, and/or external to one another, then communicating, obtaining, and/or providing data with and/or to other component components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), Jini local and remote application program interfaces, JavaScript Object Notation (JSON), Remote Method Invocation (RMI), SOAP, process pipes, shared files, and/or the like. Messages sent between discrete component components for inter-application communication or within memory spaces of a singular component for intra-application communication may be facilitated through the creation and parsing of a grammar. A grammar may be developed by using development tools such as lex, yacc, XML, and/or the like, which allow for grammar generation and parsing capabilities, which in turn may form the basis of communication messages within and between components.

For example, a grammar may be arranged to recognize the tokens of an HTTP post command, e.g.:

w3c –post http:// . . . Value1 where Value1 is discerned as being a parameter because "http://" is part of the grammar syntax, and what follows is considered part of the post value. Similarly, with such a grammar, a variable "Value1" may be inserted into an "http://" post command and then sent. The grammar syntax itself may be presented as structured data that is interpreted and/or otherwise used to generate the parsing mechanism (e.g., a syntax description text file as processed by lex, yacc, etc.). Also, once the parsing mechanism is generated and/or instantiated, it itself may process and/or parse structured data such as, but not limited to: character (e.g., tab) delineated text, HTML, structured text streams, XML, and/or the like structured data. In another embodiment, inter-application data processing protocols themselves may have integrated and/or readily available parsers (e.g., JSON, SOAP, and/or like parsers) that may be employed to parse (e.g., communications) data. Further, the parsing grammar may be used beyond message parsing, but may also be used to parse: databases, data collections, data stores, structured data, and/or the like. Again, the desired configuration will depend upon the context, environment, and requirements of system deployment.

For example, in some implementations, the REDUP controller may be executing a PHP script implementing a Secure Sockets Layer ("SSL") socket server via the information server, which listens to incoming communications on a server port to which a client may send data, e.g., data encoded in JSON format. Upon identifying an incoming communication, the PHP script may read the incoming message from the client device, parse the received JSON-encoded text data to extract information from the JSON-encoded text data into PHP script variables, and store the data (e.g., client identifying information, etc.) and/or extracted information in a relational database accessible using the Structured Query Language ("SQL"). An exemplary listing, written substantially in the form of PHP/SQL commands, to accept JSON-encoded input data from a client device via a SSL connection, parse the data to extract variables, and store the data to a database, is provided below:

```
<?PHP
header('Content-Type: text/plain');
// set ip address and port to listen to for incoming data
$address = '192.168.0.100';
$port = 255;
// create a server-side SSL socket, listen for/accept incoming
communication
$sock = socket_create(AF_INET, SOCK_STREAM, 0);
socket_bind($sock, $address, $port) or die('Could not bind to address');
socket_listen($sock);
$client = socket_accept($sock);
// read input data from client device in 1024 byte blocks until end of
```

```
-continued message
do {
    $input = "";
    $input = socket_read($client, 1024);
    $data .= $input;
} while($input != "");
// parse data to extract variables
$obj = json_decode($data, true);
// store input data in a database
mysql_connect("201.408.185.132",$DBserver,$password);
// access database server
mysql_select("CLIENT_DB.SQL"); // select database to append
mysql_query("INSERT INTO UserTable (transmission)
VALUES ($data)"); // add data to UserTable table in a CLIENT database
mysql_close("CLIENT_DB.SQL"); // close connection to database
?>
```

Also, the following resources may be used to provide example embodiments regarding SOAP parser implementation:

```
http://www.xav.com/perl/site/lib/SOAP/Parser.html
http://publib.boulder.ibm.com/infocenter/tivihelp/v2r1/index.jsp?topic=/
com.ibm.IBMDI.doc/referenceguide295.htm
``` and other parser implementations:

```
http://publib.boulder.ibm.com/infocenter/tivihelp/v2r1/index.jsp?topic=/
com.ibm.IBMDI.doc/referenceguide259.htm
``` all of which are hereby expressly incorporated by reference.
Additional embodiments may include:
1. A remote embedded device component package and segment management apparatus, comprising:
a memory;
a component collection in the memory, including:
    a device segment determining component, and
    a package download administering component;
a processor disposed in communication with the memory, and configured to issue a plurality of processing instructions from the component collection stored in the memory,
    wherein the processor issues instructions from the device segment determining component, stored in the memory, to:
        obtain, via network, a connection notification message from a remote connected device, wherein the connection notification message includes a device identifier of the remote connected device, and device status data that includes information regarding components installed in the remote connected device and versions of the installed components;
        analyze, via processor, the connection notification message to determine the device identifier;
        determine, via processor, segment identifiers of segments associated with the remote connected device based on the device identifier;
        determine, via processor, for each of the associated segments, segment component identifiers of segment components associated with the respective segment based on the respective segment identifier of the respective segment;
        determine, via processor, for each of the associated segment components, whether an applicable update, which is available for the respective segment component and which is applicable to the respective segment, is available based on the respective segment component identifier of the respective segment component;
        generate, via processor, an update notification message, wherein the update notification message includes information regarding the determined applicable updates;
        send, via network, the update notification message to the remote connected device;
    wherein the processor issues instructions from the package download administering component, stored in the memory, to:
        obtain, via network, an update download request message from the remote connected device, wherein the update download request message includes an update identifier of an applicable update associated with the sent update notification message;
        analyze, via processor, the update download request message to determine the update identifier;
        determine, via processor, an update package associated with the update identifier; and
        send, via processor, the determined update package to the remote connected device.
2. The apparatus of embodiment 1, further comprising:
    the processor issues instructions from a component, stored in the memory, to:
        obtain, via network, an update installation report log message associated with the update identifier from the remote connected device; and
        store data associated with the update installation report log message in a storage repository.
3. The apparatus of embodiment 1, wherein a segment is configured to link a group of devices that are specified as a set.
4. The apparatus of embodiment 1, wherein a segment is configured to link a group of devices that have specified segment components.
5. The apparatus of embodiment 4, wherein a segment is configured to link a group of devices that have specified attribute values associated with the specified segment components.
6. The apparatus of embodiment 5, wherein a specified attribute value is a specified version label associated with hardware or software or firmware of a segment component.
7. The apparatus of embodiment 1, wherein a segment component is an embedded hardware component.
8. The apparatus of embodiment 1, wherein a segment component is a software or firmware component.
9. The apparatus of embodiment 1, wherein instructions to determine whether an applicable update is available for a segment component further comprise instructions to:
    determine whether an applicable update is available for the version of the segment component installed in the remote connected device.
10. The apparatus of embodiment 1, wherein the update notification message includes priority data associated for each of the determined applicable updates.
11. The apparatus of embodiment 1, further comprising:
    the processor issues instructions from the package download administering component, stored in the memory, to:
        determine, via processor, whether the remote connected device is authorized to get the update package associated with the update identifier.

12. The apparatus of embodiment 1, wherein the update package comprises a plurality of software update modules.

13. The apparatus of embodiment 12, wherein a rule is associated with a software update module.

14. The apparatus of embodiment 13, wherein the rule specifies whether the software update module may be installed on a component.

15. The apparatus of embodiment 13, wherein the rule specifies how the software update module should be installed on a component.

16. The apparatus of embodiment 13, wherein the rule specifies a dependency between the software update module and another software update module in the update package.

17. The apparatus of embodiment 12, wherein a software update module is associated with parameters including version label, timestamp, checksum, and associated component of the remote connected device.

18. The apparatus of embodiment 1, further comprising:
the processor issues instructions from a component, stored in the memory, to:
configure, via processor, the update package for the remote connected device based on information regarding components installed in the remote connected device and versions of the installed components.

19. The apparatus of embodiment 18, wherein instructions to configure the update package further comprise instructions to:
exclude a software update module previously installed on the remote connected device from the update package.

20. The apparatus of embodiment 1, wherein priority data associated with the update package determines whether user approval should be obtained from a user of the remote connected device before installing the update package.

21. A processor-readable remote embedded device component package and segment management non-transient physical medium storing processor-executable components, the components, comprising:
a component collection stored in the medium, including:
a device segment determining component, and
a package download administering component;
wherein the device segment determining component, stored in the medium, includes processor-issuable instructions to:
obtain, via network, a connection notification message from a remote connected device, wherein the connection notification message includes a device identifier of the remote connected device, and device status data that includes information regarding components installed in the remote connected device and versions of the installed components;
analyze, via processor, the connection notification message to determine the device identifier;
determine, via processor, segment identifiers of segments associated with the remote connected device based on the device identifier;
determine, via processor, for each of the associated segments, segment component identifiers of segment components associated with the respective segment based on the respective segment identifier of the respective segment;
determine, via processor, for each of the associated segment components, whether an applicable update, which is available for the respective segment component and which is applicable to the respective segment, is available based on the respective segment component identifier of the respective segment component;
generate, via processor, an update notification message, wherein the update notification message includes information regarding the determined applicable updates;
send, via network, the update notification message to the remote connected device;
wherein the package download administering component, stored in the medium, includes processor-issuable instructions to:
obtain, via network, an update download request message from the remote connected device, wherein the update download request message includes an update identifier of an applicable update associated with the sent update notification message;
analyze, via processor, the update download request message to determine the update identifier;
determine, via processor, an update package associated with the update identifier; and
send, via processor, the determined update package to the remote connected device.

22. The medium of embodiment 21, further comprising:
a component, stored in the medium, includes processor-issuable instructions to:
obtain, via network, an update installation report log message associated with the update identifier from the remote connected device; and
store data associated with the update installation report log message in a storage repository.

23. The medium of embodiment 21, wherein a segment is configured to link a group of devices that are specified as a set.

24. The medium of embodiment 21, wherein a segment is configured to link a group of devices that have specified segment components.

25. The medium of embodiment 24, wherein a segment is configured to link a group of devices that have specified attribute values associated with the specified segment components.

26. The medium of embodiment 25, wherein a specified attribute value is a specified version label associated with hardware or software or firmware of a segment component.

27. The medium of embodiment 21, wherein a segment component is an embedded hardware component.

28. The medium of embodiment 21, wherein a segment component is a software or firmware component.

29. The medium of embodiment 21, wherein instructions to determine whether an applicable update is available for a segment component further comprise instructions to:
determine whether an applicable update is available for the version of the segment component installed in the remote connected device.

30. The medium of embodiment 21, wherein the update notification message includes priority data associated for each of the determined applicable updates.

31. The medium of embodiment 21, further comprising:
the package download administering component, stored in the medium, includes processor-issuable instructions to:
determine, via processor, whether the remote connected device is authorized to get the update package associated with the update identifier.

32. The medium of embodiment 21, wherein the update package comprises a plurality of software update modules.
33. The medium of embodiment 32, wherein a rule is associated with a software update module.
34. The medium of embodiment 33, wherein the rule specifies whether the software update module may be installed on a component.
35. The medium of embodiment 33, wherein the rule specifies how the software update module should be installed on a component.
36. The medium of embodiment 33, wherein the rule specifies a dependency between the software update module and another software update module in the update package.
37. The medium of embodiment 32, wherein a software update module is associated with parameters including version label, timestamp, checksum, and associated component of the remote connected device.
38. The medium of embodiment 21, further comprising:
    a component, stored in the medium, includes processor-issuable instructions to:
        configure, via processor, the update package for the remote connected device based on information regarding components installed in the remote connected device and versions of the installed components.
39. The medium of embodiment 38, wherein instructions to configure the update package further comprise instructions to:
    exclude a software update module previously installed on the remote connected device from the update package.
40. The medium of embodiment 21, wherein priority data associated with the update package determines whether user approval should be obtained from a user of the remote connected device before installing the update package.
41. A processor-implemented remote embedded device component package and segment management system, comprising:
    a device segment determining component means, to:
        obtain, via network, a connection notification message from a remote connected device, wherein the connection notification message includes a device identifier of the remote connected device, and device status data that includes information regarding components installed in the remote connected device and versions of the installed components;
        analyze, via processor, the connection notification message to determine the device identifier;
        determine, via processor, segment identifiers of segments associated with the remote connected device based on the device identifier;
        determine, via processor, for each of the associated segments, segment component identifiers of segment components associated with the respective segment based on the respective segment identifier of the respective segment;
        determine, via processor, for each of the associated segment components, whether an applicable update, which is available for the respective segment component and which is applicable to the respective segment, is available based on the respective segment component identifier of the respective segment component;
        generate, via processor, an update notification message, wherein the update notification message includes information regarding the determined applicable updates;
        send, via network, the update notification message to the remote connected device;
    a package download administering component means, to:
        obtain, via network, an update download request message from the remote connected device, wherein the update download request message includes an update identifier of an applicable update associated with the sent update notification message;
        analyze, via processor, the update download request message to determine the update identifier;
        determine, via processor, an update package associated with the update identifier; and
        send, via processor, the determined update package to the remote connected device.
42. The system of embodiment 41, further comprising:
    component means, to:
        obtain, via network, an update installation report log message associated with the update identifier from the remote connected device; and
        store data associated with the update installation report log message in a storage repository.
43. The system of embodiment 41, wherein a segment is configured to link a group of devices that are specified as a set.
44. The system of embodiment 41, wherein a segment is configured to link a group of devices that have specified segment components.
45. The system of embodiment 44, wherein a segment is configured to link a group of devices that have specified attribute values associated with the specified segment components.
46. The system of embodiment 45, wherein a specified attribute value is a specified version label associated with hardware or software or firmware of a segment component.
47. The system of embodiment 41, wherein a segment component is an embedded hardware component.
48. The system of embodiment 41, wherein a segment component is a software or firmware component.
49. The system of embodiment 41, wherein means to determine whether an applicable update is available for a segment component further comprise means to:
    determine whether an applicable update is available for the version of the segment component installed in the remote connected device.
50. The system of embodiment 41, wherein the update notification message includes priority data associated for each of the determined applicable updates.
51. The system of embodiment 41, further comprising:
    the package download administering component means, to:
        determine, via processor, whether the remote connected device is authorized to get the update package associated with the update identifier.
52. The system of embodiment 41, wherein the update package comprises a plurality of software update modules.
53. The system of embodiment 52, wherein a rule is associated with a software update module.
54. The system of embodiment 53, wherein the rule specifies whether the software update module may be installed on a component.

55. The system of embodiment 53, wherein the rule specifies how the software update module should be installed on a component.
56. The system of embodiment 53, wherein the rule specifies a dependency between the software update module and another software update module in the update package.
57. The system of embodiment 52, wherein a software update module is associated with parameters including version label, timestamp, checksum, and associated component of the remote connected device.
58. The system of embodiment 41, further comprising:
component means, to:
configure, via processor, the update package for the remote connected device based on information regarding components installed in the remote connected device and versions of the installed components.
59. The system of embodiment 58, wherein means to configure the update package further comprise means to:
exclude a software update module previously installed on the remote connected device from the update package.
60. The system of embodiment 41, wherein priority data associated with the update package determines whether user approval should be obtained from a user of the remote connected device before installing the update package.
61. A processor-implemented remote embedded device component package and segment management method, comprising:
executing processor-implemented device segment determining component instructions to:
obtain, via network, a connection notification message from a remote connected device, wherein the connection notification message includes a device identifier of the remote connected device, and device status data that includes information regarding components installed in the remote connected device and versions of the installed components;
analyze, via processor, the connection notification message to determine the device identifier;
determine, via processor, segment identifiers of segments associated with the remote connected device based on the device identifier;
determine, via processor, for each of the associated segments, segment component identifiers of segment components associated with the respective segment based on the respective segment identifier of the respective segment;
determine, via processor, for each of the associated segment components, whether an applicable update, which is available for the respective segment component and which is applicable to the respective segment, is available based on the respective segment component identifier of the respective segment component;
generate, via processor, an update notification message, wherein the update notification message includes information regarding the determined applicable updates;
send, via network, the update notification message to the remote connected device;
executing processor-implemented package download administering component instructions to:
obtain, via network, an update download request message from the remote connected device, wherein the update download request message includes an update identifier of an applicable update associated with the sent update notification message;
analyze, via processor, the update download request message to determine the update identifier;
determine, via processor, an update package associated with the update identifier; and
send, via processor, the determined update package to the remote connected device.
62. The method of embodiment 61, further comprising:
executing processor-implemented component instructions to:
obtain, via network, an update installation report log message associated with the update identifier from the remote connected device; and
store data associated with the update installation report log message in a storage repository.
63. The method of embodiment 61, wherein a segment is configured to link a group of devices that are specified as a set.
64. The method of embodiment 61, wherein a segment is configured to link a group of devices that have specified segment components.
65. The method of embodiment 64, wherein a segment is configured to link a group of devices that have specified attribute values associated with the specified segment components.
66. The method of embodiment 65, wherein a specified attribute value is a specified version label associated with hardware or software or firmware of a segment component.
67. The method of embodiment 61, wherein a segment component is an embedded hardware component.
68. The method of embodiment 61, wherein a segment component is a software or firmware component.
69. The method of embodiment 61, wherein instructions to determine whether an applicable update is available for a segment component further comprise instructions to:
determine whether an applicable update is available for the version of the segment component installed in the remote connected device.
70. The method of embodiment 61, wherein the update notification message includes priority data associated for each of the determined applicable updates.
71. The method of embodiment 61, further comprising:
executing processor-implemented package download administering component instructions to:
determine, via processor, whether the remote connected device is authorized to get the update package associated with the update identifier.
72. The method of embodiment 61, wherein the update package comprises a plurality of software update modules.
73. The method of embodiment 72, wherein a rule is associated with a software update module.
74. The method of embodiment 73, wherein the rule specifies whether the software update module may be installed on a component.
75. The method of embodiment 73, wherein the rule specifies how the software update module should be installed on a component.
76. The method of embodiment 73, wherein the rule specifies a dependency between the software update module and another software update module in the update package.
77. The method of embodiment 72, wherein a software update module is associated with parameters including version label, timestamp, checksum, and associated component of the remote connected device.

78. The method of embodiment 61, further comprising:
executing processor-implemented component instructions to:
configure, via processor, the update package for the remote connected device based on information regarding components installed in the remote connected device and versions of the installed components.

79. The method of embodiment 78, wherein instructions to configure the update package further comprise instructions to:
exclude a software update module previously installed on the remote connected device from the update package.

80. The method of embodiment 61, wherein priority data associated with the update package determines whether user approval should be obtained from a user of the remote connected device before installing the update package.

81. An device component analytics improvement and decisioning apparatus, comprising:
a memory;
a component collection in the memory, including:
an analytics conducting component;
a processor disposed in communication with the memory, and configured to issue a plurality of processing instructions from the component collection stored in the memory,
wherein the processor issues instructions from the analytics conducting component, stored in the memory, to:
obtain, via network, analytics data associated with an analytics application from a plurality of remote connected devices;
analyze, via processor, the obtained analytics data to determine an issue affecting at least some of the plurality of remote connected devices;
determine, via processor, based on the analysis, a device component of the affected remote connected devices that is at least in part responsible for causing the issue;
determine, via processor, a segment associated with the device component, wherein the segment is affected by the issue;
generate, via processor, an update package for the segment that includes an updated software or firmware component that updates the device component and remedies the issue; and
facilitate, via processor, notification of remote connected devices associated with the segment regarding the update package.

82. The apparatus of embodiment 81, wherein the analytics data comprises event data reported by the plurality of remote connected devices.

83. The apparatus of embodiment 81, wherein the analytics data is obtained in a graph format.

84. The apparatus of embodiment 81, wherein the analytics data is obtained directly from a remote connected device via an adapter.

85. The apparatus of embodiment 81, wherein the analytics data is obtained indirectly from a remote connected device via a cloud data storage repository.

86. The apparatus of embodiment 81, further comprising:
the processor issues instructions from the analytics conducting component, stored in the memory, to:
obtain, via network, analytics data associated with an analytics application from a third party database.

87. The apparatus of embodiment 81, further comprising:
the processor issues instructions from the analytics conducting component, stored in the memory, to:
utilize, via processor, a federated query to obtain analytics data associated with an analytics application by combining analytics data from a plurality of sources.

88. The apparatus of embodiment 81, wherein the plurality of remote connected devices are vehicles.

89. The apparatus of embodiment 88, wherein the device component is an electronic control unit of a vehicle.

90. The apparatus of embodiment 88, wherein the device component is an app installed on an infotainment unit of a vehicle.

91. The apparatus of embodiment 81, further comprising:
the processor issues instructions from the analytics conducting component, stored in the memory, to:
determine, via processor, a second segment associated with the device component, wherein the second segment is affected by the issue;
generate, via processor, a second update package for the second segment that includes an updated software or firmware component that updates the device component and remedies the issue, wherein the second update package includes different software update modules than the update package; and
facilitate, via processor, notification of remote connected devices associated with the second segment regarding the second update package.

92. The apparatus of embodiment 81, further comprising:
the component collection in the memory, including:
an update package configuring component;
the processor issues instructions from the update package configuring component, stored in the memory, to:
determine, via processor, a priority for the update package based on the severity of the issue; and
associated, via processor, the priority with the update package.

93. The apparatus of embodiment 81, further comprising:
the component collection in the memory, including:
an update package configuring component;
the processor issues instructions from the update package configuring component, stored in the memory, to:
determine, via processor, software update modules for the update package;
determine, via processor, dependencies between the software update modules; and
generate, via processor, a script file that facilitates installation of the software update modules in accordance with the determined dependencies.

94. The apparatus of embodiment 93, wherein the script file is a software update module associated with the update package.

95. The apparatus of embodiment 93, further comprising:
the processor issues instructions from the update package configuring component, stored in the memory, to:
validate, via processor, configuration of the update package based on the determined dependencies.

96. A processor-readable device component analytics improvement and decisioning non-transient physical medium storing processor-executable components, the components, comprising:
a component collection stored in the medium, including:
an analytics conducting component;
wherein the analytics conducting component, stored in the medium, includes processor-issuable instructions to:

obtain, via network, analytics data associated with an analytics application from a plurality of remote connected devices;
analyze, via processor, the obtained analytics data to determine an issue affecting at least some of the plurality of remote connected devices;
determine, via processor, based on the analysis, a device component of the affected remote connected devices that is at least in part responsible for causing the issue;
determine, via processor, a segment associated with the device component, wherein the segment is affected by the issue;
generate, via processor, an update package for the segment that includes an updated software or firmware component that updates the device component and remedies the issue; and
facilitate, via processor, notification of remote connected devices associated with the segment regarding the update package.

97. The medium of embodiment 96, wherein the analytics data comprises event data reported by the plurality of remote connected devices.

98. The medium of embodiment 96, wherein the analytics data is obtained in a graph format.

99. The medium of embodiment 96, wherein the analytics data is obtained directly from a remote connected device via an adapter.

100. The medium of embodiment 96, wherein the analytics data is obtained indirectly from a remote connected device via a cloud data storage repository.

101. The medium of embodiment 96, further comprising:
the analytics conducting component, stored in the medium, includes processor-issuable instructions to:
obtain, via network, analytics data associated with an analytics application from a third party database.

102. The medium of embodiment 96, further comprising:
the analytics conducting component, stored in the medium, includes processor-issuable instructions to:
utilize, via processor, a federated query to obtain analytics data associated with an analytics application by combining analytics data from a plurality of sources.

103. The medium of embodiment 96, wherein the plurality of remote connected devices are vehicles.

104. The medium of embodiment 103, wherein the device component is an electronic control unit of a vehicle.

105. The medium of embodiment 103, wherein the device component is an app installed on an infotainment unit of a vehicle.

106. The medium of embodiment 96, further comprising:
the analytics conducting component, stored in the medium, includes processor-issuable instructions to:
determine, via processor, a second segment associated with the device component, wherein the second segment is affected by the issue;
generate, via processor, a second update package for the second segment that includes an updated software or firmware component that updates the device component and remedies the issue, wherein the second update package includes different software update modules than the update package; and
facilitate, via processor, notification of remote connected devices associated with the second segment regarding the second update package.

107. The medium of embodiment 96, further comprising:
a component collection stored in the medium, including:
an update package configuring component;
wherein the update package configuring component, stored in the medium, includes processor-issuable instructions to:
determine, via processor, a priority for the update package based on the severity of the issue; and
associated, via processor, the priority with the update package.

108. The medium of embodiment 96, further comprising:
a component collection stored in the medium, including:
an update package configuring component;
wherein the update package configuring component, stored in the medium, includes processor-issuable instructions to:
determine, via processor, software update modules for the update package;
determine, via processor, dependencies between the software update modules; and
generate, via processor, a script file that facilitates installation of the software update modules in accordance with the determined dependencies.

109. The medium of embodiment 108, wherein the script file is a software update module associated with the update package.

110. The medium of embodiment 108, further comprising:
the update package configuring component, stored in the medium, includes processor-issuable instructions to:
validate, via processor, configuration of the update package based on the determined dependencies.

111. A processor-implemented device component analytics improvement and decisioning system, comprising:
an analytics conducting component means, to:
obtain, via network, analytics data associated with an analytics application from a plurality of remote connected devices;
analyze, via processor, the obtained analytics data to determine an issue affecting at least some of the plurality of remote connected devices;
determine, via processor, based on the analysis, a device component of the affected remote connected devices that is at least in part responsible for causing the issue;
determine, via processor, a segment associated with the device component, wherein the segment is affected by the issue;
generate, via processor, an update package for the segment that includes an updated software or firmware component that updates the device component and remedies the issue; and
facilitate, via processor, notification of remote connected devices associated with the segment regarding the update package.

112. The system of embodiment 111, wherein the analytics data comprises event data reported by the plurality of remote connected devices.

113. The system of embodiment 111, wherein the analytics data is obtained in a graph format.

114. The system of embodiment 111, wherein the analytics data is obtained directly from a remote connected device via an adapter.

115. The system of embodiment 111, wherein the analytics data is obtained indirectly from a remote connected device via a cloud data storage repository.

116. The system of embodiment 111, further comprising:
the analytics conducting component means, to:

obtain, via network, analytics data associated with an analytics application from a third party database.

117. The system of embodiment 111, further comprising:
the analytics conducting component means, to:
utilize, via processor, a federated query to obtain analytics data associated with an analytics application by combining analytics data from a plurality of sources.

118. The system of embodiment 111, wherein the plurality of remote connected devices are vehicles.

119. The system of embodiment 118, wherein the device component is an electronic control unit of a vehicle.

120. The system of embodiment 118, wherein the device component is an app installed on an infotainment unit of a vehicle.

121. The system of embodiment 111, further comprising:
the analytics conducting component means, to:
determine, via processor, a second segment associated with the device component, wherein the second segment is affected by the issue;
generate, via processor, a second update package for the second segment that includes an updated software or firmware component that updates the device component and remedies the issue, wherein the second update package includes different software update modules than the update package; and
facilitate, via processor, notification of remote connected devices associated with the second segment regarding the second update package.

122. The system of embodiment 111, further comprising:
an update package configuring component means, to:
determine, via processor, a priority for the update package based on the severity of the issue; and
associated, via processor, the priority with the update package.

123. The system of embodiment 111, further comprising:
an update package configuring component means, to:
determine, via processor, software update modules for the update package;
determine, via processor, dependencies between the software update modules; and
generate, via processor, a script file that facilitates installation of the software update modules in accordance with the determined dependencies.

124. The system of embodiment 123, wherein the script file is a software update module associated with the update package.

125. The system of embodiment 123, further comprising:
the update package configuring component means, to:
validate, via processor, configuration of the update package based on the determined dependencies.

126. A processor-implemented device component analytics improvement and decisioning method, comprising:
executing processor-implemented analytics conducting component instructions to:
obtain, via network, analytics data associated with an analytics application from a plurality of remote connected devices;
analyze, via processor, the obtained analytics data to determine an issue affecting at least some of the plurality of remote connected devices;
determine, via processor, based on the analysis, a device component of the affected remote connected devices that is at least in part responsible for causing the issue;
determine, via processor, a segment associated with the device component, wherein the segment is affected by the issue;
generate, via processor, an update package for the segment that includes an updated software or firmware component that updates the device component and remedies the issue; and
facilitate, via processor, notification of remote connected devices associated with the segment regarding the update package.

127. The method of embodiment 126, wherein the analytics data comprises event data reported by the plurality of remote connected devices.

128. The method of embodiment 126, wherein the analytics data is obtained in a graph format.

129. The method of embodiment 126, wherein the analytics data is obtained directly from a remote connected device via an adapter.

130. The method of embodiment 126, wherein the analytics data is obtained indirectly from a remote connected device via a cloud data storage repository.

131. The method of embodiment 126, further comprising:
executing processor-implemented analytics conducting component instructions to:
obtain, via network, analytics data associated with an analytics application from a third party database.

132. The method of embodiment 126, further comprising:
executing processor-implemented analytics conducting component instructions to:
utilize, via processor, a federated query to obtain analytics data associated with an analytics application by combining analytics data from a plurality of sources.

133. The method of embodiment 126, wherein the plurality of remote connected devices are vehicles.

134. The method of embodiment 133, wherein the device component is an electronic control unit of a vehicle.

135. The method of embodiment 133, wherein the device component is an app installed on an infotainment unit of a vehicle.

136. The method of embodiment 126, further comprising:
executing processor-implemented analytics conducting component instructions to:
determine, via processor, a second segment associated with the device component, wherein the second segment is affected by the issue;
generate, via processor, a second update package for the second segment that includes an updated software or firmware component that updates the device component and remedies the issue, wherein the second update package includes different software update modules than the update package; and
facilitate, via processor, notification of remote connected devices associated with the second segment regarding the second update package.

137. The method of embodiment 126, further comprising:
executing processor-implemented update package configuring component instructions to:
determine, via processor, a priority for the update package based on the severity of the issue; and
associated, via processor, the priority with the update package.

138. The method of embodiment 126, further comprising:
executing processor-implemented update package configuring component instructions to:
determine, via processor, software update modules for the update package;

determine, via processor, dependencies between the software update modules; and generate, via processor, a script file that facilitates installation of the software update modules in accordance with the determined dependencies.

139. The method of embodiment 138, wherein the script file is a software update module associated with the update package.

140. The method of embodiment 138, further comprising: executing processor-implemented update package configuring component instructions to:

validate, via processor, configuration of the update package based on the determined dependencies.

141. A device component status detection and illustration apparatus, comprising:

a memory;

a component collection in the memory, including:

a device status tool component, and a processor disposed in communication with the memory, and configured to issue a plurality of processing instructions from the component collection stored in the memory, wherein the processor issues instructions from the device status tool component, stored in the memory, to:

obtain, via processor, device selection parameters;

determine, via processor, one or more remote connected devices that satisfy the device selection parameters;

identify, via processor, a remote connected device selected from the one or more remote connected devices by a user using a user interface;

generate, via processor, a first visualization that illustrates an updates timeline associated with the identified remote connected device, a first update time selected from the updates timeline, and information regarding device components associated with the identified remote connected device as of the first update time;

obtain, via processor, a selection of a second update time from the updates timeline from the user; and generate, via processor, a second visualization that illustrates an updates timeline associated with the identified remote connected device, the second update time selected from the updates timeline, and information regarding device components associated with the identified remote connected device as of the second update time.

142. The apparatus of embodiment 141, wherein the device selection parameters are obtained from the user via the user interface.

143. The apparatus of embodiment 141, wherein the device selection parameters are obtained from a configuration file.

144. The apparatus of embodiment 141, wherein the device selection parameters include a vehicle VIN number or a vehicle model.

145. The apparatus of embodiment 141, wherein the device selection parameters include a specified reported error associated with a remote connected device or a last update timestamp associated with a remote connected device.

146. The apparatus of embodiment 141, wherein information regarding device components includes identifiers of device components associated with the remote connected device and version labels of the device components associated with the remote connected device.

147. The apparatus of embodiment 141, wherein information regarding the device components is illustrated in a tree format.

148. The apparatus of embodiment 141, wherein a slider widget is utilized to illustrate the updates timeline.

149. The apparatus of embodiment 141, wherein the first update time is the update time associated with the latest update to the remote connected device.

150. The apparatus of embodiment 141, wherein the second update time is an update time associated with a past update to the remote connected device.

151. The apparatus of embodiment 141, wherein the second update time is an update time associated with a future anticipated update to the remote connected device.

152. The apparatus of embodiment 151, further comprising:

the processor issues instructions from the device status tool component, stored in the memory, to:

determine, via processor, software update modules of an update package associated with the future anticipated update that should be downloaded by the remote connected device; and generate, via processor, a visualization that illustrates which software update modules should be downloaded.

153. The apparatus of embodiment 151, further comprising:

the processor issues instructions from the device status tool component, stored in the memory, to:

determine, via processor, software update modules of an update package associated with the future anticipated update that should not be downloaded by the remote connected device; and generate, via processor, a visualization that illustrates which software update modules should not be downloaded.

154. The apparatus of embodiment 151, wherein the second visualization illustrates which device components changed between the first update time and the second update time.

155. The apparatus of embodiment 151, wherein the second visualization illustrates which device components changed between the second update time and the update time preceding the second update time.

156. A processor-readable device component status detection and illustration non-transient physical medium storing processor-executable components, the components, comprising:

a component collection stored in the medium, including:

a device status tool component, and wherein the device status tool component, stored in the medium, includes processor-issuable instructions to:

obtain, via processor, device selection parameters;

determine, via processor, one or more remote connected devices that satisfy the device selection parameters;

identify, via processor, a remote connected device selected from the one or more remote connected devices by a user using a user interface;

generate, via processor, a first visualization that illustrates an updates timeline associated with the identified remote connected device, a first update time selected from the updates timeline, and information regarding device components associated with the identified remote connected device as of the first update time;

obtain, via processor, a selection of a second update time from the updates timeline from the user; and generate, via processor, a second visualization that illustrates an updates timeline associated with the identified remote connected device, the second update time selected from the updates timeline, and information regarding device components associated with the identified remote connected device as of the second update time.

157. The medium of embodiment 156, wherein the device selection parameters are obtained from the user via the user interface.

158. The medium of embodiment 156, wherein the device selection parameters are obtained from a configuration file.

159. The medium of embodiment 156, wherein the device selection parameters include a vehicle VIN number or a vehicle model.

160. The medium of embodiment 156, wherein the device selection parameters include a specified reported error associated with a remote connected device or a last update timestamp associated with a remote connected device.

161. The medium of embodiment 156, wherein information regarding device components includes identifiers of device components associated with the remote connected device and version labels of the device components associated with the remote connected device.

162. The medium of embodiment 156, wherein information regarding the device components is illustrated in a tree format.

163. The medium of embodiment 156, wherein a slider widget is utilized to illustrate the updates timeline.

164. The medium of embodiment 156, wherein the first update time is the update time associated with the latest update to the remote connected device.

165. The medium of embodiment 156, wherein the second update time is an update time associated with a past update to the remote connected device.

166. The medium of embodiment 156, wherein the second update time is an update time associated with a future anticipated update to the remote connected device.

167. The medium of embodiment 166, further comprising:
the device status tool component, stored in the medium, includes processor-issuable instructions to:
determine, via processor, software update modules of an update package associated with the future anticipated update that should be downloaded by the remote connected device; and
generate, via processor, a visualization that illustrates which software update modules should be downloaded.

168. The medium of embodiment 166, further comprising:
the device status tool component, stored in the medium, includes processor-issuable instructions to:
determine, via processor, software update modules of an update package associated with the future anticipated update that should not be downloaded by the remote connected device; and
generate, via processor, a visualization that illustrates which software update modules should not be downloaded.

169. The medium of embodiment 166, wherein the second visualization illustrates which device components changed between the first update time and the second update time.

170. The medium of embodiment 166, wherein the second visualization illustrates which device components changed between the second update time and the update time preceding the second update time.

171. A processor-implemented device component status detection and illustration system, comprising:
a device status tool component means, to:
obtain, via processor, device selection parameters;
determine, via processor, one or more remote connected devices that satisfy the device selection parameters;
identify, via processor, a remote connected device selected from the one or more remote connected devices by a user using a user interface;
generate, via processor, a first visualization that illustrates an updates timeline associated with the identified remote connected device, a first update time selected from the updates timeline, and information regarding device components associated with the identified remote connected device as of the first update time;
obtain, via processor, a selection of a second update time from the updates timeline from the user; and
generate, via processor, a second visualization that illustrates an updates timeline associated with the identified remote connected device, the second update time selected from the updates timeline, and information regarding device components associated with the identified remote connected device as of the second update time.

172. The system of embodiment 171, wherein the device selection parameters are obtained from the user via the user interface.

173. The system of embodiment 171, wherein the device selection parameters are obtained from a configuration file.

174. The system of embodiment 171, wherein the device selection parameters include a vehicle VIN number or a vehicle model.

175. The system of embodiment 171, wherein the device selection parameters include a specified reported error associated with a remote connected device or a last update timestamp associated with a remote connected device.

176. The system of embodiment 171, wherein information regarding device components includes identifiers of device components associated with the remote connected device and version labels of the device components associated with the remote connected device.

177. The system of embodiment 171, wherein information regarding the device components is illustrated in a tree format.

178. The system of embodiment 171, wherein a slider widget is utilized to illustrate the updates timeline.

179. The system of embodiment 171, wherein the first update time is the update time associated with the latest update to the remote connected device.

180. The system of embodiment 171, wherein the second update time is an update time associated with a past update to the remote connected device.

181. The system of embodiment 171, wherein the second update time is an update time associated with a future anticipated update to the remote connected device.

182. The system of embodiment 181, further comprising:
the device status tool component means, to:
determine, via processor, software update modules of an update package associated with the future anticipated update that should be downloaded by the remote connected device; and
generate, via processor, a visualization that illustrates which software update modules should be downloaded.

183. The system of embodiment 181, further comprising:
the device status tool component means, to:
determine, via processor, software update modules of an update package associated with the future anticipated update that should not be downloaded by the remote connected device; and
generate, via processor, a visualization that illustrates which software update modules should not be downloaded.
184. The system of embodiment 181, wherein the second visualization illustrates which device components changed between the first update time and the second update time.
185. The system of embodiment 181, wherein the second visualization illustrates which device components changed between the second update time and the update time preceding the second update time.
186. A processor-implemented device component status detection and illustration method, comprising:
executing processor-implemented device status tool component instructions to:
obtain, via processor, device selection parameters;
determine, via processor, one or more remote connected devices that satisfy the device selection parameters;
identify, via processor, a remote connected device selected from the one or more remote connected devices by a user using a user interface;
generate, via processor, a first visualization that illustrates an updates timeline associated with the identified remote connected device, a first update time selected from the updates timeline, and information regarding device components associated with the identified remote connected device as of the first update time;
obtain, via processor, a selection of a second update time from the updates timeline from the user; and
generate, via processor, a second visualization that illustrates an updates timeline associated with the identified remote connected device, the second update time selected from the updates timeline, and information regarding device components associated with the identified remote connected device as of the second update time.
187. The method of embodiment 186, wherein the device selection parameters are obtained from the user via the user interface.
188. The method of embodiment 186, wherein the device selection parameters are obtained from a configuration file.
189. The method of embodiment 186, wherein the device selection parameters include a vehicle VIN number or a vehicle model.
190. The method of embodiment 186, wherein the device selection parameters include a specified reported error associated with a remote connected device or a last update timestamp associated with a remote connected device.
191. The method of embodiment 186, wherein information regarding device components includes identifiers of device components associated with the remote connected device and version labels of the device components associated with the remote connected device.
192. The method of embodiment 186, wherein information regarding the device components is illustrated in a tree format.
193. The method of embodiment 186, wherein a slider widget is utilized to illustrate the updates timeline.
194. The method of embodiment 186, wherein the first update time is the update time associated with the latest update to the remote connected device.
195. The method of embodiment 186, wherein the second update time is an update time associated with a past update to the remote connected device.
196. The method of embodiment 186, wherein the second update time is an update time associated with a future anticipated update to the remote connected device.
197. The method of embodiment 196, further comprising:
executing processor-implemented device status tool component instructions to:
determine, via processor, software update modules of an update package associated with the future anticipated update that should be downloaded by the remote connected device; and
generate, via processor, a visualization that illustrates which software update modules should be downloaded.
198. The method of embodiment 196, further comprising:
executing processor-implemented device status tool component instructions to:
determine, via processor, software update modules of an update package associated with the future anticipated update that should not be downloaded by the remote connected device; and
generate, via processor, a visualization that illustrates which software update modules should not be downloaded.
199. The method of embodiment 196, wherein the second visualization illustrates which device components changed between the first update time and the second update time.
200. The method of embodiment 196, wherein the second visualization illustrates which device components changed between the second update time and the update time preceding the second update time.

In order to address various issues and advance the art, the entirety of this application for Remote Embedded Device Update Platform Apparatuses, Methods and Systems (including the Cover Page, Title, Headings, Field, Background, Summary, Brief Description of the Drawings, Detailed Description, Claims, Abstract, Figures, Appendices, and otherwise) shows, by way of illustration, various embodiments in which the claimed innovations may be practiced. The advantages and features of the application are of a representative sample of embodiments only, and are not exhaustive and/or exclusive. They are presented only to assist in understanding and teach the claimed principles. It should be understood that they are not representative of all claimed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components, data flow order, logic flow order, and/or any present feature sets as described in the figures and/or throughout are not limited to a fixed operating order and/or arrangement, but rather, any disclosed order is exemplary and all equivalents, regardless of order, are contemplated by the disclosure. Similarly, descriptions of embodiments disclosed throughout this disclosure, any reference to direction or orientation is merely intended for convenience of description and is not intended in any way to limit the scope of described embodiments. Relative terms such as "lower," "upper," "horizontal," "vertical," "above," "below," "up," "down," "top" and "bottom" as well as derivative thereof (e.g., "horizontally," "downwardly," "upwardly," etc.) should not be construed to limit embodiments, and instead, again, are offered for convenience of description of orientation. These relative descriptors are for convenience of description only and do not require that any embodiments be constructed or operated in a particular orientation unless explicitly indicated as such. Terms such as "attached," "affixed," "connected," "coupled," "interconnected," and similar may refer to a relationship wherein structures are secured or attached to one another either directly or indirectly through intervening structures, as well as both movable or rigid attachments or relationships, unless expressly described otherwise. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the innovations, and inapplicable to others. In addition, the disclosure includes other innovations not presently claimed. Applicant reserves all rights in those presently unclaimed innovations including the right to claim such innovations, file additional applications, continuations, continuations in part, divisions, and/or the like thereof. As such, it should be understood that advantages, embodiments, examples, functional, features, logical, operational, organizational, structural, topological, and/or other aspects of the disclosure are not to be considered limitations on the disclosure as defined by the claims or limitations on equivalents to the claims. It is to be understood that, depending on the particular needs and/or characteristics of a REDUP individual and/or enterprise user, database configuration and/or relational model, data type, data transmission and/or network framework, syntax structure, and/or the like, various embodiments of the REDUP, may be implemented that enable a great deal of flexibility and customization. For example, aspects of the REDUP may be adapted for appliances, avionics, environmental control systems, etc. While various embodiments and discussions of the REDUP have included embedded software, however, it is to be understood that the embodiments described herein may be readily configured and/or customized for a wide variety of other applications and/or implementations.

What is claimed is:

1. A processor-implemented remote embedded device component package and segment management method, comprising:

executing processor-implemented device segment determining component instructions to:

obtain, via a network, a connection notification message from a remote connected device, wherein the connection notification message includes a device identifier of the remote connected device, and device status data that includes information regarding components installed in the remote connected device and versions of the installed components;

analyze, via a processor, the connection notification message to determine the device identifier;

determine, via the processor, segment identifiers of segments associated with the remote connected device based on the device identifier, each of the segments linking an associated group of devices according to features of the devices;

determine, via the processor, for each of the associated segments, segment component identifiers of segment components associated with the respective segment based on the respective segment identifier of the respective segment;

determine, via the processor, for each of the associated segment components, whether an applicable update, which is available for the respective segment component and which is applicable to the respective segment, is available based on the respective segment component identifier of the respective segment component;

generate, via the processor, an update notification message, wherein the update notification message includes information regarding the determined applicable updates; and send, via the network, the update notification message to the remote connected device;

executing processor-implemented package download administering component instructions to:

obtain, via the network, an update download request message from the remote connected device, wherein the update download request message includes an update identifier of an applicable update associated with the sent update notification message;

analyze, via the processor, the update download request message to determine the update identifier;

determine, via the processor, an update package associated with the update identifier; and send, via the processor, the determined update package to the remote connected device; and tracking updates installed on the remote connected device, wherein segments associated with the remote connected device are updated according to the update package responsive to installing respective updates from the update package on the remote connected device.

2. A remote embedded device component package and segment management apparatus, comprising:

a memory;

a component collection in the memory, including:

a device segment determining component, and a package download administering component;

a processor disposed in communication with the memory, and configured to issue a plurality of processing instructions from the component collection stored in the memory, wherein the processor issues instructions from the device segment determining component, stored in the memory, to:

obtain, via a network, a connection notification message from a remote connected device, wherein the connection notification message includes a device identifier of the remote connected device, and device status data that includes information regarding components installed in the remote connected device and versions of the installed components;

analyze, via the processor, the connection notification message to determine the device identifier;

determine, via the processor, segment identifiers of segments associated with the remote connected device based on the device identifier, each of the segments linking an associated group of devices according to features of the devices;

determine, via the processor, for each of the associated segments, segment component identifiers of segment components associated with the respective segment based on the respective segment identifier of the respective segment;

determine, via the processor, for each of the associated segment components of each of the associated segments, whether an applicable update, which is available for the respective segment component and which is applicable to the respective segment, is available based on the respective segment component identifier of the respective segment component;

generate, via the processor, an update notification message, wherein the update notification message includes information regarding the determined applicable updates including a list of available updates associated with each of the segments associated with the remote connected device; and send, via the network, the update notification message to the remote connected device;

wherein the processor issues instructions from the package download administering component, stored in the memory, to:

obtain, via the network, an update download request message from the remote connected device, wherein the update download request message includes an update identifier of an applicable update associated with the sent update notification message;

analyze, via the processor, the update download request message to determine the update identifier;

determine, via the processor, an update package associated with the update identifier; and send, via the processor, the determined update package to the remote connected device.

3. The apparatus of claim 2, wherein:
the processor issues instructions from a component, stored in the memory, to:
obtain, via the network, an update installation report log message associated with the update identifier from the remote connected device; and
store data associated with the update installation report log message in a storage repository.

4. The apparatus of claim 2, wherein a segment is configured to link a group of devices that are specified as a set and wherein the remote connected device is associated with a plurality of segments.

5. The apparatus of claim 2, wherein a segment is configured to link a group of devices that have specified segment components.

6. The apparatus of claim 5, wherein a segment is configured to link a group of devices that have specified attribute values associated with the specified segment components.

7. The apparatus of claim 6, wherein at least one of the specified attribute values is a specified version label associated with hardware or software or firmware of a segment component and wherein, upon updating the hardware, software, or firmware associated with the specified version label, the remote connected device is placed in a segment associated with a new hardware, software, or firmware version of the segment component and removed from the segment associated with an original hardware, software, or firmware version having the specified version label.

8. The apparatus of claim 2, wherein a segment component is an embedded hardware component.

9. The apparatus of claim 2, wherein a segment component is a software or firmware component.

10. The apparatus of claim 2, wherein the processor issues further instructions from the component, stored in the memory, to track updates installed on the remote connected device and update segments associated with the device according to the installed updates, and wherein instructions to determine whether an applicable update is available for a segment component further comprise instructions to:
determine whether an applicable update is available for the version of the segment component installed in the remote connected device.

11. The apparatus of claim 2, wherein the update notification message includes priority data associated for each of the determined applicable updates.

12. The apparatus of claim 2, wherein:
the processor issues instructions from the package download administering component, stored in the memory, to:
determine, via the processor, whether the remote connected device is authorized to get the update package associated with the update identifier.

13. The apparatus of claim 2, wherein the update package comprises a plurality of software update modules.

14. The apparatus of claim 13, wherein a rule is associated with a software update module.

15. The apparatus of claim 14, wherein the rule specifies whether the software update module may be installed on a component.

16. The apparatus of claim 14, wherein the rule specifies how the software update module is configured to be installed on a component.

17. The apparatus of claim 14, wherein the rule specifies a dependency between the software update module and another software update module in the update package.

18. The apparatus of claim 13, wherein a software update module is associated with parameters including version label, timestamp, checksum, and associated component of the remote connected device.

19. The apparatus of claim 2, wherein:
the processor issues instructions from a component, stored in the memory, to:
configure, via the processor, the update package for the remote connected device based on information regarding components installed in the remote connected device and versions of the installed components.

20. The apparatus of claim 19, wherein instructions to configure the update package further comprise instructions to:

exclude a software update module previously installed on the remote connected device from the update package.

21. The apparatus of claim 2, wherein priority data associated with the update package determines whether user approval is to be obtained from a user of the remote connected device before installing the update package.

22. A processor-readable remote embedded device component package and segment management non-transient physical medium storing processor-executable components, the components, comprising:
   a component collection stored in the medium, including:
      a device segment determining component, and
      a package download administering component;
      wherein the device segment determining component, stored in the medium, includes processor-issuable instructions to:
         obtain, via a network, a connection notification message from a remote connected device, wherein the connection notification message includes a device identifier of the remote connected device, and device status data that includes information regarding components installed in the remote connected device and versions of the installed components;
         analyze, via a processor, the connection notification message to determine the device identifier;
         determine, via the processor, segment identifiers of segments associated with the remote connected device based on the device identifier, each of the segments linking an associated group of devices according to features of the devices;
         determine, via the processor, for each of the associated segments, segment component identifiers of segment components associated with the respective segment based on the respective segment identifier of the respective segment;
         determine, via the processor, for each of the associated segment components, whether an applicable update, which is available for the respective segment component and which is applicable to the respective segment, is available based on the respective segment component identifier of the respective segment component;
         generate, via the processor, an update notification message, wherein the update notification message includes information regarding the determined applicable updates including a list of available updates associated with each of the segments associated with the remote connected device; and
         send, via the network, the update notification message to the remote connected device;
      wherein the package download administering component, stored in the medium, includes processor-issuable instructions to:
         obtain, via the network, an update download request message from the remote connected device, wherein the update download request message includes an update identifier of an applicable update associated with the sent update notification message;
         analyze, via the processor, the update download request message to determine the update identifier;
         determine, via the processor, an update package associated with the update identifier; and
         send, via the processor, the determined update package to the remote connected device.

23. A processor-implemented remote embedded device component package and segment management system, comprising:
   a device segment determining component means, to:
      obtain, via a network, a connection notification message from a remote connected device, wherein the connection notification message includes a device identifier of the remote connected device, and device status data that includes information regarding components installed in the remote connected device and versions of the installed components;
      analyze, via a processor, the connection notification message to determine the device identifier;
      determine, via the processor, segment identifiers of segments associated with the remote connected device based on the device identifier;
      determine, via the processor, for each of the associated segments, segment component identifiers of segment components associated with the respective segment based on the respective segment identifier of the respective segment;
      determine, via the processor, for each of the associated segment components, whether an applicable update, which is available for the respective segment component and which is applicable to the respective segment, is available based on the respective segment component identifier of the respective segment component;
      generate, via the processor, an update notification message, wherein the update notification message includes information regarding the determined applicable updates including a list of available updates associated with each of the segments associated with the remote connected device; and
      send, via the network, the update notification message to the remote connected device;
   a package download administering component means, to:
      obtain, via the network, an update download request message from the remote connected device, wherein the update download request message includes an update identifier of an applicable update associated with the sent update notification message;
      analyze, via the processor, the update download request message to determine the update identifier;
      determine, via the processor, an update package associated with the update identifier; and
      send, via the processor, the determined update package to the remote connected device;
   wherein segments associated with the remote connected device are updated according to the update package responsive to installing respective updates from the update package on the remote connected device.

* * * * *